US010953305B2

(12) United States Patent
Dalebout et al.

(10) Patent No.: US 10,953,305 B2
(45) Date of Patent: Mar. 23, 2021

(54) STRENGTH EXERCISE MECHANISMS

(71) Applicant: ICON Health & Fitness, Inc., Logan, UT (US)

(72) Inventors: William T. Dalebout, North Logan, UT (US); Gordon Cutler, Providence, UT (US)

(73) Assignee: ICON Health & Fitness, Inc., Logan, UT (US)

( * ) Notice: Subject to any disclaimer, the term of this patent is extended or adjusted under 35 U.S.C. 154(b) by 225 days.

(21) Appl. No.: 15/245,953

(22) Filed: Aug. 24, 2016

(65) Prior Publication Data

US 2017/0056715 A1 Mar. 2, 2017

Related U.S. Application Data

(60) Provisional application No. 62/210,323, filed on Aug. 26, 2015.

(51) Int. Cl.
*A63B 71/06* (2006.01)
*A63B 21/068* (2006.01)
(Continued)

(52) U.S. Cl.
CPC ........ *A63B 71/0622* (2013.01); *A63B 21/068* (2013.01); *A63B 21/4035* (2015.10);
(Continued)

(58) Field of Classification Search
CPC ............ A63B 21/4035; A63B 22/0235; A63B 22/0046; A63B 23/03516; A63B 21/068; A63B 71/0622; A63B 2220/52; A63B 2230/207; A63B 2230/06; A63B 2230/01; A63B 2230/00; A63B 2225/50; A63B 2225/20; A63B 2220/806; A63B 2220/75; A63B 2220/74; A63B 21/00047; A63B 2220/73; A63B 2220/72; A63B 2220/70; A63B 2220/62; A63B 23/03558; A63B 2220/56; A63B 2220/31; A63B 2220/17; A63B 2220/13; A63B 2220/10; A63B 2220/05; A63B 2071/0658;
(Continued)

(56) References Cited

U.S. PATENT DOCUMENTS 232,022 A 9/1880 Gifford
284,294 A 9/1883 Graves
(Continued)

FOREIGN PATENT DOCUMENTS

CN 203989681 12/2014
KR 100829774 5/2008
(Continued)

OTHER PUBLICATIONS

International Search Report and Written Opinion issued for PCT/US2016/048692 dated Dec. 1, 2016.
(Continued)

*Primary Examiner* — Sundhara M Ganesan
*Assistant Examiner* — Shila Jalalzadeh Abyaneh
(74) *Attorney, Agent, or Firm* — Ray Quinney & Nebeker

(57) ABSTRACT

A treadmill including a frame, an exercise deck attached to the frame, and a first push-up handle attached to the frame and elevated over the exercise deck.

13 Claims, 10 Drawing Sheets

(51) Int. Cl.

| | | |
|---|---|---|
| *A63B 23/035* | (2006.01) | |
| *A63B 22/00* | (2006.01) | |
| *A63B 21/00* | (2006.01) | |
| *A63B 23/12* | (2006.01) | |
| *A63B 23/00* | (2006.01) | |
| *A63B 17/04* | (2006.01) | |
| *G06K 9/00* | (2006.01) | |
| *A63B 1/00* | (2006.01) | |
| *A63B 22/02* | (2006.01) | |
| *A63B 21/16* | (2006.01) | |
| *A63B 21/072* | (2006.01) | |
| *A63B 23/02* | (2006.01) | |
| *H04M 1/725* | (2006.01) | |

(52) U.S. Cl.
CPC .... *A63B 22/0046* (2013.01); *A63B 23/03516* (2013.01); *A63B 23/1236* (2013.01); *G06K 9/00342* (2013.01); *A63B 1/00* (2013.01); *A63B 17/04* (2013.01); *A63B 21/00047* (2013.01); *A63B 21/0726* (2013.01); *A63B 21/16* (2013.01); *A63B 21/1618* (2013.01); *A63B 21/1627* (2013.01); *A63B 21/1636* (2013.01); *A63B 22/0023* (2013.01); *A63B 22/0235* (2013.01); *A63B 23/0216* (2013.01); *A63B 23/03525* (2013.01); *A63B 23/03541* (2013.01); *A63B 23/03558* (2013.01); *A63B 23/1218* (2013.01); *A63B 23/1227* (2013.01); *A63B 2023/006* (2013.01); *A63B 2071/063* (2013.01); *A63B 2071/065* (2013.01); *A63B 2071/0638* (2013.01); *A63B 2071/0658* (2013.01); *A63B 2220/05* (2013.01); *A63B 2220/10* (2013.01); *A63B 2220/13* (2013.01); *A63B 2220/17* (2013.01); *A63B 2220/20* (2013.01); *A63B 2220/31* (2013.01); *A63B 2220/52* (2013.01); *A63B 2220/56* (2013.01); *A63B 2220/62* (2013.01); *A63B 2220/70* (2013.01); *A63B 2220/72* (2013.01); *A63B 2220/73* (2013.01); *A63B 2220/74* (2013.01); *A63B 2220/75* (2013.01); *A63B 2220/806* (2013.01); *A63B 2225/20* (2013.01); *A63B 2225/50* (2013.01); *A63B 2230/00* (2013.01); *A63B 2230/01* (2013.01); *A63B 2230/06* (2013.01); *A63B 2230/207* (2013.01); *A63B 2230/30* (2013.01); *A63B 2230/40* (2013.01); *A63B 2230/62* (2013.01); *A63B 2230/75* (2013.01); *H04M 1/7253* (2013.01)

(58) Field of Classification Search
CPC ........ A63B 2071/065; A63B 2071/063; A63B 2023/006; A63B 2230/40; A63B 23/1218; A63B 23/03541; A63B 23/03525; A63B 23/0216; A63B 2230/30; A63B 22/0023; A63B 21/1636; A63B 21/1627; A63B 21/1618; A63B 21/16; A63B 21/0726; A63B 17/04; A63B 23/1227; A63B 23/1236; A63B 2230/75; A63B 1/00; A63B 22/02; A63B 69/0028
USPC .......................................................... 482/54
See application file for complete search history.

(56) References Cited

U.S. PATENT DOCUMENTS

| | | |
|---|---|---|
| 321,388 A | 6/1885 | Ruebsam |
| 339,638 A | 4/1886 | Goldie |
| 421,779 A | 2/1890 | Steven |
| 447,780 A | 3/1891 | Luge |
| 450,792 A | 4/1891 | Dodd |
| 659,216 A | 10/1900 | Dowling |
| 663,486 A | 12/1900 | Boren |
| 674,391 A | 5/1901 | Baker |
| 683,284 A | 9/1901 | Honey |
| 766,930 A | 8/1904 | De Laski |
| 881,521 A | 3/1908 | Wilson |
| 897,722 A | 9/1908 | Day |
| 931,394 A | 8/1909 | Day |
| 937,795 A | 10/1909 | Hackney |
| 1,016,729 A | 2/1912 | Barrett |
| 1,020,777 A | 3/1912 | Peterson |
| 1,064,968 A | 6/1913 | Hagen |
| 1,082,940 A | 12/1913 | Sharp |
| 1,211,765 A | 1/1917 | Schmidt |
| 1,570,482 A | 1/1926 | Hale |
| 1,580,530 A | 4/1926 | Rambo |
| 1,585,748 A | 5/1926 | Wendelken |
| 1,715,870 A | 6/1929 | Augustine |
| 1,766,089 A | 6/1930 | Wood |
| 1,778,635 A | 10/1930 | Heisler |
| 1,824,406 A | 9/1931 | Petersime |
| 1,850,530 A | 3/1932 | Brown |
| 1,893,728 A | 1/1933 | Bullis |
| 1,902,694 A | 3/1933 | Edwards |
| 1,919,627 A | 7/1933 | Fitz Gerald |
| 1,928,089 A | 9/1933 | Blickman |
| 1,973,945 A | 9/1934 | Chavin |
| 1,978,579 A | 10/1934 | Hooks |
| 1,982,843 A | 12/1934 | Traver |
| 2,017,885 A | 10/1935 | Atcheson |
| 2,067,136 A | 1/1937 | Bridenbaugh |
| 2,117,957 A | 5/1938 | Ritter |
| 2,155,684 A | 4/1939 | Richards |
| 2,165,700 A | 7/1939 | Henry |
| 2,177,957 A | 10/1939 | Stewart |
| 2,219,219 A | 10/1940 | Boger |
| 2,247,946 A | 7/1941 | Hein et al. |
| 2,255,864 A | 9/1941 | Stephens |
| 2,315,485 A | 4/1943 | Jones |
| 2,399,915 A | 5/1946 | Drake |
| 2,440,644 A | 4/1948 | Powell |
| 2,569,007 A | 9/1951 | Klyce |
| 2,607,816 A | 8/1952 | Ryder |
| 2,632,645 A | 3/1953 | Barkschat |
| 2,645,539 A | 7/1953 | Thompson |
| 2,646,282 A | 7/1953 | Ringman |
| 2,648,540 A | 8/1953 | Hunter |
| 2,674,453 A | 4/1954 | Hummert |
| 2,743,623 A | 5/1956 | Wells |
| 2,746,822 A | 5/1956 | Copenhaver |
| 2,842,365 A | 7/1958 | Kelley |
| 2,855,200 A | 10/1958 | Blickman |
| 2,874,971 A | 2/1959 | Devery |
| 2,969,060 A | 1/1961 | Swanda |
| 2,984,594 A | 5/1961 | Runton |
| 3,035,671 A | 5/1962 | Sicherman |
| 3,059,312 A | 10/1962 | Jamieson |
| 3,068,950 A | 12/1962 | Davidson |
| 3,072,426 A | 1/1963 | Gilbert |
| 3,112,108 A | 11/1963 | Hanke |
| 3,127,171 A | 3/1964 | Noland et al. |
| 3,179,071 A | 4/1965 | Johnston |
| 3,193,287 A | 7/1965 | Robinson |
| 3,205,888 A | 9/1965 | Stroop |
| 3,316,898 A | 5/1967 | Brown |
| 3,319,273 A | 5/1967 | Solin |
| 3,342,485 A | 9/1967 | Gaul |
| 3,345,067 A | 10/1967 | Smith |
| 3,358,813 A | 12/1967 | Kohlhagen |
| 3,378,259 A | 4/1968 | Kupchinski |
| 3,408,067 A | 10/1968 | Armstrong |
| 3,408,069 A | 10/1968 | Lewis |
| 3,411,497 A | 11/1968 | Rickey et al. |
| 3,416,174 A | 12/1968 | Novitske |
| 3,430,084 A | 2/1969 | Hall |
| 3,430,507 A | 3/1969 | Hurst et al. |
| 3,438,627 A | 4/1969 | La Lanne |

(56) References Cited

U.S. PATENT DOCUMENTS

| | | |
|---|---|---|
| 3,444,830 A | 5/1969 | Doetsch |
| 3,446,503 A | 5/1969 | Lawton |
| 3,501,140 A | 3/1970 | Eichorn |
| 3,511,500 A | 5/1970 | Dunn |
| 3,514,110 A | 5/1970 | Thomander |
| 3,518,985 A | 7/1970 | Quinton |
| 3,522,947 A | 8/1970 | Anderson |
| 3,547,435 A | 12/1970 | Scott |
| 3,554,541 A | 1/1971 | Spoth |
| 3,563,541 A | 2/1971 | Sanquist |
| 3,566,861 A | 3/1971 | Weiss |
| 3,567,219 A | 3/1971 | Foster |
| 3,568,669 A | 3/1971 | Stites |
| 3,572,700 A | 3/1971 | Mastropaolo |
| 3,583,465 A | 6/1971 | Youngs et al. |
| 3,586,322 A | 6/1971 | Kverneland |
| 3,589,715 A | 6/1971 | Morris |
| 3,592,466 A | 7/1971 | Parsons |
| 3,598,404 A | 8/1971 | Bowman |
| 3,602,502 A | 8/1971 | Jaegar |
| 3,606,320 A | 9/1971 | Erwin, Jr. |
| 3,608,898 A | 9/1971 | Berlin |
| 3,614,097 A | 10/1971 | Blickman |
| 3,628,654 A | 12/1971 | Haracz |
| 3,628,791 A | 12/1971 | Garcia |
| 3,634,895 A | 1/1972 | Childers |
| 3,636,577 A | 1/1972 | Nissen |
| 3,638,941 A | 2/1972 | Kulkens |
| 3,640,528 A | 2/1972 | Proctor |
| 3,641,601 A | 2/1972 | Sieg |
| 3,642,279 A | 2/1972 | Cutter |
| 3,643,943 A | 2/1972 | Erwin, Jr. et al. |
| 3,650,529 A | 3/1972 | Salm |
| 3,658,327 A | 4/1972 | Thiede |
| 3,659,845 A | 5/1972 | Quinton |
| 3,664,666 A | 5/1972 | Lloyd |
| 3,686,776 A | 8/1972 | Dahl |
| 3,689,066 A | 9/1972 | Hagen |
| 3,703,284 A | 11/1972 | Hesen |
| 3,708,166 A | 1/1973 | Annas |
| 3,709,197 A | 1/1973 | Moseley |
| 3,731,917 A | 5/1973 | Townsend |
| 3,738,649 A | 6/1973 | Miller |
| 3,741,538 A | 6/1973 | Useldinger |
| 3,751,033 A | 8/1973 | Rosenthal |
| 3,756,595 A | 9/1973 | Hague |
| 3,767,195 A | 10/1973 | Dimick |
| 3,788,412 A | 1/1974 | Vincent |
| 3,792,860 A | 2/1974 | Selnes |
| 3,809,393 A | 5/1974 | Jones |
| 3,814,420 A | 6/1974 | Encke |
| 3,822,488 A | 7/1974 | Johnson |
| 3,826,491 A | 7/1974 | Elder |
| 3,848,467 A | 11/1974 | Flavell |
| 3,851,874 A | 12/1974 | Wilkin |
| 3,858,938 A | 1/1975 | Kristensson et al. |
| 3,861,215 A | 1/1975 | Bradley |
| 3,869,121 A | 3/1975 | Flavell |
| 3,870,297 A | 3/1975 | Elder |
| 3,874,657 A | 4/1975 | Niebojewski |
| 3,880,274 A | 4/1975 | Bechtloff |
| 3,883,922 A | 5/1975 | Fleischhauer |
| 3,892,404 A | 7/1975 | Martucci |
| 3,901,379 A | 8/1975 | Bruhm |
| 3,903,613 A | 9/1975 | Bisberg |
| 3,904,196 A | 9/1975 | Berlin |
| 3,909,857 A | 10/1975 | Herrera |
| 3,912,263 A | 10/1975 | Yatso |
| 3,918,710 A | 11/1975 | Niebojewski |
| 3,926,430 A | 12/1975 | Good, Jr. |
| 3,929,026 A | 12/1975 | Hofmann |
| 3,938,400 A | 2/1976 | Konyha |
| 3,941,377 A | 3/1976 | Lie |
| 3,948,513 A | 4/1976 | Pfotenhauer |
| 3,963,101 A | 6/1976 | Stadelmann et al. |
| 3,977,451 A | 8/1976 | Duba |
| 3,981,500 A | 9/1976 | Ryan |
| 4,012,015 A | 3/1977 | Nelson et al. |
| 4,024,949 A | 5/1977 | Kleysteuber et al. |
| 4,026,545 A | 5/1977 | Schonenberger |
| 4,033,567 A | 7/1977 | Lipfert |
| 4,056,265 A | 11/1977 | Ide |
| 4,063,726 A | 12/1977 | Wilson |
| 4,063,727 A | 12/1977 | Hall |
| 4,066,257 A | 1/1978 | Moller |
| 4,066,259 A | 1/1978 | Brentham |
| 4,067,372 A | 1/1978 | Masson |
| 4,072,309 A | 2/1978 | Wilson |
| 4,074,903 A | 2/1978 | Diez de Aux |
| 4,077,626 A | 3/1978 | Newman |
| 4,082,267 A | 4/1978 | Flavell |
| 4,093,196 A | 6/1978 | Bauer |
| 4,094,330 A | 6/1978 | Jong |
| 4,111,417 A | 9/1978 | Gardner |
| 4,113,071 A | 9/1978 | Muller et al. |
| 4,120,294 A | 10/1978 | Wolfe |
| 4,141,158 A | 2/1979 | Benseler et al. |
| 4,146,222 A | 3/1979 | Hribar |
| 4,149,714 A | 4/1979 | Lambert, Jr. |
| 4,151,988 A | 5/1979 | Nabinger |
| 4,151,994 A | 5/1979 | Stalberger, Jr. |
| 4,161,998 A | 7/1979 | Trimble |
| 4,167,938 A | 9/1979 | Remih |
| 4,168,061 A | 9/1979 | Gordon |
| 4,171,805 A | 10/1979 | Abbott |
| 4,179,134 A | 12/1979 | Atkinson |
| 4,183,156 A | 1/1980 | Rudy |
| 4,183,494 A | 1/1980 | Cleveland |
| 4,188,030 A | 2/1980 | Hooper |
| 4,199,139 A | 4/1980 | Mahnke |
| 4,204,673 A | 5/1980 | Speer, Sr. |
| 4,208,049 A | 6/1980 | Wilson |
| 4,215,516 A | 8/1980 | Huschle et al. |
| 4,216,856 A | 8/1980 | Moring et al. |
| 4,227,689 A | 10/1980 | Keiser |
| 4,235,437 A | 11/1980 | Ruis et al. |
| 4,240,627 A | 12/1980 | Brentham |
| 4,248,476 A | 2/1981 | Phelps |
| 4,249,725 A | 2/1981 | Mattox |
| 4,251,932 A | 2/1981 | Love |
| 4,253,661 A | 3/1981 | Russell |
| 4,258,821 A | 3/1981 | Wendt |
| 4,258,913 A | 3/1981 | Brentham |
| 4,274,625 A | 6/1981 | Gaetano |
| 4,278,095 A | 7/1981 | Lapeyre |
| 4,278,249 A | 7/1981 | Forrest |
| 4,286,782 A | 9/1981 | Fuhrhop |
| 4,290,601 A | 9/1981 | Mittelstadt |
| 4,300,761 A | 11/1981 | Howard |
| 4,313,602 A | 2/1982 | Sullivan |
| 4,313,603 A | 2/1982 | Simjian |
| 4,324,501 A | 4/1982 | Herbenar |
| 4,333,978 A | 6/1982 | Kocher |
| 4,334,676 A | 6/1982 | Schonenberger |
| 4,334,695 A | 6/1982 | Ashby |
| 4,337,283 A | 6/1982 | Haas, Jr. |
| 4,342,452 A | 8/1982 | Summa |
| 4,344,616 A | 8/1982 | Ogden |
| 4,349,597 A | 9/1982 | Fine et al. |
| 4,350,336 A | 9/1982 | Hanford |
| 4,358,105 A | 11/1982 | Sweeney, Jr. |
| 4,363,480 A | 12/1982 | Fisher et al. |
| 4,363,486 A | 12/1982 | Chaudhry |
| 4,367,895 A | 1/1983 | Pacitti et al. |
| 4,369,081 A | 1/1983 | Curry et al. |
| 4,370,766 A | 2/1983 | Teague, Jr. |
| 4,374,587 A | 2/1983 | Ogden |
| 4,377,045 A | 3/1983 | Aurensan |
| 4,383,684 A | 5/1983 | Schliep |
| 4,383,714 A | 5/1983 | Ishida |
| 4,397,462 A | 8/1983 | Wilmarth |
| 4,406,451 A | 9/1983 | Gaetano |
| 4,408,613 A | 10/1983 | Relyea |
| 4,413,821 A | 11/1983 | Centafanti |

(56) References Cited

U.S. PATENT DOCUMENTS

| | | |
|---|---|---|
| 4,422,635 A | 12/1983 | Herod |
| 4,422,636 A | 12/1983 | de Angeli |
| 4,423,864 A | 1/1984 | Wiik |
| 4,426,077 A | 1/1984 | Becker |
| 4,431,181 A | 2/1984 | Baswell |
| 4,434,981 A | 3/1984 | Norton |
| 4,441,708 A | 4/1984 | Brentham |
| 4,445,684 A | 5/1984 | Ruff |
| 4,452,448 A | 6/1984 | Ausherman |
| 4,453,766 A | 6/1984 | DiVito |
| 4,461,472 A | 7/1984 | Martinez |
| 4,465,277 A | 8/1984 | Dittrich |
| 4,476,582 A | 10/1984 | Strauss et al. |
| 4,477,071 A | 10/1984 | Brown et al. |
| 4,489,933 A | 12/1984 | Fisher |
| 4,491,318 A | 1/1985 | Francke |
| 4,494,662 A | 1/1985 | Clymer |
| 4,496,147 A | 1/1985 | DeCloux et al. |
| 4,499,784 A | 2/1985 | Shum |
| 4,502,679 A | 3/1985 | De Lorenzo |
| 4,505,474 A | 3/1985 | Mattox |
| 4,505,475 A | 3/1985 | Olschansky et al. |
| 4,509,510 A | 4/1985 | Hook |
| 4,512,567 A | 4/1985 | Phillips |
| 4,512,571 A | 4/1985 | Hermelin |
| 4,522,394 A | 6/1985 | Broussard |
| 4,529,194 A | 7/1985 | Haaheim |
| 4,533,136 A | 8/1985 | Smith et al. |
| 4,536,244 A | 8/1985 | Greci et al. |
| 4,538,805 A | 9/1985 | Parviainen |
| 4,542,899 A | 9/1985 | Hendricks |
| 4,544,152 A | 10/1985 | Taitel |
| 4,544,153 A | 10/1985 | Babcock |
| 4,546,971 A | 10/1985 | Raasoch |
| 4,548,405 A | 10/1985 | Lee |
| 4,549,733 A | 10/1985 | Salyer |
| 4,556,216 A | 12/1985 | Pitkanen |
| 4,563,001 A | 1/1986 | Terauds |
| 4,563,003 A | 1/1986 | Bugallo et al. |
| 4,564,193 A | 1/1986 | Stewart |
| 4,566,689 A | 1/1986 | Ogden |
| 4,566,732 A | 1/1986 | Ostergaard, Sr. |
| 4,569,518 A | 2/1986 | Fulks |
| 4,571,682 A | 2/1986 | Silverman et al. |
| 4,572,500 A | 2/1986 | Weiss |
| 4,572,504 A | 2/1986 | DiBartolo |
| 4,576,352 A | 3/1986 | Ogden |
| 4,576,376 A | 3/1986 | Miller |
| 4,577,860 A | 3/1986 | Matias et al. |
| 4,580,983 A | 4/1986 | Cassini et al. |
| 4,581,269 A | 4/1986 | Tilman |
| 4,582,320 A | 4/1986 | Shaw |
| 4,589,656 A | 5/1986 | Baldwin |
| 4,591,147 A | 5/1986 | Smith et al. |
| 4,592,544 A | 6/1986 | Smith et al. |
| 4,600,196 A | 7/1986 | Jones |
| 4,601,142 A | 7/1986 | Frommelt |
| 4,602,779 A | 7/1986 | Ogden |
| 4,610,449 A | 9/1986 | Diercks, Jr. |
| 4,614,337 A | 9/1986 | Schonenberger |
| 4,616,822 A | 10/1986 | Trulaske |
| 4,618,139 A | 10/1986 | Haaheim |
| 4,618,140 A | 10/1986 | Brown |
| 4,619,454 A | 10/1986 | Walton |
| 4,621,623 A | 11/1986 | Wang |
| 4,624,457 A | 11/1986 | Silberman et al. |
| 4,625,962 A | 12/1986 | Street |
| 4,627,614 A | 12/1986 | De Angeli |
| 4,627,615 A | 12/1986 | Nurkowski |
| 4,627,616 A | 12/1986 | Kauffman |
| 4,630,817 A | 12/1986 | Buckley |
| 4,632,385 A | 12/1986 | Geraci |
| 4,632,386 A | 12/1986 | Beech |
| 4,632,390 A | 12/1986 | Richey |
| 4,634,127 A | 1/1987 | Rockwell |
| 4,635,927 A | 1/1987 | Shu |
| 4,635,928 A | 1/1987 | Ogden et al. |
| 4,637,605 A | 1/1987 | Ritchie |
| 4,638,523 A | 1/1987 | Todd |
| 4,638,969 A | 1/1987 | Brown |
| 4,641,833 A | 2/1987 | Trethewey |
| 4,642,080 A | 2/1987 | Takano et al. |
| 4,643,418 A | 2/1987 | Bart |
| 4,645,197 A | 2/1987 | Mcfee |
| 4,645,200 A | 2/1987 | Hix |
| 4,645,201 A | 2/1987 | Evans |
| 4,645,917 A | 2/1987 | Penney et al. |
| 4,647,041 A | 3/1987 | Whiteley |
| 4,650,067 A | 3/1987 | Brule |
| 4,650,184 A | 3/1987 | Brebner |
| 4,650,185 A | 3/1987 | Cartwright |
| 4,651,581 A | 3/1987 | Svensson |
| 4,659,074 A | 4/1987 | Taitel et al. |
| 4,659,077 A | 4/1987 | Stropkay |
| 4,659,078 A | 4/1987 | Blome |
| 4,662,630 A | 5/1987 | Dignard et al. |
| 4,664,371 A | 5/1987 | Viander |
| 4,664,373 A | 5/1987 | Hait |
| 4,664,646 A | 5/1987 | Rorabaugh |
| 4,673,177 A | 6/1987 | Szymski |
| 4,674,740 A | 6/1987 | Iams et al. |
| 4,674,743 A | 6/1987 | Hirano |
| 4,678,185 A | 7/1987 | Mahnke |
| 4,679,787 A | 7/1987 | Guilbault |
| 4,684,121 A | 8/1987 | Nestegard |
| 4,685,670 A | 8/1987 | Zinkin |
| 4,687,195 A | 8/1987 | Potts |
| 4,697,809 A | 10/1987 | Rockwell |
| 4,700,946 A | 10/1987 | Breunig |
| 4,702,475 A | 10/1987 | Elstein et al. |
| 4,705,028 A | 11/1987 | Melby |
| 4,705,267 A | 11/1987 | Jackson |
| 4,708,337 A | 11/1987 | Shyu |
| 4,709,917 A | 12/1987 | Yang |
| 4,709,918 A | 12/1987 | Grinblat |
| 4,709,920 A | 12/1987 | Schnell |
| 4,711,447 A | 12/1987 | Mansfield |
| 4,714,248 A | 12/1987 | Koss |
| 4,718,207 A | 1/1988 | Frommelt |
| 4,720,093 A | 1/1988 | Del Mar |
| 4,720,099 A | 1/1988 | Carlson |
| 4,720,789 A | 1/1988 | Hector et al. |
| 4,721,303 A | 1/1988 | Fitzpatrick |
| 4,725,057 A | 2/1988 | Shifferaw |
| 4,726,581 A | 2/1988 | Chang |
| 4,729,558 A | 3/1988 | Kuo |
| 4,729,562 A | 3/1988 | Pipasik |
| 4,733,858 A | 3/1988 | Lan |
| 4,743,009 A | 5/1988 | Beale |
| 4,743,015 A | 5/1988 | Marshall |
| 4,744,559 A | 5/1988 | Mahnke et al. |
| 4,746,115 A | 5/1988 | Lahman |
| 4,749,184 A | 6/1988 | Tobin |
| 4,750,736 A | 6/1988 | Watterson |
| 4,751,755 A | 6/1988 | Carey, Jr. et al. |
| 4,756,098 A | 7/1988 | Boggia |
| 4,757,987 A | 7/1988 | Allemand |
| 4,759,540 A | 7/1988 | Yu et al. |
| 4,771,148 A | 9/1988 | Bersonnet |
| 4,772,015 A | 9/1988 | Carlson et al. |
| 4,773,170 A | 9/1988 | Moore et al. |
| 4,776,581 A | 10/1988 | Shepherdson |
| 4,776,582 A | 10/1988 | Ramhorst |
| 4,779,884 A | 10/1988 | Minati |
| 4,786,049 A | 11/1988 | Lautenschlager |
| 4,786,050 A | 11/1988 | Geschwender |
| 4,790,528 A | 12/1988 | Nakao et al. |
| 4,792,134 A | 12/1988 | Chen |
| 4,797,968 A | 1/1989 | Wenzlick |
| 4,798,760 A | 1/1989 | Diaz-Kotti |
| 4,799,475 A | 1/1989 | Iams et al. |
| 4,799,671 A | 1/1989 | Hoggan et al. |
| 4,801,079 A | 1/1989 | Gonella |
| 4,804,178 A | 2/1989 | Friedebach |

(56) References Cited

U.S. PATENT DOCUMENTS

| | | |
|---|---|---|
| 4,805,901 A | 2/1989 | Kulick |
| 4,807,874 A | 2/1989 | Little |
| 4,809,804 A | 3/1989 | Houston et al. |
| 4,809,972 A | 3/1989 | Rasmussen et al. |
| 4,813,667 A | 3/1989 | Watterson |
| 4,813,668 A | 3/1989 | Solloway |
| 4,813,743 A | 3/1989 | Mizelle |
| 4,817,939 A | 4/1989 | Augspurger et al. |
| 4,818,175 A | 4/1989 | Kimura |
| 4,819,583 A | 4/1989 | Guerra |
| 4,822,029 A | 4/1989 | Sarno |
| 4,822,034 A | 4/1989 | Shields |
| 4,824,104 A | 4/1989 | Bloch |
| 4,826,153 A | 5/1989 | Schalip |
| 4,826,157 A | 5/1989 | Fitzpatrick |
| 4,826,158 A | 5/1989 | Fields, Jr. |
| 4,826,159 A | 5/1989 | Hersey |
| 4,828,255 A | 5/1989 | Lahman |
| 4,828,257 A | 5/1989 | Dyer et al. |
| 4,830,362 A | 5/1989 | Bull |
| 4,832,332 A | 5/1989 | Dumbser |
| 4,836,530 A | 6/1989 | Stanley, Jr. |
| 4,838,543 A | 6/1989 | Armstrong et al. |
| 4,838,544 A | 6/1989 | Sasakawa et al. |
| 4,842,266 A | 6/1989 | Sweeney, Sr. |
| 4,842,274 A | 6/1989 | Oosthuizen |
| 4,844,449 A | 7/1989 | Truslaske |
| 4,844,450 A | 7/1989 | Rodgers, Jr. |
| 4,848,737 A | 7/1989 | Ehrenfield |
| 4,850,585 A | 7/1989 | Dalebout |
| 4,861,023 A | 8/1989 | Wedman |
| 4,861,025 A | 8/1989 | Rockwell |
| 4,863,161 A | 9/1989 | Telle |
| 4,865,344 A | 9/1989 | Romero, Sr. et al. |
| 4,867,443 A | 9/1989 | Jensen |
| 4,869,493 A | 9/1989 | Johnston |
| 4,869,494 A | 9/1989 | Lambert, Sr. |
| 4,869,497 A | 9/1989 | Stewart et al. |
| 4,875,676 A | 10/1989 | Zimmer |
| 4,877,239 A | 10/1989 | Dela Rosa |
| 4,878,662 A | 11/1989 | Chern |
| 4,878,663 A | 11/1989 | Luquette |
| 4,880,227 A | 11/1989 | Sowell |
| 4,883,272 A | 11/1989 | Lay |
| 4,886,266 A | 12/1989 | Trulaske |
| 4,891,764 A | 1/1990 | McIntosh |
| 4,894,933 A | 1/1990 | Tonkel et al. |
| 4,898,379 A | 2/1990 | Shiba |
| 4,898,381 A | 2/1990 | Gordon |
| 4,900,012 A | 2/1990 | Fu |
| 4,900,017 A | 2/1990 | Bold, Jr. |
| 4,900,018 A | 2/1990 | Ish, III |
| 4,902,006 A | 2/1990 | Stallings, Jr. |
| 4,904,829 A | 2/1990 | Berthaud et al. |
| 4,905,330 A | 3/1990 | Jacobs |
| 4,907,795 A | 3/1990 | Shaw et al. |
| 4,907,797 A | 3/1990 | Gezari et al. |
| 4,907,798 A | 3/1990 | Burchatz |
| 4,909,504 A | 3/1990 | Yang |
| 4,911,438 A | 3/1990 | Van Straaten |
| 4,913,396 A | 4/1990 | Dalebout et al. |
| 4,913,423 A | 4/1990 | Farran |
| 4,915,377 A | 4/1990 | Malnke et al. |
| 4,915,379 A | 4/1990 | Sapp |
| 4,917,376 A | 4/1990 | Lo |
| 4,919,418 A | 4/1990 | Miller |
| 4,919,419 A | 4/1990 | Houston |
| 4,921,242 A | 5/1990 | Watterson |
| 4,921,247 A | 5/1990 | Sterling |
| 4,923,193 A | 5/1990 | Pitzen et al. |
| 4,925,183 A | 5/1990 | Kim |
| 4,925,724 A | 5/1990 | Ogden |
| 4,927,136 A | 5/1990 | Leask |
| 4,928,546 A | 5/1990 | Walters |
| 4,928,957 A | 5/1990 | Lanier et al. |
| 4,930,768 A | 6/1990 | Lapcevic |
| 4,930,769 A | 6/1990 | Nenoff |
| 4,934,690 A | 6/1990 | Bull |
| 4,934,692 A | 6/1990 | Owens |
| 4,938,473 A | 7/1990 | Lee |
| 4,940,233 A | 7/1990 | Bull |
| 4,941,652 A | 7/1990 | Nagano et al. |
| 4,941,673 A | 7/1990 | Bennett |
| 4,948,121 A | 8/1990 | Haaheim et al. |
| 4,949,954 A | 8/1990 | Hix |
| 4,949,958 A | 8/1990 | Richey |
| 4,949,959 A | 8/1990 | Stevens |
| 4,952,265 A | 8/1990 | Yamanaka et al. |
| 4,953,415 A | 9/1990 | Lehtonen |
| 4,953,858 A | 9/1990 | Zelli |
| 4,955,466 A | 9/1990 | Almes et al. |
| 4,958,832 A | 9/1990 | Kim |
| 4,960,276 A | 10/1990 | Feuer et al. |
| 4,964,632 A | 10/1990 | Rockwell |
| 4,968,028 A | 11/1990 | Wehrell |
| 4,971,316 A | 11/1990 | Dalebout et al. |
| 4,974,831 A | 12/1990 | Dunham |
| 4,974,832 A | 12/1990 | Dalebout |
| 4,976,424 A | 12/1990 | Sargeant et al. |
| 4,976,428 A | 12/1990 | Ghazi |
| 4,976,435 A | 12/1990 | Shatford |
| 4,984,810 A | 1/1991 | Stearns |
| 4,986,261 A | 1/1991 | Iams et al. |
| 4,989,860 A | 2/1991 | Iams et al. |
| 4,998,725 A | 3/1991 | Watterson et al. |
| 5,000,440 A | 3/1991 | Lynch |
| 5,000,442 A | 3/1991 | Dalebout et al. |
| 5,001,632 A | 3/1991 | Hall Tipping |
| 5,002,271 A | 3/1991 | Gonzales |
| 5,004,224 A | 4/1991 | Wang |
| 5,007,630 A | 4/1991 | Real et al. |
| 5,007,631 A | 4/1991 | Wang |
| 5,013,031 A | 5/1991 | Bull |
| 5,016,870 A | 5/1991 | Bulloch et al. |
| 5,020,793 A | 6/1991 | Loane |
| 5,024,441 A | 6/1991 | Rousseau |
| 5,026,049 A | 6/1991 | Goodman |
| 5,027,303 A | 6/1991 | Witte |
| 5,029,801 A | 7/1991 | Dalebout et al. |
| 5,031,455 A | 7/1991 | Cline |
| 5,031,901 A | 7/1991 | Saarinen |
| 5,034,576 A | 7/1991 | Dalebout et al. |
| RE33,662 E | 8/1991 | Blair et al. |
| 5,037,084 A | 8/1991 | Flor |
| 5,037,089 A | 8/1991 | Spagnuolo |
| 5,039,089 A | 8/1991 | Lapcevic |
| 5,039,091 A | 8/1991 | Johnson |
| 5,042,799 A | 8/1991 | Stanley |
| 5,046,382 A | 9/1991 | Steinberg |
| 5,046,722 A | 9/1991 | Antoon |
| 5,048,823 A | 9/1991 | Bean |
| 5,051,638 A | 9/1991 | Pyles |
| 5,054,770 A | 10/1991 | Bull |
| 5,058,881 A | 10/1991 | Measom |
| 5,058,882 A | 10/1991 | Dalebout et al. |
| 5,058,888 A | 10/1991 | Walker et al. |
| 5,062,626 A | 11/1991 | Dalebout et al. |
| 5,062,629 A | 11/1991 | Vaughan |
| 5,062,632 A | 11/1991 | Dalebout et al. |
| 5,066,000 A | 11/1991 | Dolan |
| 5,067,710 A | 11/1991 | Watterson et al. |
| 5,071,115 A | 12/1991 | Welch |
| 5,072,928 A | 12/1991 | Stearns |
| 5,072,929 A | 12/1991 | Peterson et al. |
| 5,074,550 A | 12/1991 | Sloan |
| 5,077,916 A | 1/1992 | Beneteau |
| 5,080,353 A | 1/1992 | Tench |
| 5,081,991 A | 1/1992 | Chance |
| 5,085,426 A | 2/1992 | Wanzer et al. |
| 5,085,427 A | 2/1992 | Finn |
| 5,087,047 A | 2/1992 | McConnell |
| 5,088,729 A | 2/1992 | Dalebout |
| 5,094,249 A | 3/1992 | Marras et al. |
| 5,094,447 A | 3/1992 | Wang |

(56) References Cited

U.S. PATENT DOCUMENTS

| | | |
|---|---|---|
| 5,096,225 A | 3/1992 | Osawa |
| 5,102,122 A | 4/1992 | Piane, Jr. |
| 5,102,380 A | 4/1992 | Jacobson et al. |
| 5,104,119 A | 4/1992 | Lynch |
| 5,104,120 A | 4/1992 | Watterson et al. |
| 5,108,093 A | 4/1992 | Watterson |
| 5,109,778 A | 5/1992 | Berkowitz et al. |
| 5,110,117 A | 5/1992 | Fisher et al. |
| 5,112,045 A | 5/1992 | Mason et al. |
| 5,114,388 A | 5/1992 | Trulaske |
| 5,114,391 A | 5/1992 | Pitzen et al. |
| 5,123,629 A | 6/1992 | Takeuchi |
| 5,123,885 A | 6/1992 | Shields |
| 5,123,886 A | 6/1992 | Cook |
| 5,129,872 A | 7/1992 | Dalton et al. |
| 5,131,895 A | 7/1992 | Rogers, Jr. |
| 5,135,216 A | 8/1992 | Bingham et al. |
| 5,135,458 A * | 8/1992 | Huang .................. A63B 22/02 482/138 |
| 5,137,501 A | 8/1992 | Mertesdorf |
| 5,138,730 A | 8/1992 | Masuda |
| 5,141,480 A | 8/1992 | Lennox et al. |
| 5,142,358 A | 8/1992 | Jason |
| 5,145,475 A | 9/1992 | Cares |
| 5,145,481 A | 9/1992 | Friedebach |
| 5,147,266 A | 9/1992 | Ricard |
| 5,149,084 A | 9/1992 | Dalebout et al. |
| 5,149,312 A | 9/1992 | Croft et al. |
| 5,154,684 A | 10/1992 | Delf |
| 5,158,520 A * | 10/1992 | Lemke .................. A63B 21/06 482/103 |
| 5,162,029 A | 11/1992 | Schine |
| 5,163,885 A | 11/1992 | Wanzer et al. |
| 5,167,159 A | 12/1992 | Lucking |
| 5,167,597 A | 12/1992 | David |
| 5,171,196 A | 12/1992 | Lynch |
| 5,178,593 A | 1/1993 | Roberts |
| 5,178,599 A | 1/1993 | Scott |
| 5,181,894 A | 1/1993 | Shieng |
| 5,184,295 A | 2/1993 | Mann |
| 5,184,988 A | 2/1993 | Dunham |
| 5,186,697 A | 2/1993 | Rennex |
| 5,192,255 A | 3/1993 | Dalebout et al. |
| 5,192,257 A | 3/1993 | Panasewicz |
| 5,192,258 A | 3/1993 | Keller |
| 5,195,781 A | 3/1993 | Osawa |
| 5,195,935 A | 3/1993 | Fencel |
| 5,195,937 A | 3/1993 | Engel et al. |
| 5,199,931 A | 4/1993 | Easley et al. |
| 5,201,694 A | 4/1993 | Zappel |
| 5,203,229 A | 4/1993 | Chen |
| 5,203,800 A | 4/1993 | Meredith |
| 5,203,826 A | 4/1993 | Dalebout |
| 5,205,798 A | 4/1993 | Lekhtman |
| 5,205,800 A | 4/1993 | Grant |
| 5,207,489 A | 5/1993 | Miller |
| 5,207,622 A | 5/1993 | Wilkinson et al. |
| 5,207,625 A | 5/1993 | White |
| 5,207,628 A | 5/1993 | Graham |
| 5,211,617 A | 5/1993 | Millen |
| 5,215,510 A | 6/1993 | Baran |
| 5,217,422 A | 6/1993 | Domzalski |
| 5,226,866 A | 7/1993 | Engel et al. |
| 5,232,422 A | 8/1993 | Bishop, Jr. |
| 5,240,417 A | 8/1993 | Smithson et al. |
| 5,242,339 A | 9/1993 | Thornton |
| 5,242,340 A | 9/1993 | Jerome |
| 5,242,343 A | 9/1993 | Miller |
| 5,242,347 A | 9/1993 | Keeton |
| 5,247,853 A | 9/1993 | Dalebout |
| 5,250,012 A | 10/1993 | Whitcomb, Jr. |
| 5,250,013 A | 10/1993 | Brangi |
| 5,254,067 A | 10/1993 | Habing et al. |
| 5,256,117 A | 10/1993 | Potts et al. |
| 5,256,118 A | 10/1993 | Chen |
| 5,256,126 A | 10/1993 | Grotstein |
| 5,257,701 A | 11/1993 | Edelson |
| 5,257,964 A | 11/1993 | Petters |
| 5,261,864 A | 11/1993 | Fitzpatrick |
| 5,269,736 A | 12/1993 | Roberts |
| 5,271,416 A | 12/1993 | Lepley |
| 5,273,285 A | 12/1993 | Long |
| 5,277,678 A | 1/1994 | Friedebach et al. |
| 5,279,528 A | 1/1994 | Dalebout et al. |
| 5,279,529 A | 1/1994 | Eschenbach |
| 5,279,531 A | 1/1994 | Jen Huey |
| 5,282,776 A | 2/1994 | Dalebout |
| 5,284,461 A | 2/1994 | Wilkinson et al. |
| 5,290,205 A | 3/1994 | Densmore et al. |
| 5,290,211 A | 3/1994 | Stearns |
| 5,292,293 A | 3/1994 | Schumacher |
| 5,295,927 A | 3/1994 | Easley |
| 5,295,928 A | 3/1994 | Rennex |
| 5,295,935 A | 3/1994 | Wang |
| 5,299,992 A | 4/1994 | Wilkinson |
| 5,299,993 A | 4/1994 | Habing |
| 5,302,162 A | 4/1994 | Pasero |
| 5,306,221 A | 4/1994 | Itaru |
| 5,308,075 A | 5/1994 | Theriault |
| 5,308,304 A | 5/1994 | Habing |
| 5,310,392 A | 5/1994 | Lo |
| 5,313,852 A | 5/1994 | Arena |
| 5,314,390 A | 5/1994 | Westing et al. |
| 5,314,391 A | 5/1994 | Potash et al. |
| 5,314,392 A | 5/1994 | Hawkins et al. |
| 5,314,394 A | 5/1994 | Ronan |
| 5,316,534 A | 5/1994 | Dalebout et al. |
| 5,318,487 A | 6/1994 | Golen et al. |
| 5,320,343 A | 6/1994 | McKinney |
| 5,320,588 A | 6/1994 | Wanzer et al. |
| 5,320,591 A | 6/1994 | Harmon et al. |
| 5,320,641 A | 6/1994 | Riddle |
| 5,324,242 A | 6/1994 | Lo |
| 5,328,420 A | 7/1994 | Allen |
| 5,328,422 A | 7/1994 | Nichols |
| 5,328,429 A | 7/1994 | Potash et al. |
| 5,330,401 A | 7/1994 | Walstead |
| 5,330,402 A | 7/1994 | Johnson |
| 5,334,120 A | 8/1994 | Rasmussen |
| 5,336,144 A | 8/1994 | Rodden |
| 5,336,145 A | 8/1994 | Keiser |
| 5,336,146 A | 8/1994 | Piaget et al. |
| 5,342,264 A | 8/1994 | Gordon |
| 5,342,271 A | 8/1994 | Long |
| RE34,728 E | 9/1994 | Hall-Tipping |
| 5,344,372 A | 9/1994 | Hung |
| 5,344,376 A | 9/1994 | Bostic et al. |
| 5,348,524 A | 9/1994 | Grant |
| 5,350,344 A | 9/1994 | Kissel |
| 5,352,166 A | 10/1994 | Chang |
| 5,352,167 A | 10/1994 | Ulicny |
| 5,352,169 A | 10/1994 | Eschenbach |
| 5,353,452 A | 10/1994 | Rulis |
| 5,354,248 A | 10/1994 | Rawls et al. |
| 5,354,251 A | 10/1994 | Sleamaker |
| 5,356,356 A | 10/1994 | Hildebrandt et al. |
| 5,358,461 A | 10/1994 | Bailey, Jr. |
| 5,359,986 A | 11/1994 | Magrath, III et al. |
| 5,362,069 A | 11/1994 | Hall-Tipping |
| 5,362,295 A | 11/1994 | Nurge |
| 5,364,327 A | 11/1994 | Graham |
| 5,368,532 A | 11/1994 | Farnet |
| 5,372,556 A | 12/1994 | Ropp |
| 5,372,559 A | 12/1994 | Dalebout et al. |
| 5,372,560 A | 12/1994 | Chang |
| 5,372,564 A | 12/1994 | Spirito |
| 5,374,227 A | 12/1994 | Webb |
| 5,378,212 A | 1/1995 | Pin-Kuo |
| 5,380,258 A | 1/1995 | Hawley, Jr. |
| 5,382,207 A | 1/1995 | Skowronski et al. |
| 5,382,208 A | 1/1995 | Hu |
| 5,382,209 A | 1/1995 | Pasier |
| 5,383,827 A | 1/1995 | Stern |
| 5,383,828 A | 1/1995 | Sands et al. |

(56) References Cited

U.S. PATENT DOCUMENTS

| | | |
|---|---|---|
| 5,385,346 A | 1/1995 | Carroll et al. |
| 5,385,519 A | 1/1995 | Hsu |
| 5,385,520 A | 1/1995 | Lepine |
| 5,387,169 A | 2/1995 | Wang |
| 5,387,170 A | 2/1995 | Rawls et al. |
| 5,387,171 A | 2/1995 | Casey et al. |
| 5,394,922 A | 3/1995 | Colson et al. |
| 5,396,876 A | 3/1995 | Liscio et al. |
| 5,398,948 A | 3/1995 | Mathis |
| 5,401,226 A | 3/1995 | Stearns |
| 5,403,251 A | 4/1995 | Belsito et al. |
| 5,403,252 A | 4/1995 | Leon et al. |
| 5,403,253 A | 4/1995 | Gaylord |
| 5,403,254 A | 4/1995 | Lundin et al. |
| 5,403,255 A | 4/1995 | Johnston |
| 5,406,661 A | 4/1995 | Pekar |
| 5,407,403 A | 4/1995 | Coleman |
| 5,407,408 A | 4/1995 | Wilkinson |
| 5,409,435 A | 4/1995 | Daniels |
| RE34,959 E | 5/1995 | Potts |
| 5,410,971 A | 5/1995 | Golden et al. |
| 5,417,643 A | 5/1995 | Taylor |
| 5,419,570 A | 5/1995 | Bollotte |
| 5,419,571 A | 5/1995 | Vaughan |
| 5,419,751 A | 5/1995 | Byrd et al. |
| 5,423,729 A | 6/1995 | Eschenbach |
| 5,423,730 A | 6/1995 | Hirsch |
| 5,429,563 A | 7/1995 | Engel et al. |
| 5,429,569 A | 7/1995 | Gunnari |
| 5,431,612 A | 7/1995 | Holden |
| 5,433,679 A | 7/1995 | Szymczak et al. |
| 5,435,315 A | 7/1995 | McPhee et al. |
| 5,435,798 A | 7/1995 | Habing et al. |
| 5,435,799 A | 7/1995 | Lundin |
| 5,441,467 A | 8/1995 | Stevens |
| 5,441,468 A | 8/1995 | Deckers et al. |
| 5,449,334 A | 9/1995 | Kingsbury |
| 5,454,772 A | 10/1995 | Rodden |
| 5,454,773 A | 10/1995 | Blanchard et al. |
| 5,456,648 A | 10/1995 | Edinburg |
| 5,460,379 A | 10/1995 | Cleland |
| 5,460,586 A | 10/1995 | Wilkinson |
| 5,462,503 A | 10/1995 | Benjamin et al. |
| 5,462,504 A | 10/1995 | Trulaske et al. |
| 5,466,200 A | 11/1995 | Ulrich et al. |
| 5,466,203 A | 11/1995 | Chen |
| 5,468,205 A | 11/1995 | McFall et al. |
| 5,470,298 A | 11/1995 | Curtis |
| 5,471,405 A | 11/1995 | Marsh |
| 5,474,087 A | 12/1995 | Nashner |
| 5,474,510 A | 12/1995 | Chen |
| 5,476,430 A | 12/1995 | Lee et al. |
| 5,484,358 A | 1/1996 | Wang et al. |
| 5,484,362 A | 1/1996 | Skowronski et al. |
| 5,487,707 A | 1/1996 | Sharf et al. |
| 5,489,249 A | 2/1996 | Brewer et al. |
| 5,489,250 A | 2/1996 | Densmore et al. |
| 5,490,818 A | 2/1996 | Haber et al. |
| 5,492,514 A | 2/1996 | Daum |
| 5,492,520 A | 2/1996 | Brown |
| 5,496,235 A | 3/1996 | Stevens |
| 5,496,236 A | 3/1996 | Buonauito |
| 5,496,238 A | 3/1996 | Taylor |
| 5,496,239 A | 3/1996 | Kallman |
| 5,499,956 A | 3/1996 | Habing et al. |
| 5,505,011 A | 4/1996 | Bleimhofer |
| 5,507,271 A | 4/1996 | Actor |
| 5,509,870 A | 4/1996 | Lloyd |
| 5,512,025 A | 4/1996 | Dalebout et al. |
| 5,512,029 A | 4/1996 | Barnard |
| 5,514,053 A | 5/1996 | Hawkins et al. |
| 5,518,471 A | 5/1996 | Hettinger et al. |
| 5,518,473 A | 5/1996 | Miller |
| 5,520,599 A | 5/1996 | Chen |
| 5,522,783 A | 6/1996 | Gordon |
| 5,527,245 A | 6/1996 | Dalebout et al. |
| 5,529,553 A | 6/1996 | Finlayson |
| 5,529,554 A | 6/1996 | Eschenbach |
| 5,531,658 A | 7/1996 | L. S. C. |
| 5,533,899 A | 7/1996 | Young |
| 5,533,948 A | 7/1996 | Wilkinson |
| 5,533,951 A | 7/1996 | Chang |
| 5,538,489 A | 7/1996 | Magid |
| 5,542,892 A | 8/1996 | Buhler |
| 5,545,112 A | 8/1996 | Densmore et al. |
| 5,549,052 A | 8/1996 | Hoffman |
| 5,549,536 A | 8/1996 | Clark |
| 5,551,934 A | 9/1996 | Binette |
| 5,551,937 A | 9/1996 | Kwo |
| 5,554,033 A | 9/1996 | Bizzi et al. |
| 5,554,083 A | 9/1996 | Chen |
| 5,554,085 A | 9/1996 | Dalebout |
| 5,556,362 A | 9/1996 | Whipps |
| 5,562,572 A | 10/1996 | Carmein |
| 5,562,574 A | 10/1996 | Miller |
| 5,563,487 A | 10/1996 | Davis |
| 5,568,993 A | 10/1996 | Potzick |
| 5,569,128 A | 10/1996 | Dalebout |
| 5,569,138 A | 10/1996 | Wang et al. |
| 5,573,485 A | 11/1996 | Geschwender |
| 5,575,740 A | 11/1996 | Piaget |
| 5,577,985 A | 11/1996 | Miller |
| 5,577,987 A | 11/1996 | Brown |
| 5,580,249 A | 12/1996 | Jacobsen et al. |
| 5,582,563 A | 12/1996 | Fan |
| 5,584,700 A | 12/1996 | Feldman et al. |
| 5,584,779 A | 12/1996 | Knecht |
| 5,586,736 A | 12/1996 | Mollet |
| 5,588,938 A | 12/1996 | Schneider et al. |
| 5,590,893 A | 1/1997 | Robinson et al. |
| 5,591,104 A | 1/1997 | Andrus et al. |
| 5,591,106 A | 1/1997 | Dalebout et al. |
| 5,591,107 A | 1/1997 | Rodgers, Jr. |
| 5,591,908 A | 1/1997 | Reid |
| 5,593,372 A | 1/1997 | Rodgers, Jr. |
| 5,593,380 A | 1/1997 | Bittikofer |
| 5,595,556 A | 1/1997 | Dalebout et al. |
| 5,599,261 A | 2/1997 | Easley et al. |
| 5,600,310 A | 2/1997 | Whipple, III et al. |
| 5,603,675 A | 2/1997 | Wu |
| 5,603,678 A | 2/1997 | Wilson |
| 5,607,375 A | 3/1997 | Dalebout |
| 5,613,216 A | 3/1997 | Galler |
| 5,613,856 A | 3/1997 | Hoover |
| 5,616,103 A | 4/1997 | Lee |
| 5,622,527 A | 4/1997 | Watterson et al. |
| 5,625,577 A | 4/1997 | Kunii et al. |
| 5,626,539 A | 5/1997 | Piaget |
| 5,626,540 A | 5/1997 | Hall |
| 5,630,566 A | 5/1997 | Case |
| 5,632,209 A | 5/1997 | Sakakibara |
| 5,634,870 A | 6/1997 | Wilkinson |
| 5,643,142 A | 7/1997 | Salerno et al. |
| 5,643,144 A | 7/1997 | Trulaske |
| 5,643,147 A | 7/1997 | Huang |
| 5,643,152 A | 7/1997 | Simonson |
| 5,643,153 A | 7/1997 | Nylen et al. |
| 5,643,157 A | 7/1997 | Seliber |
| 5,645,509 A | 7/1997 | Brewer et al. |
| 5,645,914 A | 7/1997 | Horowitz |
| 5,649,882 A | 7/1997 | Parikh et al. |
| 5,650,709 A | 7/1997 | Rotunda et al. |
| 5,653,662 A | 8/1997 | Rodgers, Jr. |
| 5,655,997 A | 8/1997 | Greenberg et al. |
| 5,656,003 A | 8/1997 | Robinson et al. |
| 5,658,227 A | 8/1997 | Stearns |
| 5,662,557 A | 9/1997 | Watterson et al. |
| 5,665,031 A | 9/1997 | Hsieh |
| 5,665,033 A | 9/1997 | Palmer |
| 5,667,459 A | 9/1997 | Su |
| 5,667,461 A | 9/1997 | Hall |
| 5,669,833 A | 9/1997 | Stone |
| 5,669,857 A | 9/1997 | Watterson et al. |
| 5,669,865 A | 9/1997 | Gordon |

(56) References Cited

U.S. PATENT DOCUMENTS

| | | |
|---|---|---|
| 5,672,140 A | 9/1997 | Watterson et al. |
| 5,674,156 A | 10/1997 | Watterson et al. |
| 5,674,453 A | 10/1997 | Watterson et al. |
| 5,676,624 A | 10/1997 | Watterson et al. |
| 5,679,047 A | 10/1997 | Engel |
| 5,679,101 A | 10/1997 | Magid |
| 5,683,332 A | 11/1997 | Watterson et al. |
| 5,685,804 A | 11/1997 | Whan-Tong et al. |
| 5,688,209 A | 11/1997 | Trulaske et al. |
| 5,688,216 A | 11/1997 | Mauriello |
| 5,690,582 A | 11/1997 | Ulrich et al. |
| 5,690,587 A | 11/1997 | Gruenangerl |
| 5,690,589 A | 11/1997 | Rodgers, Jr. |
| 5,692,994 A | 12/1997 | Eschenbach |
| 5,695,435 A | 12/1997 | Dalebout et al. |
| 5,695,436 A | 12/1997 | Huang |
| 5,702,325 A | 12/1997 | Watterson et al. |
| 5,704,879 A | 1/1998 | Watterson et al. |
| 5,707,319 A | 1/1998 | Riley |
| 5,708,355 A | 1/1998 | Schrey |
| 5,709,632 A | 1/1998 | Socwell |
| 5,709,633 A | 1/1998 | Sokol |
| 5,711,745 A | 1/1998 | Yang |
| 5,711,749 A | 1/1998 | Miller |
| 5,713,549 A | 2/1998 | Shieh |
| 5,713,821 A | 2/1998 | Nissen |
| 5,716,308 A | 2/1998 | Lee |
| 5,718,657 A | 2/1998 | Dalebout et al. |
| 5,718,660 A | 2/1998 | Chen |
| 5,720,200 A | 2/1998 | Anderson et al. |
| 5,720,474 A | 2/1998 | Sugiyama |
| 5,722,917 A | 3/1998 | Olschansky et al. |
| 5,722,920 A | 3/1998 | Bauer |
| 5,722,922 A | 3/1998 | Watterson et al. |
| 5,725,459 A | 3/1998 | Rexach |
| 5,730,236 A | 3/1998 | Miller et al. |
| 5,733,228 A | 3/1998 | Stevens |
| 5,733,229 A | 3/1998 | Dalebout et al. |
| 5,735,586 A | 4/1998 | Cheng |
| 5,735,773 A | 4/1998 | Vittone |
| 5,735,776 A | 4/1998 | Swezey |
| 5,738,612 A | 4/1998 | Tsuda |
| 5,741,205 A | 4/1998 | Doll et al. |
| 5,743,193 A | 4/1998 | Kakuta et al. |
| 5,743,832 A | 4/1998 | Sands et al. |
| 5,743,833 A | 4/1998 | Watterson et al. |
| 5,743,835 A | 4/1998 | Trotter |
| 5,746,682 A | 5/1998 | Hung |
| 5,749,372 A | 5/1998 | Allen |
| 5,749,787 A | 5/1998 | Jank |
| 5,749,807 A | 5/1998 | Webb |
| 5,749,809 A | 5/1998 | Lin |
| 5,749,813 A | 5/1998 | Domzalski |
| 5,752,879 A | 5/1998 | Berdut |
| 5,752,897 A | 5/1998 | Skowronski et al. |
| 5,755,642 A | 5/1998 | Miller |
| 5,755,645 A | 5/1998 | Miller et al. |
| 5,755,651 A | 5/1998 | Homyonfer |
| 5,759,136 A | 6/1998 | Chen |
| 5,760,353 A | 6/1998 | Rapp |
| 5,761,831 A | 6/1998 | Cho |
| 5,762,584 A | 6/1998 | Daniels |
| 5,762,587 A | 6/1998 | Dalebout et al. |
| 5,762,588 A | 6/1998 | Chen |
| 5,769,759 A | 6/1998 | Alter |
| 5,771,152 A | 6/1998 | Crompton et al. |
| 5,772,522 A | 6/1998 | Nesbit |
| 5,772,558 A | 6/1998 | Rodgers, Jr. |
| 5,772,560 A | 6/1998 | Watterson et al. |
| 5,776,582 A | 7/1998 | Needham |
| 5,779,599 A | 7/1998 | Chen |
| 5,779,607 A | 7/1998 | Harris |
| 5,782,639 A | 7/1998 | Beal |
| 5,782,723 A | 7/1998 | Kuo |
| 5,785,630 A | 7/1998 | Bobick et al. |
| 5,788,609 A | 8/1998 | Miller |
| 5,788,610 A | 8/1998 | Eschenbach |
| 5,788,611 A | 8/1998 | Kuo |
| 5,792,027 A | 8/1998 | Gvoich |
| 5,792,031 A | 8/1998 | Alton |
| 5,795,270 A | 8/1998 | Woods et al. |
| 5,797,578 A | 8/1998 | Graffeo |
| 5,803,874 A | 9/1998 | Wilkinson |
| 5,803,877 A | 9/1998 | Franey |
| 5,803,882 A | 9/1998 | Habing et al. |
| 5,807,210 A | 9/1998 | Devlin |
| 5,810,696 A | 9/1998 | Webb |
| 5,810,697 A | 9/1998 | Joiner |
| 5,810,698 A | 9/1998 | Hullett et al. |
| 5,813,142 A | 9/1998 | Demon |
| 5,813,947 A | 9/1998 | Densmore |
| 5,813,953 A | 9/1998 | Whipple |
| 5,816,981 A | 10/1998 | Hung |
| 5,820,478 A | 10/1998 | Wood et al. |
| 5,823,618 A | 10/1998 | Fox et al. |
| 5,827,155 A | 10/1998 | Jensen et al. |
| 5,827,158 A | 10/1998 | Drecksel |
| 5,830,107 A | 11/1998 | Brigliadoro |
| 5,830,113 A | 11/1998 | Coody et al. |
| 5,830,114 A | 11/1998 | Halfen et al. |
| 5,833,577 A | 11/1998 | Hurt |
| 5,833,583 A | 11/1998 | Chuang |
| 5,833,584 A | 11/1998 | Piaget et al. |
| 5,833,587 A | 11/1998 | Strong et al. |
| 5,836,770 A | 11/1998 | Powers |
| 5,839,990 A | 11/1998 | Virkkala |
| 5,839,993 A | 11/1998 | Fox |
| 5,842,961 A | 12/1998 | Davis |
| 5,846,166 A | 12/1998 | Kuo |
| 5,848,954 A | 12/1998 | Stearns et al. |
| 5,852,264 A | 12/1998 | Muller |
| 5,855,537 A | 1/1999 | Coody et al. |
| 5,855,538 A | 1/1999 | Argabright |
| 5,857,939 A | 1/1999 | Kaufman |
| 5,857,940 A | 1/1999 | Husted |
| 5,857,941 A | 1/1999 | Maresh |
| 5,857,943 A | 1/1999 | Murray |
| 5,860,893 A | 1/1999 | Watterson et al. |
| 5,860,894 A | 1/1999 | Dalebout et al. |
| 5,860,899 A | 1/1999 | Rassman |
| 5,865,710 A | 2/1999 | Wilson-Hyde |
| 5,868,108 A | 2/1999 | Schmitz et al. |
| 5,868,648 A | 2/1999 | Coody et al. |
| 5,871,421 A | 2/1999 | Trulaske et al. |
| 5,876,095 A | 3/1999 | Johnston |
| 5,879,271 A | 3/1999 | Stearns et al. |
| 5,879,273 A | 3/1999 | Wei |
| 5,879,276 A | 3/1999 | Miller |
| 5,882,281 A | 3/1999 | Stearns et al. |
| 5,885,197 A | 3/1999 | Barton |
| 5,888,172 A | 3/1999 | Andrus et al. |
| 5,890,562 A | 4/1999 | Bartels et al. |
| 5,890,995 A | 4/1999 | Bobick et al. |
| 5,891,001 A | 4/1999 | Carnes et al. |
| 5,891,003 A | 4/1999 | Deac et al. |
| 5,895,339 A | 4/1999 | Maresh |
| 5,895,340 A | 4/1999 | Keller |
| 5,897,457 A | 4/1999 | Mackovjak |
| 5,897,459 A | 4/1999 | Habing et al. |
| 5,897,460 A | 4/1999 | McBride et al. |
| 5,897,461 A | 4/1999 | Socwell |
| 5,899,833 A | 5/1999 | Ryan et al. |
| 5,899,834 A | 5/1999 | Dalebout et al. |
| 5,902,214 A | 5/1999 | Makikawa et al. |
| 5,904,398 A | 5/1999 | Farricielli |
| 5,904,636 A | 5/1999 | Chen |
| 5,906,269 A | 5/1999 | Zabron et al. |
| 5,906,564 A | 5/1999 | Jacobsen |
| 5,910,070 A | 6/1999 | Henry et al. |
| 5,910,072 A | 6/1999 | Rawls et al. |
| 5,911,132 A | 6/1999 | Sloane |
| 5,913,751 A | 6/1999 | Eschenbach |
| 5,916,064 A | 6/1999 | Eschenbach |
| 5,916,069 A | 6/1999 | Wang |

(56) References Cited

U.S. PATENT DOCUMENTS

| | | |
|---|---|---|
| 5,917,692 A | 6/1999 | Schmitz et al. |
| 5,919,118 A | 7/1999 | Stearns |
| 5,921,892 A * | 7/1999 | Easton .................. A63B 22/02 482/54 |
| 5,921,896 A | 7/1999 | Boland |
| 5,925,001 A | 7/1999 | Hoyt et al. |
| 5,938,551 A | 8/1999 | Warner |
| 5,938,565 A | 8/1999 | Bernacki |
| 5,938,570 A | 8/1999 | Maresh |
| 5,938,571 A | 8/1999 | Stevens |
| 5,938,575 A | 8/1999 | Stearns |
| 5,940,502 A | 8/1999 | Hirai et al. |
| 5,940,911 A | 8/1999 | Wang |
| 5,941,807 A | 8/1999 | Cassidy |
| 5,943,794 A | 8/1999 | Gelsomini |
| 5,944,641 A | 8/1999 | Habing |
| 5,947,869 A | 9/1999 | Shea |
| 5,947,872 A | 9/1999 | Ryan et al. |
| 5,951,441 A | 9/1999 | Dalebout |
| 5,951,444 A | 9/1999 | Webber |
| 5,951,447 A | 9/1999 | Butler |
| 5,951,449 A | 9/1999 | Oppriecht |
| 5,957,814 A | 9/1999 | Eschenbach |
| 5,961,423 A | 10/1999 | Sellers |
| 5,961,430 A | 10/1999 | Zuckerman et al. |
| 5,967,944 A | 10/1999 | Vittone et al. |
| 5,967,954 A | 10/1999 | Habing |
| 5,967,955 A | 10/1999 | Westfall et al. |
| 5,971,902 A | 10/1999 | Robertson et al. |
| 5,976,039 A | 11/1999 | Epel et al. |
| 5,976,061 A | 11/1999 | Moon et al. |
| 5,980,430 A | 11/1999 | Wang |
| 5,980,432 A | 11/1999 | Ahman |
| 5,984,798 A | 11/1999 | Gilmour |
| 5,984,839 A | 11/1999 | Corkum |
| 5,989,161 A | 11/1999 | Wang et al. |
| 5,989,163 A | 11/1999 | Rodgers, Jr. |
| 5,989,168 A | 11/1999 | See |
| 5,991,143 A | 11/1999 | Wright et al. |
| 5,993,358 A | 11/1999 | Gureghian et al. |
| 5,993,359 A | 11/1999 | Eschenbach |
| 5,993,362 A | 11/1999 | Ghobadi |
| 5,997,447 A | 12/1999 | Giannelli et al. |
| 5,997,450 A | 12/1999 | Wilkinson |
| 6,003,481 A | 12/1999 | Pischinger et al. |
| 6,004,244 A | 12/1999 | Simonson |
| 6,006,379 A | 12/1999 | Hensley |
| 6,010,432 A | 1/2000 | Vawter |
| 6,012,591 A | 1/2000 | Brandenberg |
| 6,012,772 A | 1/2000 | Conde et al. |
| 6,013,011 A | 1/2000 | Moore et al. |
| 6,015,367 A | 1/2000 | Scaramucci |
| 6,015,368 A | 1/2000 | Clem |
| 6,027,429 A | 2/2000 | Daniels |
| 6,027,430 A | 2/2000 | Stearns et al. |
| 6,027,432 A | 2/2000 | Cheng |
| 6,029,858 A | 2/2000 | Srokose |
| 6,030,320 A | 2/2000 | Stearns |
| 6,030,321 A | 2/2000 | Fuentes |
| 6,030,323 A | 2/2000 | Fontenot |
| 6,033,344 A | 3/2000 | Trulaske et al. |
| 6,033,347 A | 3/2000 | Dalebout et al. |
| 6,033,350 A | 3/2000 | Krull |
| 6,036,622 A | 3/2000 | Gordon |
| 6,042,512 A | 3/2000 | Eschenbach |
| 6,042,514 A | 3/2000 | Abelbeck |
| 6,042,515 A | 3/2000 | Wang |
| 6,042,516 A | 3/2000 | Norton |
| 6,042,518 A | 3/2000 | Hildebrandt et al. |
| 6,042,523 A | 3/2000 | Graham |
| 6,045,487 A | 4/2000 | Miller |
| 6,045,488 A | 4/2000 | Eschenbach |
| 6,045,490 A | 4/2000 | Shafer |
| 6,045,491 A | 4/2000 | McNergney |
| 6,050,920 A | 4/2000 | Ehrenfried |
| 6,050,921 A | 4/2000 | Wang |
| 6,050,922 A | 4/2000 | Wang |
| 6,050,923 A | 4/2000 | Yu |
| 6,053,844 A | 4/2000 | Clem |
| 6,053,847 A | 4/2000 | Stearns et al. |
| 6,053,848 A | 4/2000 | Eschenbach |
| 6,055,747 A | 5/2000 | Lombardino |
| 6,056,678 A | 5/2000 | Giannelli et al. |
| 6,059,692 A | 5/2000 | Hickman |
| 6,059,695 A | 5/2000 | Hung |
| 6,063,009 A | 5/2000 | Stearns |
| 6,066,075 A | 5/2000 | Poulton |
| 6,068,578 A | 5/2000 | Wang |
| 6,068,579 A | 5/2000 | Killian et al. |
| 6,071,031 A | 6/2000 | Bailey |
| 6,071,216 A | 6/2000 | Giannelli et al. |
| 6,075,525 A | 6/2000 | Hsieh |
| 6,077,196 A | 6/2000 | Eschenbach |
| 6,077,198 A | 6/2000 | Eschenbach |
| 6,077,199 A | 6/2000 | Hsu |
| 6,077,200 A | 6/2000 | Lin |
| 6,080,091 A | 6/2000 | Habing et al. |
| 6,086,520 A | 7/2000 | Rodriquez |
| 6,090,014 A | 7/2000 | Eschenbach |
| 6,090,016 A | 7/2000 | Kuo |
| 6,095,951 A | 8/2000 | Skowronski et al. |
| 6,099,439 A | 8/2000 | Ryan et al. |
| 6,102,412 A | 8/2000 | Staffaroni |
| 6,102,832 A | 8/2000 | Tani |
| 6,110,076 A | 8/2000 | Hurt |
| 6,110,077 A | 8/2000 | Yu |
| 6,113,188 A | 9/2000 | Stewart et al. |
| 6,113,519 A | 9/2000 | Goto |
| 6,113,522 A | 9/2000 | Montgomery |
| 6,117,049 A | 9/2000 | Lowe |
| 6,120,421 A | 9/2000 | Kuo |
| 6,123,646 A | 9/2000 | Colassi |
| 6,123,647 A | 9/2000 | Mitchell |
| 6,123,648 A | 9/2000 | Stevens |
| 6,123,649 A | 9/2000 | Lee |
| 6,123,650 A | 9/2000 | Birrell |
| 6,125,851 A | 10/2000 | Walker et al. |
| 6,126,574 A | 10/2000 | Stearns et al. |
| 6,126,575 A | 10/2000 | Wang |
| 6,126,576 A | 10/2000 | Wang |
| 6,129,962 A | 10/2000 | Quigley et al. |
| 6,132,314 A | 10/2000 | Aiki |
| 6,132,340 A | 10/2000 | Wang |
| 6,135,924 A | 10/2000 | Gibbs et al. |
| 6,135,925 A | 10/2000 | Liu |
| 6,142,870 A | 11/2000 | Wada et al. |
| 6,142,913 A | 11/2000 | Ewert |
| 6,142,914 A | 11/2000 | Crawford et al. |
| 6,142,915 A | 11/2000 | Eschenbach |
| 6,146,313 A | 11/2000 | Whan-Tong et al. |
| 6,146,315 A | 11/2000 | Schonenberger |
| 6,149,551 A | 11/2000 | Pyles et al. |
| 6,149,552 A | 11/2000 | Chen |
| 6,152,856 A | 11/2000 | Studor et al. |
| 6,152,859 A | 11/2000 | Stearns |
| 6,162,183 A | 12/2000 | Hoover |
| 6,163,451 A | 12/2000 | Chiu |
| 6,165,107 A | 12/2000 | Birrell |
| 6,168,551 B1 | 1/2001 | Mcguinness |
| 6,171,216 B1 | 1/2001 | Wang |
| 6,171,219 B1 | 1/2001 | Simonson |
| 6,174,267 B1 | 1/2001 | Dalebout |
| 6,174,268 B1 | 1/2001 | Novak |
| 6,176,814 B1 | 1/2001 | Ryan et al. |
| 6,179,753 B1 | 1/2001 | Barker et al. |
| 6,181,647 B1 | 1/2001 | Tipton et al. |
| 6,183,397 B1 | 2/2001 | Stearns et al. |
| 6,186,290 B1 | 2/2001 | Carlson |
| 6,186,460 B1 | 2/2001 | Lin |
| 6,186,929 B1 | 2/2001 | Endelman et al. |
| 6,189,846 B1 | 2/2001 | Wang |
| 6,190,289 B1 | 2/2001 | Pyles et al. |
| 6,193,635 B1 | 2/2001 | Webber et al. |
| 6,203,474 B1 | 3/2001 | Jones |

(56) References Cited

U.S. PATENT DOCUMENTS

| | | | |
|---|---|---|---|
| 6,206,795 B1 | 3/2001 | Ou |
| 6,210,305 B1 | 4/2001 | Eschenbach |
| 6,213,919 B1 | 4/2001 | Wang |
| 6,215,870 B1 | 4/2001 | Hirai et al. |
| 6,217,487 B1 | 4/2001 | Reinert |
| 6,220,990 B1 | 4/2001 | Crivello |
| 6,220,995 B1 | 4/2001 | Chen |
| 6,224,516 B1 | 5/2001 | Disch |
| 6,224,519 B1 | 5/2001 | Doolittle |
| 6,228,003 B1 | 5/2001 | Hald et al. |
| 6,230,047 B1 | 5/2001 | McHugh |
| 6,230,460 B1 | 5/2001 | Huyett |
| 6,231,482 B1 | 5/2001 | Thompson |
| 6,231,946 B1 | 5/2001 | Brown, Jr. et al. |
| 6,234,935 B1 | 5/2001 | Chu |
| 6,234,936 B1 | 5/2001 | Wang |
| 6,237,583 B1 | 5/2001 | Ripley et al. |
| 6,238,323 B1 | 5/2001 | Simonson |
| 6,241,638 B1 | 6/2001 | Hurt |
| 6,244,988 B1 | 6/2001 | Delman |
| 6,244,992 B1 | 6/2001 | James |
| 6,245,001 B1 | 6/2001 | Siaperas |
| 6,251,047 B1 | 6/2001 | Stearns et al. |
| 6,251,048 B1 | 6/2001 | Kaufman |
| 6,251,052 B1 | 6/2001 | Simonson |
| 6,254,514 B1 | 7/2001 | Maresh et al. |
| 6,254,515 B1 | 7/2001 | Carman et al. |
| 6,261,022 B1 | 7/2001 | Dalebout et al. |
| 6,261,209 B1 | 7/2001 | Coody |
| 6,264,586 B1 | 7/2001 | Webber |
| 6,267,710 B1 | 7/2001 | Liu |
| 6,273,842 B1 | 8/2001 | Wang |
| 6,273,843 B1 | 8/2001 | Lo |
| 6,276,749 B1 | 8/2001 | Okazawa et al. |
| 6,277,054 B1 | 8/2001 | Kuo |
| 6,277,056 B1 | 8/2001 | McBride et al. |
| 6,280,361 B1 | 8/2001 | Harvey et al. |
| 6,280,362 B1 | 8/2001 | Dalebout et al. |
| 6,280,367 B1 | 8/2001 | Arsenault |
| 6,282,816 B1 | 9/2001 | Rosendahl |
| 6,283,896 B1 | 9/2001 | Grunfeld |
| 6,287,240 B1 | 9/2001 | Trabbic |
| 6,293,375 B1 | 9/2001 | Chen |
| 6,296,594 B1 | 10/2001 | Simonson |
| 6,299,959 B1 | 10/2001 | Squires et al. |
| 6,302,815 B1 | 10/2001 | Shishido et al. |
| 6,302,826 B1 | 10/2001 | Lee |
| 6,302,828 B1 | 10/2001 | Martin et al. |
| 6,302,829 B1 | 10/2001 | Schmidt |
| 6,302,830 B1 | 10/2001 | Stearns |
| 6,302,833 B1 | 10/2001 | Ellis et al. |
| 6,306,108 B1 | 10/2001 | Butler |
| 6,307,167 B1 | 10/2001 | Kajio et al. |
| 6,312,363 B1 | 11/2001 | Watterson et al. |
| 6,314,667 B1 | 11/2001 | Rife et al. |
| 6,315,486 B1 | 11/2001 | Lunz |
| 6,322,059 B1 | 11/2001 | Kelm et al. |
| 6,322,481 B1 | 11/2001 | Krull |
| 6,325,745 B1 | 12/2001 | Yu |
| 6,325,746 B1 | 12/2001 | Wang |
| 6,328,676 B1 | 12/2001 | Alessandri |
| 6,328,677 B1 | 12/2001 | Drapeau |
| 6,334,624 B1 | 1/2002 | Giglio |
| 6,344,986 B1 | 2/2002 | Jain et al. |
| 6,347,603 B1 | 2/2002 | Felger |
| 6,348,028 B1 | 2/2002 | Cragg |
| 6,350,218 B1 | 2/2002 | Dalebout et al. |
| 6,352,494 B2 | 3/2002 | McAlonan |
| 6,357,077 B1 | 3/2002 | Jones, Jr. et al. |
| 6,361,476 B1 | 3/2002 | Eschenbach |
| 6,368,252 B1 | 4/2002 | Stearns |
| 6,368,254 B1 | 4/2002 | Wall |
| 6,371,738 B2 | 4/2002 | Jones |
| 6,371,895 B1 | 4/2002 | Endelman et al. |
| 6,375,580 B1 | 4/2002 | Schmidt |
| 6,379,289 B1 | 4/2002 | Gossie |
| 6,382,627 B1 | 5/2002 | Lundberg |
| 6,383,120 B1 | 5/2002 | Lo |
| 6,387,015 B1 * | 5/2002 | Watson ............... A63B 21/15 |
| | | | 482/103 |
| 6,387,016 B1 | 5/2002 | Lo |
| 6,387,020 B1 | 5/2002 | Simonson |
| 6,390,953 B1 | 5/2002 | Maresh |
| 6,390,955 B1 | 5/2002 | Wang |
| 6,394,239 B1 | 5/2002 | Carlson |
| 6,397,797 B1 | 6/2002 | Kolmanovsky et al. |
| 6,398,695 B2 | 6/2002 | Miller |
| 6,402,666 B2 | 6/2002 | Krull |
| 6,409,632 B1 | 6/2002 | Eschenbach |
| 6,409,633 B1 | 6/2002 | Abelbeck |
| 6,413,197 B2 | 7/2002 | McKechnie et al. |
| 6,416,442 B1 | 7/2002 | Stearns et al. |
| 6,416,444 B1 | 7/2002 | Lim |
| 6,419,611 B1 | 7/2002 | Levine et al. |
| 6,422,976 B1 | 7/2002 | Eschenbach |
| 6,422,977 B1 | 7/2002 | Eschenbach |
| 6,422,980 B1 | 7/2002 | Simonson |
| 6,422,983 B1 | 7/2002 | Weck |
| 6,428,449 B1 | 8/2002 | Apseloff |
| 6,432,026 B1 | 8/2002 | Wang |
| 6,435,466 B1 | 8/2002 | Adams |
| 6,436,007 B1 | 8/2002 | Eschenbach |
| 6,436,008 B1 | 8/2002 | Skowronski et al. |
| 6,440,013 B1 | 8/2002 | Brown |
| 6,440,042 B2 | 8/2002 | Eschenbach |
| 6,443,875 B1 | 9/2002 | Golen, Jr. et al. |
| 6,447,424 B1 | 9/2002 | Ashby et al. |
| 6,447,430 B1 | 9/2002 | Webb et al. |
| 6,450,284 B1 | 9/2002 | Sakyo et al. |
| 6,450,922 B1 | 9/2002 | Henderson et al. |
| 6,450,923 B1 * | 9/2002 | Vatti ............... A63B 21/00181 |
| | | | 482/51 |
| 6,450,925 B1 | 9/2002 | Kuo |
| 6,454,679 B1 | 9/2002 | Radow |
| 6,454,682 B1 | 9/2002 | Kuo |
| 6,455,960 B1 | 9/2002 | Trago et al. |
| 6,458,060 B1 | 10/2002 | Watterson et al. |
| 6,458,061 B2 | 10/2002 | Simonson |
| 6,461,275 B1 | 10/2002 | Wang et al. |
| 6,461,279 B1 | 10/2002 | Kuo |
| 6,466,460 B1 | 10/2002 | Rein et al. |
| 6,468,189 B2 | 10/2002 | Alessandri |
| 6,471,622 B1 | 10/2002 | Hammer et al. |
| 6,475,121 B1 | 11/2002 | Wang |
| 6,478,721 B1 | 11/2002 | Hunter |
| 6,482,128 B1 | 11/2002 | Michalow |
| 6,482,130 B1 | 11/2002 | Pasero et al. |
| 6,482,132 B2 | 11/2002 | Eschenbach |
| 6,485,397 B1 | 11/2002 | Manderbacka |
| 6,488,020 B1 | 12/2002 | Rosas-Magallan |
| 6,491,610 B1 | 12/2002 | Henn |
| 6,494,814 B1 | 12/2002 | Wang |
| 6,494,817 B1 | 12/2002 | Lake |
| 6,500,097 B1 | 12/2002 | Hall |
| 6,503,173 B2 | 1/2003 | Clem |
| 6,505,503 B1 | 1/2003 | Teresi et al. |
| 6,506,142 B2 | 1/2003 | Itoh |
| 6,513,532 B2 | 2/2003 | Mault et al. |
| 6,513,669 B2 | 2/2003 | Ozawa et al. |
| 6,514,180 B1 | 2/2003 | Rawls |
| 6,520,891 B1 | 2/2003 | Stephens, Jr. |
| 6,527,674 B1 | 3/2003 | Clem |
| 6,527,678 B1 | 3/2003 | Wang |
| 6,527,685 B2 | 3/2003 | Endelman et al. |
| 6,527,796 B1 | 3/2003 | Magovern |
| 6,530,864 B1 | 3/2003 | Parks |
| 6,533,707 B2 | 3/2003 | Wang |
| 6,537,184 B2 | 3/2003 | Kim |
| 6,539,931 B2 | 4/2003 | Trajkovic et al. |
| 6,543,247 B2 | 4/2003 | Strauss |
| 6,544,146 B1 | 4/2003 | Stearns et al. |
| 6,547,698 B2 | 4/2003 | Inagawa |
| 6,547,701 B1 | 4/2003 | Eschenbach |
| 6,551,218 B2 | 4/2003 | Goh |

(56) References Cited

U.S. PATENT DOCUMENTS

| | | |
|---|---|---|
| 6,551,223 B2 | 4/2003 | Cheng |
| 6,554,749 B2 | 4/2003 | Iund et al. |
| 6,558,299 B1 | 5/2003 | Slattery |
| 6,558,301 B1 | 5/2003 | Jackson |
| 6,561,960 B2 | 5/2003 | Webber |
| 6,563,489 B1 | 5/2003 | Latypov et al. |
| 6,569,061 B2 | 5/2003 | Stearns et al. |
| 6,569,062 B2 | 5/2003 | Wang |
| 6,572,511 B1 | 6/2003 | Volpe |
| 6,572,512 B2 | 6/2003 | Anderson et al. |
| 6,572,513 B1 | 6/2003 | Whan-Tong et al. |
| 6,575,878 B1 | 6/2003 | Choy |
| 6,579,210 B1 | 6/2003 | Stearns et al. |
| 6,579,211 B2 | 6/2003 | Wu |
| 6,582,342 B2 | 6/2003 | Kaufman |
| 6,582,344 B2 | 6/2003 | Tang |
| 6,585,624 B1 | 7/2003 | Chen |
| 6,585,626 B2 | 7/2003 | McBride |
| 6,589,138 B2 | 7/2003 | Dyer et al. |
| 6,592,502 B1 | 7/2003 | Phillips |
| 6,599,223 B2 | 7/2003 | Wang |
| 6,601,016 B1 | 7/2003 | Brown et al. |
| 6,601,358 B2 | 8/2003 | Panatta |
| 6,601,825 B2 | 8/2003 | Bressner et al. |
| 6,604,008 B2 | 8/2003 | Chudley et al. |
| 6,605,020 B1 | 8/2003 | Huang |
| 6,609,478 B2 | 8/2003 | Del Valle |
| 6,610,063 B2 | 8/2003 | Kumar et al. |
| 6,612,969 B2 | 9/2003 | Eschenbach |
| 6,612,971 B1 | 9/2003 | Morris |
| 6,619,681 B2 | 9/2003 | Gutierrez |
| 6,620,079 B2 | 9/2003 | Kuo |
| 6,623,407 B2 | 9/2003 | Novak |
| 6,623,409 B1 | 9/2003 | Abelbeck |
| 6,626,799 B2 | 9/2003 | Watterson et al. |
| 6,626,802 B1 | 9/2003 | Rodgers, Jr. |
| 6,626,803 B1 | 9/2003 | Oglesby et al. |
| 6,629,902 B2 | 10/2003 | Murphy et al. |
| 6,629,909 B1 | 10/2003 | Stearns et al. |
| 6,629,910 B1 | 10/2003 | Krull |
| 6,632,161 B1 | 10/2003 | Nir |
| 6,634,996 B2 | 10/2003 | Jacobsen |
| 6,637,811 B2 | 10/2003 | Zheng |
| 6,637,818 B2 | 10/2003 | Williams |
| 6,645,125 B1 | 11/2003 | Stearns et al. |
| 6,645,126 B1 | 11/2003 | Martin et al. |
| 6,645,130 B2 | 11/2003 | Webber |
| 6,648,800 B2 | 11/2003 | Stearns et al. |
| 6,648,801 B2 | 11/2003 | Stearns et al. |
| 6,648,802 B2 | 11/2003 | Ware |
| 6,652,424 B2 | 11/2003 | Dalebout |
| 6,652,425 B1 | 11/2003 | Martin et al. |
| 6,652,429 B2 | 11/2003 | Bushnell |
| 6,660,949 B2 | 12/2003 | Kamino et al. |
| 6,661,136 B1 | 12/2003 | Lee |
| 6,663,127 B2 | 12/2003 | Miller |
| 6,663,498 B2 | 12/2003 | Stipan |
| 6,663,500 B2 | 12/2003 | Huang |
| 6,666,800 B2 | 12/2003 | Krull |
| 6,666,801 B1 | 12/2003 | Michalow |
| 6,668,678 B1 | 12/2003 | Baba et al. |
| 6,669,600 B2 | 12/2003 | Warner |
| 6,669,609 B2 | 12/2003 | Gerschefske et al. |
| 6,671,975 B2 | 1/2004 | Hennessey |
| 6,672,991 B2 | 1/2004 | O'Malley |
| 6,672,992 B1 | 1/2004 | Lo et al. |
| 6,672,994 B1 | 1/2004 | Stearns et al. |
| 6,676,530 B2 | 1/2004 | Lochtefeld |
| 6,676,572 B2 | 1/2004 | Wang |
| 6,676,579 B1 | 1/2004 | Lin |
| 6,679,816 B1 | 1/2004 | Krull |
| 6,679,820 B2 | 1/2004 | Barkus et al. |
| 6,681,704 B1 | 1/2004 | Brookhiser |
| 6,681,728 B2 | 1/2004 | Haghgooie |
| 6,682,460 B2 | 1/2004 | Lo |
| 6,682,461 B2 | 1/2004 | Wang |
| 6,685,169 B2 | 2/2004 | Shim |
| 6,685,601 B1 | 2/2004 | Knapp |
| 6,685,602 B2 | 2/2004 | Colosky, Jr. et al. |
| 6,685,607 B1 | 2/2004 | Olson |
| 6,689,019 B2 | 2/2004 | Ohrt et al. |
| 6,689,020 B2 | 2/2004 | Stearns |
| 6,689,075 B2 | 2/2004 | West |
| 6,695,694 B2 | 2/2004 | Ishikawa et al. |
| 6,698,110 B1 | 3/2004 | Robbins |
| 6,699,159 B2 | 3/2004 | Rouse |
| 6,699,162 B2 | 3/2004 | Chen |
| 6,702,719 B1 | 3/2004 | Brown et al. |
| 6,705,977 B1 | 3/2004 | Ziak |
| 6,708,427 B2 | 3/2004 | Sussmann et al. |
| 6,712,737 B1 | 3/2004 | Nusbaum |
| 6,712,740 B2 | 3/2004 | Simonson |
| 6,716,142 B2 | 4/2004 | Kuo |
| 6,716,144 B1 | 4/2004 | Shifferaw |
| 6,719,667 B2 | 4/2004 | Wong et al. |
| 6,719,669 B1 | 4/2004 | Wang |
| 6,723,413 B2 | 4/2004 | Walters |
| 6,726,600 B2 | 4/2004 | Miller |
| 6,726,601 B1 | 4/2004 | Beutel |
| 6,726,602 B2 | 4/2004 | Chang |
| 6,730,002 B2 | 5/2004 | Hald et al. |
| 6,733,423 B1 | 5/2004 | Chang |
| 6,733,424 B2 | 5/2004 | Krull |
| 6,736,360 B1 | 5/2004 | Buczek |
| 6,738,274 B2 | 5/2004 | Prasad et al. |
| 6,740,009 B1 | 5/2004 | Hall |
| 6,741,052 B2 | 5/2004 | Fitzgibbon |
| 6,743,153 B2 | 6/2004 | Watterson et al. |
| 6,746,371 B1 | 6/2004 | Brown et al. |
| 6,747,427 B1 | 6/2004 | Carson |
| 6,749,540 B1 | 6/2004 | Pasero et al. |
| 6,749,542 B2 | 6/2004 | Wu |
| 6,758,790 B1 | 7/2004 | Ellis |
| 6,758,791 B1 | 7/2004 | Kuo |
| 6,758,792 B1 | 7/2004 | Chang |
| 6,761,387 B2 | 7/2004 | Sloss |
| 6,761,667 B1 | 7/2004 | Cutler et al. |
| 6,764,429 B1 | 7/2004 | Michalow |
| 6,764,430 B1 | 7/2004 | Fencel |
| 6,764,431 B2 | 7/2004 | Yoss |
| 6,765,726 B2 | 7/2004 | French et al. |
| 6,767,314 B2 | 7/2004 | Thompson |
| 6,770,015 B2 | 8/2004 | Simonson |
| 6,776,740 B1 | 8/2004 | Anderson et al. |
| 6,778,938 B1 | 8/2004 | Ng et al. |
| 6,783,134 B2 | 8/2004 | Geary |
| 6,783,482 B2 | 8/2004 | Oglesby et al. |
| 6,786,821 B2 | 9/2004 | Nobe et al. |
| 6,786,847 B1 | 9/2004 | Morgan et al. |
| 6,786,848 B2 | 9/2004 | Yamashita et al. |
| 6,786,850 B2 | 9/2004 | Nizamuddin |
| 6,786,852 B2 | 9/2004 | Watterson et al. |
| 6,790,162 B1 | 9/2004 | Ellis et al. |
| 6,793,609 B1 | 9/2004 | Fan |
| 6,796,159 B2 | 9/2004 | Kelm et al. |
| 6,796,925 B2 | 9/2004 | Martinez |
| 6,796,927 B2 | 9/2004 | Toyama |
| 6,800,050 B2 | 10/2004 | Moavro |
| 6,807,869 B2 | 10/2004 | Farringdon et al. |
| 6,808,458 B1 | 10/2004 | Jung |
| 6,808,475 B2 | 10/2004 | Kehrbaum |
| 6,811,519 B2 | 11/2004 | Kuo |
| 6,811,520 B2 | 11/2004 | Wu |
| 6,817,117 B1 | 11/2004 | Campbell |
| 6,817,968 B2 | 11/2004 | Galbraith et al. |
| 6,821,230 B2 | 11/2004 | Dalebout et al. |
| 6,824,210 B2 | 11/2004 | Zheng |
| 6,824,502 B1 | 11/2004 | Huang |
| 6,830,540 B2 | 12/2004 | Watterson |
| 6,830,541 B2 | 12/2004 | Wu |
| 6,835,166 B1 | 12/2004 | Stearns et al. |
| 6,837,829 B2 | 1/2005 | Eschenbach |
| 6,837,830 B2 | 1/2005 | Eldridge |
| 6,837,838 B2 | 1/2005 | List |

(56) References Cited

U.S. PATENT DOCUMENTS

| | | |
|---|---|---|
| 6,840,892 B1 | 1/2005 | Wu |
| 6,842,928 B2 | 1/2005 | Yang et al. |
| 6,843,732 B1 | 1/2005 | Huang |
| 6,843,757 B2 | 1/2005 | Pan et al. |
| 6,846,272 B2 | 1/2005 | Rosenow et al. |
| 6,849,032 B2 | 2/2005 | Chu |
| 6,852,068 B2 | 2/2005 | Ogawa |
| 6,852,069 B2 | 2/2005 | Park |
| 6,855,093 B2 | 2/2005 | Anderson et al. |
| 6,855,097 B2 | 2/2005 | Krull |
| 6,857,993 B2 | 2/2005 | Yeh |
| 6,860,836 B1 | 3/2005 | Wu |
| 6,860,839 B1 | 3/2005 | Dice |
| 6,866,141 B2 | 3/2005 | Saeki |
| 6,872,168 B2 | 3/2005 | Wang et al. |
| 6,872,175 B2 | 3/2005 | Lin |
| 6,875,157 B1 | 4/2005 | Wang |
| 6,875,160 B2 | 4/2005 | Watterson et al. |
| 6,878,099 B2 | 4/2005 | Corbalis et al. |
| 6,878,101 B2 * | 4/2005 | Colley .................. A63B 22/02 482/54 |
| 6,880,416 B2 | 4/2005 | Koch |
| 6,880,487 B2 | 4/2005 | Reinkensmeyer et al. |
| 6,881,176 B2 | 4/2005 | Oishi et al. |
| 6,887,185 B1 | 5/2005 | Kuo |
| 6,887,190 B1 | 5/2005 | Azari |
| 6,893,383 B1 | 5/2005 | Chang et al. |
| 6,896,645 B1 | 5/2005 | Krull |
| 6,899,657 B2 | 5/2005 | Chuang |
| 6,899,659 B2 | 5/2005 | Anderson et al. |
| 6,902,513 B1 | 6/2005 | Mcclure |
| 6,902,515 B2 | 6/2005 | Howell et al. |
| 6,905,446 B2 | 6/2005 | Greenland |
| 6,908,416 B2 | 6/2005 | Mercado et al. |
| 6,908,417 B2 | 6/2005 | Jackson |
| 6,910,991 B2 | 6/2005 | Matsumoto |
| 6,913,562 B2 | 7/2005 | Chen |
| 6,913,563 B2 | 7/2005 | Chen |
| 6,916,278 B2 | 7/2005 | Webber |
| 6,918,858 B2 | 7/2005 | Watterson et al. |
| 6,918,859 B1 | 7/2005 | Yeh |
| 6,918,860 B1 | 7/2005 | Nusbaum |
| 6,920,947 B2 | 7/2005 | Kamen et al. |
| 6,921,354 B1 | 7/2005 | Shifferaw |
| 6,921,355 B2 | 7/2005 | Campanaro et al. |
| 6,923,746 B1 | 8/2005 | Skowronski et al. |
| 6,923,747 B1 | 8/2005 | Chu |
| 6,926,644 B2 | 8/2005 | Chen |
| 6,926,646 B1 | 8/2005 | Nguyen |
| 6,932,745 B1 | 8/2005 | Ellis |
| 6,939,271 B1 | 9/2005 | Whan-Tong et al. |
| 6,944,294 B2 | 9/2005 | Tsay |
| 6,945,912 B2 | 9/2005 | Levi |
| 6,945,917 B1 | 9/2005 | Baatz |
| 6,949,053 B2 | 9/2005 | Stearns |
| 6,949,054 B1 | 9/2005 | Stearns |
| 6,953,418 B1 | 10/2005 | Chen |
| 6,953,424 B2 | 10/2005 | Kusumoto et al. |
| 6,964,632 B1 | 11/2005 | Ko |
| 6,966,872 B2 | 11/2005 | Eschenbach |
| 6,974,404 B1 | 12/2005 | Watterson et al. |
| 6,976,698 B2 | 12/2005 | Kuiken |
| 6,979,283 B2 | 12/2005 | Pan |
| 6,991,588 B1 | 1/2006 | Adams |
| 6,993,270 B2 | 1/2006 | Yoshioka et al. |
| 6,994,306 B1 | 2/2006 | Sweere et al. |
| 6,994,657 B1 | 2/2006 | Eschenbach |
| 6,997,852 B2 | 2/2006 | Watterson et al. |
| 6,997,856 B2 | 2/2006 | Krull |
| 7,001,288 B2 | 2/2006 | Harrell |
| 7,003,122 B2 | 2/2006 | Chen |
| 7,003,828 B2 | 2/2006 | Roussy |
| 7,004,271 B1 | 2/2006 | Kamen et al. |
| 7,004,887 B2 | 2/2006 | Pan et al. |
| 7,004,888 B1 | 2/2006 | Weng |
| 7,004,895 B2 | 2/2006 | Perry |
| 7,008,352 B2 | 3/2006 | Grossi |
| 7,008,359 B2 | 3/2006 | Fan et al. |
| 7,009,613 B2 | 3/2006 | Goden |
| 7,011,326 B1 | 3/2006 | Schroeder et al. |
| 7,011,607 B2 | 3/2006 | Kolda et al. |
| 7,011,609 B1 | 3/2006 | Kuo |
| 7,014,599 B2 | 3/2006 | Ashley |
| 7,022,047 B2 | 4/2006 | Cohen et al. |
| 7,022,048 B1 | 4/2006 | Fernandez |
| 7,022,049 B2 | 4/2006 | Ryan et al. |
| 7,022,051 B2 | 4/2006 | Ota |
| 7,025,713 B2 | 4/2006 | Dalebout |
| 7,032,870 B2 | 4/2006 | Sweere et al. |
| 7,033,176 B2 | 4/2006 | Feldman |
| 7,033,269 B2 | 4/2006 | Namba et al. |
| 7,033,306 B2 | 4/2006 | Graber |
| 7,037,241 B2 | 5/2006 | Kuo |
| 7,039,263 B2 | 5/2006 | Towle |
| 7,041,034 B1 | 5/2006 | Stearns et al. |
| 7,041,038 B2 | 5/2006 | Smith |
| 7,041,041 B1 | 5/2006 | Evans |
| 7,044,891 B1 | 5/2006 | Rivera |
| 7,044,897 B2 | 5/2006 | Myers et al. |
| 7,047,817 B2 | 5/2006 | Lanham |
| 7,052,426 B2 | 5/2006 | Battat et al. |
| 7,052,440 B2 | 5/2006 | Pyles et al. |
| 7,052,442 B2 | 5/2006 | Watterson |
| 7,052,444 B2 | 5/2006 | Webber |
| 7,052,446 B2 | 5/2006 | Morris et al. |
| 7,055,899 B2 | 6/2006 | Zhurong et al. |
| 7,060,005 B2 | 6/2006 | Carlsen et al. |
| 7,060,006 B1 | 6/2006 | Watterson et al. |
| 7,060,007 B2 | 6/2006 | Juva |
| 7,060,008 B2 | 6/2006 | Watterson et al. |
| 7,060,012 B2 | 6/2006 | Howell et al. |
| 7,070,415 B2 | 7/2006 | Hojo et al. |
| 7,070,542 B2 | 7/2006 | Reyes et al. |
| 7,070,545 B2 | 7/2006 | Lull et al. |
| 7,073,852 B1 | 7/2006 | Zheng |
| 7,077,788 B2 | 7/2006 | Chang |
| 7,077,791 B2 | 7/2006 | Krull |
| 7,081,069 B2 | 7/2006 | Hsu |
| 7,081,073 B1 | 7/2006 | Smith |
| 7,082,703 B2 | 8/2006 | Greene et al. |
| 7,083,546 B2 | 8/2006 | Zillig |
| 7,083,582 B2 | 8/2006 | Chen |
| 7,086,994 B2 | 8/2006 | Turak et al. |
| 7,086,995 B2 | 8/2006 | Reyes |
| 7,090,621 B2 | 8/2006 | Loane |
| 7,090,622 B2 | 8/2006 | Hetrick |
| 7,097,591 B2 | 8/2006 | Moon |
| 7,097,593 B2 | 8/2006 | Chang |
| 7,100,517 B1 | 9/2006 | Godwin |
| 7,101,319 B1 | 9/2006 | Potts |
| 7,101,322 B2 | 9/2006 | Carle |
| 7,101,330 B2 | 9/2006 | Elbaz et al. |
| 7,104,926 B2 | 9/2006 | Carlson |
| 7,104,930 B2 | 9/2006 | Lo et al. |
| 7,104,937 B2 | 9/2006 | Arbuckle |
| 7,108,641 B2 | 9/2006 | Pertegaz-Esteban |
| 7,108,659 B2 | 9/2006 | Ross et al. |
| 7,112,161 B2 | 9/2006 | Maresh et al. |
| 7,115,073 B2 | 10/2006 | Nizamuddin |
| 7,125,369 B2 | 10/2006 | Endelman |
| 7,125,371 B2 | 10/2006 | Henderson |
| 7,132,939 B2 | 11/2006 | Tyndall et al. |
| 7,140,487 B2 | 11/2006 | Motoda |
| 7,140,626 B1 | 11/2006 | Keay |
| 7,141,005 B2 | 11/2006 | Wu |
| 7,141,008 B2 | 11/2006 | Krull et al. |
| 7,147,591 B2 | 12/2006 | McAvoy |
| 7,153,240 B1 | 12/2006 | Wu |
| 7,156,776 B2 | 1/2007 | Maser |
| 7,163,488 B2 | 1/2007 | Anders |
| 7,163,493 B1 | 1/2007 | Kuo |
| 7,163,498 B1 | 1/2007 | Abelbeck |
| 7,163,500 B2 | 1/2007 | Endelman et al. |
| 7,166,062 B1 | 1/2007 | Watterson et al. |

(56) References Cited

U.S. PATENT DOCUMENTS

| | | |
|---|---|---|
| 7,166,064 B2 | 1/2007 | Watterson et al. |
| 7,166,067 B2 | 1/2007 | Talish et al. |
| 7,168,668 B2 | 1/2007 | Coyle |
| 7,169,087 B2 | 1/2007 | Ercanbrack et al. |
| 7,169,088 B2 | 1/2007 | Rodgers, Jr. |
| 7,169,093 B2 | 1/2007 | Simonson et al. |
| 7,172,531 B2 | 2/2007 | Rodgers, Jr. |
| 7,172,536 B2 | 2/2007 | Liu |
| 7,175,193 B2 | 2/2007 | Wu |
| 7,179,204 B2 | 2/2007 | Anderson et al. |
| 7,179,207 B2 | 2/2007 | Gerschefske |
| 7,179,208 B1 | 2/2007 | Nalley |
| 7,179,209 B2 | 2/2007 | Sechrest et al. |
| 7,186,189 B2 | 3/2007 | Huang |
| 7,188,439 B2 | 3/2007 | DiBenedetto et al. |
| 7,189,190 B2 | 3/2007 | Lamar et al. |
| 7,192,387 B2 | 3/2007 | Mendel |
| 7,192,388 B2 | 3/2007 | Dalebout et al. |
| 7,195,568 B2 | 3/2007 | Huang |
| 7,196,491 B2 | 3/2007 | Mayhew et al. |
| 7,201,705 B2 | 4/2007 | Rodgers, Jr. |
| 7,201,707 B1 | 4/2007 | Moon |
| 7,204,328 B2 | 4/2007 | LoPresti |
| 7,211,029 B2 | 5/2007 | Kau |
| 7,214,167 B2 | 5/2007 | Stearns |
| 7,217,224 B2 | 5/2007 | Thomas |
| 7,217,225 B2 | 5/2007 | Husted et al. |
| 7,220,219 B2 | 5/2007 | Papadopoulos et al. |
| 7,220,221 B2 | 5/2007 | Mosimann et al. |
| 7,223,209 B2 | 5/2007 | Lee |
| 7,223,213 B2 | 5/2007 | Golesh |
| 7,223,216 B1 | 5/2007 | McBride |
| 7,225,694 B2 | 6/2007 | Said |
| 7,226,402 B1 | 6/2007 | Joya |
| 7,234,200 B2 | 6/2007 | Chase |
| 7,235,942 B2 | 6/2007 | Nagaoka et al. |
| 7,238,147 B2 | 7/2007 | Mills et al. |
| 7,247,128 B2 | 7/2007 | Oga |
| 7,250,022 B2 | 7/2007 | Dalebout |
| 7,257,468 B1 | 8/2007 | Costa et al. |
| 7,258,039 B2 | 8/2007 | Lin |
| 7,258,651 B2 | 8/2007 | Clarke |
| 7,260,950 B2 | 8/2007 | Choi et al. |
| 7,264,554 B2 | 9/2007 | Bentley |
| 7,269,038 B2 | 9/2007 | Shekhawat |
| 7,278,934 B2 | 10/2007 | McBride et al. |
| 7,278,955 B2 | 10/2007 | Giannelli et al. |
| 7,278,966 B2 * | 10/2007 | Hjelt .................. G06F 19/3418 600/300 |
| 7,279,868 B2 | 10/2007 | Lanni |
| 7,282,016 B2 | 10/2007 | Simonson |
| 7,285,075 B2 | 10/2007 | Cutler et al. |
| 7,287,770 B2 | 10/2007 | Drabant et al. |
| 7,290,760 B1 | 11/2007 | Lindsay |
| 7,291,096 B2 | 11/2007 | Ho |
| 7,291,100 B2 | 11/2007 | Dodge |
| 7,292,151 B2 | 11/2007 | Ferguson |
| 7,293,510 B1 | 11/2007 | Siao |
| 7,294,094 B1 | 11/2007 | Howle |
| 7,294,100 B2 | 11/2007 | Bull |
| 7,303,508 B2 | 12/2007 | Toyama et al. |
| 7,303,510 B2 | 12/2007 | Gebhardt |
| 7,311,640 B2 | 12/2007 | Baatz |
| 7,316,633 B2 | 1/2008 | Liao et al. |
| 7,319,457 B2 | 1/2008 | Lin et al. |
| 7,322,653 B2 | 1/2008 | Dragusin |
| 7,322,907 B2 | 1/2008 | Bowser |
| 7,329,212 B2 | 2/2008 | Roque |
| 7,331,227 B2 | 2/2008 | Kang et al. |
| 7,334,350 B2 | 2/2008 | Ellis, III |
| 7,335,135 B2 | 2/2008 | Wang |
| 7,335,139 B2 | 2/2008 | Bartholomew et al. |
| 7,335,140 B2 | 2/2008 | Webber et al. |
| 7,335,147 B2 | 2/2008 | Jones |
| 7,344,481 B2 | 3/2008 | Watterson et al. |
| 7,346,935 B1 | 3/2008 | Patterson |
| 7,347,806 B2 | 3/2008 | Nakano et al. |
| 7,351,187 B2 | 4/2008 | Seliber |
| 7,352,365 B2 | 4/2008 | Trachte |
| 7,354,380 B2 | 4/2008 | Volpe, Jr. |
| 7,357,756 B2 | 4/2008 | Demas |
| 7,357,758 B2 | 4/2008 | Polk, III |
| 7,359,121 B2 | 4/2008 | French et al. |
| 7,361,122 B2 | 4/2008 | Porth |
| 7,361,125 B2 | 4/2008 | Webber et al. |
| 7,362,016 B2 | 4/2008 | Cheng |
| 7,364,538 B2 | 4/2008 | Aucamp |
| 7,366,921 B2 | 4/2008 | Ranganathan |
| 7,367,926 B2 | 5/2008 | Clark |
| 7,367,957 B2 | 5/2008 | Huang et al. |
| 7,369,121 B2 | 5/2008 | Lane |
| 7,374,522 B2 | 5/2008 | Arnold |
| 7,377,881 B2 | 5/2008 | Moon |
| 7,377,882 B2 | 5/2008 | Watterson |
| 7,381,161 B2 | 6/2008 | Ellis |
| 7,384,013 B2 | 6/2008 | Yen |
| 7,393,308 B1 | 7/2008 | Huang |
| 7,402,145 B1 | 7/2008 | Woggon |
| 7,404,232 B2 | 7/2008 | Chase |
| 7,410,449 B2 | 8/2008 | Yeh |
| 7,413,532 B1 | 8/2008 | Monsrud et al. |
| 7,425,189 B1 | 9/2008 | Eschenbach |
| 7,428,760 B2 | 9/2008 | McCrimmon |
| 7,429,236 B2 | 9/2008 | Dalebout et al. |
| 7,432,677 B2 | 10/2008 | Heydt et al. |
| 7,435,202 B2 | 10/2008 | Daly et al. |
| 7,435,203 B2 | 10/2008 | Anderson et al. |
| 7,435,205 B2 | 10/2008 | Reyes et al. |
| 7,452,311 B2 | 11/2008 | Barnes |
| 7,455,626 B2 | 11/2008 | Trevino et al. |
| 7,455,628 B1 | 11/2008 | Stearns |
| 7,461,825 B2 | 12/2008 | Olivera |
| 7,462,135 B2 | 12/2008 | Lo |
| 7,470,219 B2 | 12/2008 | Larson |
| 7,470,234 B1 | 12/2008 | Elhag et al. |
| 7,473,211 B2 | 1/2009 | Lee |
| 7,475,613 B2 | 1/2009 | Bailey |
| 7,482,050 B2 | 1/2009 | Olson |
| 7,485,076 B2 | 2/2009 | Lee |
| 7,488,277 B1 | 2/2009 | Knapp |
| 7,491,154 B2 | 2/2009 | Yonehana et al. |
| 7,494,450 B2 | 2/2009 | Solomon |
| 7,494,454 B2 | 2/2009 | Sheets |
| 7,497,784 B2 | 3/2009 | Henry |
| 7,497,806 B2 | 3/2009 | Duncan et al. |
| 7,507,183 B2 | 3/2009 | Anderson |
| 7,507,187 B2 | 3/2009 | Dyer et al. |
| 7,507,189 B2 | 3/2009 | Krull |
| 7,510,508 B2 | 3/2009 | Santomassimo et al. |
| 7,510,511 B2 | 3/2009 | Von Detten |
| 7,511,710 B2 | 3/2009 | Barrett |
| 7,517,303 B2 | 4/2009 | Crawford et al. |
| 7,520,840 B2 | 4/2009 | Shifferaw |
| 7,524,272 B2 | 4/2009 | Bruck et al. |
| 7,525,293 B1 | 4/2009 | Notohamiprodjo et al. |
| 7,537,546 B2 | 5/2009 | Watterson et al. |
| 7,537,549 B2 | 5/2009 | Nelson et al. |
| 7,537,550 B1 | 5/2009 | Krull |
| 7,537,552 B2 | 5/2009 | Dalebout et al. |
| 7,540,828 B2 | 6/2009 | Watterson et al. |
| 7,540,829 B1 | 6/2009 | Lin |
| 7,542,040 B2 | 6/2009 | Templeman |
| 7,544,153 B2 | 6/2009 | Trevino et al. |
| 7,547,255 B2 | 6/2009 | Lochtefeld et al. |
| 7,549,938 B2 | 6/2009 | Leighton et al. |
| 7,549,947 B2 | 6/2009 | Hickman et al. |
| 7,553,260 B2 | 6/2009 | Piaget et al. |
| 7,553,262 B2 | 6/2009 | Piane, Jr. |
| 7,556,590 B2 | 7/2009 | Watterson et al. |
| 7,556,591 B2 | 7/2009 | Chuang |
| 7,559,879 B2 | 7/2009 | Anderson et al. |
| 7,563,203 B2 | 7/2009 | Dalebout et al. |
| 7,563,205 B2 | 7/2009 | Alling |
| 7,563,235 B2 | 7/2009 | Der Meer |

(56) References Cited

U.S. PATENT DOCUMENTS

| | | |
|---|---|---|
| 7,569,000 B2 | 8/2009 | Wang |
| 7,569,004 B2 | 8/2009 | Kolomeir |
| 7,572,206 B2 | 8/2009 | Wilkins et al. |
| 7,575,537 B2 | 8/2009 | Ellis |
| 7,578,771 B1 | 8/2009 | Towley, III et al. |
| 7,585,251 B2 | 9/2009 | Doody, Jr. et al. |
| 7,585,254 B1 | 9/2009 | Vittone |
| 7,585,258 B2 | 9/2009 | Watson et al. |
| 7,588,520 B2 | 9/2009 | Nalley |
| 7,591,770 B2 | 9/2009 | Stewart et al. |
| 7,591,795 B2 | 9/2009 | Whalen et al. |
| 7,594,877 B2 | 9/2009 | Anderson et al. |
| 7,594,878 B1 | 9/2009 | Joannou |
| 7,594,880 B2 | 9/2009 | Webber |
| 7,601,101 B2 | 10/2009 | Jackson et al. |
| 7,601,105 B1 | 10/2009 | Gipson, III et al. |
| 7,602,301 B1 | 10/2009 | Stirling et al. |
| 7,604,571 B2 | 10/2009 | Wilkins et al. |
| 7,604,572 B2 | 10/2009 | Stanford |
| 7,604,573 B2 | 10/2009 | Dalebout et al. |
| 7,608,015 B2 | 10/2009 | Radow |
| 7,608,021 B1 | 10/2009 | Nalley |
| 7,608,023 B2 | 10/2009 | Casagrande |
| 7,608,028 B2 | 10/2009 | Pertegaz-Esteban |
| 7,614,639 B2 | 11/2009 | Tholkes et al. |
| 7,614,981 B2 | 11/2009 | Cao |
| 7,614,991 B2 | 11/2009 | Fox |
| 7,618,345 B2 | 11/2009 | Corbalis et al. |
| 7,618,350 B2 | 11/2009 | Dalebout et al. |
| 7,621,850 B2 | 11/2009 | Piaget et al. |
| 7,621,855 B1 | 11/2009 | Krull |
| 7,625,314 B2 | 12/2009 | Ungari et al. |
| 7,625,315 B2 | 12/2009 | Hickman |
| 7,625,319 B2 | 12/2009 | Kang et al. |
| 7,625,321 B2 | 12/2009 | Simonson et al. |
| 7,628,730 B1 | 12/2009 | Watterson et al. |
| 7,628,732 B1 | 12/2009 | Porszasz et al. |
| 7,628,733 B2 | 12/2009 | Donner |
| 7,628,737 B2 | 12/2009 | Kowallis et al. |
| 7,630,201 B2 | 12/2009 | Asahi |
| 7,637,847 B1 | 12/2009 | Hickman |
| 7,637,850 B2 | 12/2009 | Lin |
| 7,639,520 B1 | 12/2009 | Zansky et al. |
| 7,645,212 B2 | 1/2010 | Ashby et al. |
| 7,645,214 B2 | 1/2010 | Lull |
| 7,645,215 B2 | 1/2010 | Gordon |
| 7,645,218 B2 | 1/2010 | Potok et al. |
| 7,647,196 B2 | 1/2010 | Kahn et al. |
| 7,648,441 B2 | 1/2010 | Silk |
| 7,648,443 B2 | 1/2010 | Schenk |
| 7,648,446 B2 | 1/2010 | Chiles et al. |
| 7,650,987 B2 | 1/2010 | Taniguchi et al. |
| 7,651,442 B2 | 1/2010 | Carlson |
| 7,651,450 B2 | 1/2010 | Wehrell |
| 7,654,229 B2 | 2/2010 | Smith |
| 7,654,938 B2 | 2/2010 | Webber et al. |
| 7,658,694 B2 | 2/2010 | Ungari |
| 7,658,695 B1 | 2/2010 | Amsbury et al. |
| 7,658,698 B2 | 2/2010 | Pacheco et al. |
| 7,665,794 B2 | 2/2010 | Kachouh |
| 7,670,263 B2 | 3/2010 | Ellis |
| 7,674,205 B2 | 3/2010 | Dalebout et al. |
| 7,674,206 B2 | 3/2010 | Jones |
| 7,677,518 B2 | 3/2010 | Chouinard et al. |
| 7,682,286 B2 | 3/2010 | Badarneh et al. |
| 7,682,287 B1 | 3/2010 | Hsieh |
| 7,682,290 B2 | 3/2010 | Liao et al. |
| 7,682,291 B2 | 3/2010 | Gill et al. |
| 7,686,742 B2 | 3/2010 | Tischler |
| 7,690,317 B2 | 4/2010 | Beck et al. |
| 7,690,556 B1 | 4/2010 | Kahn et al. |
| 7,691,031 B2 | 4/2010 | Toyama et al. |
| 7,691,069 B2 | 4/2010 | Adams |
| 7,695,406 B2 | 4/2010 | Waters |
| 7,695,409 B2 | 4/2010 | Decathlon |
| 7,704,191 B2 | 4/2010 | Smith et al. |
| 7,704,192 B2 | 4/2010 | Dyer et al. |
| 7,704,199 B2 | 4/2010 | Koch |
| 7,706,547 B2 | 4/2010 | Luo |
| 7,708,668 B2 | 5/2010 | Rodgers, Jr. |
| 7,708,670 B2 | 5/2010 | Bowser |
| 7,708,672 B2 | 5/2010 | Gibson et al. |
| 7,713,172 B2 | 5/2010 | Watterson et al. |
| 7,713,177 B2 | 5/2010 | Lo |
| 7,717,826 B2 | 5/2010 | Cox et al. |
| 7,717,827 B2 | 5/2010 | Kurunmäki et al. |
| 7,717,828 B2 | 5/2010 | Simonson et al. |
| 7,717,829 B2 | 5/2010 | Wang |
| 7,717,830 B1 | 5/2010 | Charniga et al. |
| 7,722,503 B1 | 5/2010 | Smith et al. |
| 7,722,507 B2 | 5/2010 | Yoo |
| 7,722,509 B2 | 5/2010 | Eder |
| 7,731,634 B2 | 6/2010 | Stewart et al. |
| 7,731,635 B2 | 6/2010 | Dyer |
| 7,736,272 B2 | 6/2010 | Martens |
| 7,736,273 B2 | 6/2010 | Cox et al. |
| 7,736,279 B2 | 6/2010 | Dalebout et al. |
| 7,736,280 B2 | 6/2010 | Weier et al. |
| 7,736,281 B2 | 6/2010 | Corbalis et al. |
| 7,740,562 B2 | 6/2010 | Jones |
| 7,740,563 B2 | 6/2010 | Dalebout et al. |
| 7,741,975 B2 | 6/2010 | Shum et al. |
| 7,745,716 B1 | 6/2010 | Murphy |
| 7,749,137 B2 | 7/2010 | Watt et al. |
| 7,749,138 B2 | 7/2010 | Wang |
| 7,753,824 B2 | 7/2010 | Wang |
| 7,753,830 B1 | 7/2010 | Marsh et al. |
| 7,753,861 B1 | 7/2010 | Kahn et al. |
| 7,757,346 B2 | 7/2010 | Chase |
| 7,758,470 B2 | 7/2010 | Hirata et al. |
| 7,758,478 B2 | 7/2010 | Golesh et al. |
| 7,761,212 B2 | 7/2010 | Takebayashi |
| 7,762,935 B2 | 7/2010 | Doble |
| 7,762,952 B2 | 7/2010 | Lee et al. |
| 7,764,641 B2 | 7/2010 | Pelton et al. |
| 7,764,990 B2 | 7/2010 | Martikka et al. |
| 7,766,797 B2 | 8/2010 | Dalebout |
| 7,771,319 B1 | 8/2010 | Lannon |
| 7,771,320 B2 | 8/2010 | Riley et al. |
| 7,771,329 B2 | 8/2010 | Dalebout et al. |
| 7,771,371 B2 | 8/2010 | Avni |
| 7,775,128 B2 | 8/2010 | Roessingh et al. |
| 7,775,936 B2 | 8/2010 | Wilkinson |
| 7,775,943 B2 | 8/2010 | Vittone |
| 7,780,577 B2 | 8/2010 | Arnold |
| 7,780,578 B2 | 8/2010 | Packham |
| 7,785,232 B2 | 8/2010 | Cole et al. |
| 7,789,800 B1 | 9/2010 | Watterson et al. |
| 7,794,363 B2 | 9/2010 | Wang |
| 7,795,824 B2 | 9/2010 | Shen et al. |
| 7,798,946 B2 | 9/2010 | Dalebout et al. |
| 7,805,186 B2 | 9/2010 | Pulkkinen et al. |
| 7,806,006 B2 | 10/2010 | Phillips et al. |
| 7,806,589 B2 | 10/2010 | Tashman |
| 7,806,780 B1 | 10/2010 | Plunkett |
| 7,806,805 B2 | 10/2010 | Barufka et al. |
| 7,811,209 B2 | 10/2010 | Crawford et al. |
| 7,815,548 B2 | 10/2010 | Barre |
| 7,815,549 B2 | 10/2010 | Crawford et al. |
| 7,815,550 B2 | 10/2010 | Watterson et al. |
| 7,815,552 B2 | 10/2010 | Dibble et al. |
| 7,815,554 B2 | 10/2010 | Gibson et al. |
| 7,819,779 B2 | 10/2010 | Chang |
| 7,825,319 B2 | 11/2010 | Turner |
| 7,828,699 B2 | 11/2010 | P Erez De Lazarraga |
| 7,833,135 B2 | 11/2010 | Radow |
| 7,837,161 B2 | 11/2010 | Chase |
| 7,837,595 B2 | 11/2010 | Rice |
| 7,839,058 B1 | 11/2010 | Churchill et al. |
| 7,846,070 B2 | 12/2010 | Oglesby et al. |
| 7,850,514 B2 | 12/2010 | Weber |
| 7,850,537 B2 | 12/2010 | Stern |
| 7,854,669 B2 | 12/2010 | Marty et al. |
| 7,854,690 B2 | 12/2010 | Trevino et al. |

(56) References Cited

U.S. PATENT DOCUMENTS

| | | | |
|---|---|---|---|
| 7,862,475 B2 | 1/2011 | Watterson |
| 7,862,483 B2 | 1/2011 | Hendrickson et al. |
| 7,862,489 B2 | 1/2011 | Savsek |
| 7,871,355 B2 | 1/2011 | Yeh |
| 7,871,357 B2 | 1/2011 | Gibson et al. |
| 7,873,849 B2 | 1/2011 | Mucignat et al. |
| 7,874,963 B2 | 1/2011 | Grind |
| 7,878,950 B1 | 2/2011 | Bastian |
| 7,878,956 B2 | 2/2011 | Kadar |
| 7,883,448 B2 | 2/2011 | Wang |
| 7,887,465 B2 | 2/2011 | Uffelman |
| 7,887,470 B2 | 2/2011 | Chen |
| 7,892,148 B1 | 2/2011 | Stauffer et al. |
| 7,892,149 B2 | 2/2011 | Wu |
| 7,892,150 B1 | 2/2011 | Colley |
| 7,892,155 B2 | 2/2011 | Pearson et al. |
| 7,892,159 B2 | 2/2011 | McVay et al. |
| 7,901,324 B2 | 3/2011 | Kodama |
| 7,901,325 B2 | 3/2011 | Henderson |
| 7,901,753 B2 | 3/2011 | Carr |
| 7,905,817 B2 | 3/2011 | Giannascoli et al. |
| 7,908,981 B2 | 3/2011 | Agee |
| 7,909,740 B2 | 3/2011 | Dalebout et al. |
| 7,914,420 B2 | 3/2011 | Daly et al. |
| 7,914,421 B2 | 3/2011 | Weier et al. |
| 7,918,768 B2 | 4/2011 | Rogozinski |
| 7,919,950 B2 | 4/2011 | Uno et al. |
| 7,922,635 B2 | 4/2011 | Lull et al. |
| 7,927,253 B2 | 4/2011 | Vincent |
| 7,927,257 B2 | 4/2011 | Patel |
| 7,927,267 B2 | 4/2011 | Splane |
| 7,931,563 B2 | 4/2011 | Shaw et al. |
| 7,938,751 B2 | 5/2011 | Nicolas et al. |
| 7,938,755 B1 | 5/2011 | Dyer et al. |
| 7,941,945 B2 | 5/2011 | Gerber |
| 7,942,783 B2 | 5/2011 | Ochi |
| 7,942,788 B2 | 5/2011 | Wu |
| 7,946,967 B2 | 5/2011 | Berhanu |
| 7,946,968 B2 | 5/2011 | Kjellberg |
| 7,949,295 B2 | 5/2011 | Kumar et al. |
| 7,951,046 B1 | 5/2011 | Barber, Jr. |
| 7,959,124 B2 | 6/2011 | Phifer et al. |
| 7,967,728 B2 | 6/2011 | Zavadsky |
| 7,967,730 B2 | 6/2011 | Crawford et al. |
| 7,972,245 B2 | 7/2011 | Temple et al. |
| 7,972,249 B1 | 7/2011 | Napalan |
| 7,976,437 B1 | 7/2011 | Von Detten |
| 7,978,081 B2 | 7/2011 | Shears et al. |
| 7,985,164 B2 | 7/2011 | Ashby |
| 7,985,166 B2 | 7/2011 | Farnsworth et al. |
| 7,988,600 B2 | 8/2011 | Rodgers, Jr. |
| 7,992,879 B2 | 8/2011 | Eisenberg et al. |
| 8,001,472 B2 | 8/2011 | Gilley et al. |
| 8,002,674 B2 | 8/2011 | Piaget et al. |
| 8,002,684 B2 | 8/2011 | Laurent |
| 8,006,574 B2 | 8/2011 | Meyer |
| 8,007,407 B2 | 8/2011 | Richter |
| 8,007,409 B2 | 8/2011 | Elllis |
| 8,007,422 B2 | 8/2011 | Zaccherini |
| 8,009,045 B2 | 8/2011 | Cehelnik |
| 8,011,242 B2 | 9/2011 | O'neill |
| 8,012,003 B2 | 9/2011 | Sterchi et al. |
| 8,012,067 B2 | 9/2011 | Joannou |
| 8,012,068 B1 | 9/2011 | Malcolm |
| 8,021,277 B2 | 9/2011 | Baudhuin |
| 8,025,609 B2 | 9/2011 | Giannelli et al. |
| 8,029,415 B2 | 10/2011 | Ashby et al. |
| 8,029,418 B2 | 10/2011 | Nishimura |
| 8,033,959 B2 | 10/2011 | Oleson et al. |
| 8,033,960 B1 | 10/2011 | Dalebout et al. |
| 8,037,574 B2 | 10/2011 | Chase |
| 8,038,117 B2 | 10/2011 | Chen et al. |
| 8,038,577 B2 | 10/2011 | Mcintosh |
| 8,040,117 B2 | 10/2011 | Telefus |
| 8,043,173 B2 | 10/2011 | Menalagha et al. |
| 8,047,965 B2 | 11/2011 | Shea |
| 8,047,966 B2 | 11/2011 | Dorogusker et al. |
| 8,047,970 B2 | 11/2011 | Nalley |
| 8,055,469 B2 | 11/2011 | Kulach et al. |
| 8,057,366 B2 | 11/2011 | Schippers |
| 8,057,368 B1 | 11/2011 | Lyszczarz |
| 8,062,196 B1 | 11/2011 | Khubani |
| 8,063,776 B2 | 11/2011 | Ruha |
| 8,065,926 B2 | 11/2011 | Meyer |
| 8,066,514 B2 | 11/2011 | Clarke |
| 8,070,657 B2 | 12/2011 | Loach |
| 8,072,902 B2 | 12/2011 | Moon |
| 8,075,453 B1* | 12/2011 | Wilkinson ............ A63B 21/153 482/51 |
| 8,079,937 B2 | 12/2011 | Bedell |
| 8,079,939 B1 | 12/2011 | Wang |
| 8,082,029 B2 | 12/2011 | Honda |
| 8,083,645 B2 | 12/2011 | Asukai et al. |
| 8,083,693 B1 | 12/2011 | McKeon et al. |
| 8,088,044 B2 | 1/2012 | Tchao et al. |
| 8,092,352 B2 | 1/2012 | Irving et al. |
| 8,096,925 B2 | 1/2012 | Radding et al. |
| 8,103,379 B2 | 1/2012 | Biba et al. |
| 8,103,517 B2 | 1/2012 | Hinnebusch |
| 8,104,411 B2 | 1/2012 | Fenton |
| 8,105,213 B2 | 1/2012 | Stewart et al. |
| 8,109,858 B2 | 2/2012 | Redmann |
| 8,109,864 B2 | 2/2012 | Tseng |
| 8,113,990 B2 | 2/2012 | Kolman et al. |
| 8,113,994 B2 | 2/2012 | Piaget et al. |
| 8,118,709 B2 | 2/2012 | Mckirdy |
| 8,118,888 B2 | 2/2012 | Molter |
| 8,123,527 B2 | 2/2012 | Holljes |
| 8,141,276 B2 | 3/2012 | Ellis |
| 8,147,385 B2 | 4/2012 | Crawford et al. |
| 8,152,702 B2 | 4/2012 | Pacheco |
| 8,157,708 B2 | 4/2012 | Daly |
| 8,162,769 B2 | 4/2012 | Henry |
| 8,162,804 B2 | 4/2012 | Tagliabue |
| 8,172,729 B2 | 5/2012 | Ellis |
| 8,177,688 B2 | 5/2012 | Burnfield et al. |
| 8,182,399 B2 | 5/2012 | Davis et al. |
| 8,188,700 B2 | 5/2012 | Tseng et al. |
| 8,192,332 B2 | 6/2012 | Baker et al. |
| 8,192,338 B2 | 6/2012 | Solow |
| 8,200,323 B2 | 6/2012 | Dibenedetto et al. |
| 8,206,266 B2 | 6/2012 | Hall |
| 8,221,290 B2 | 7/2012 | Vincent et al. |
| 8,221,295 B2 | 7/2012 | Wilkins |
| 8,235,724 B2 | 8/2012 | Gilley et al. |
| 8,240,430 B2 | 8/2012 | Downey |
| 8,241,182 B2 | 8/2012 | Julskjaer et al. |
| 8,241,186 B2 | 8/2012 | Brodess et al. |
| 8,241,187 B2 | 8/2012 | Moon et al. |
| 8,251,874 B2 | 8/2012 | Ashby et al. |
| 8,257,232 B2 | 9/2012 | Thierry |
| 8,260,858 B2 | 9/2012 | Belz et al. |
| 8,272,996 B2 | 9/2012 | Weier |
| 8,275,265 B2 | 9/2012 | Kobyakov et al. |
| 8,280,259 B2 | 10/2012 | George et al. |
| 8,298,125 B2 | 10/2012 | Colledge et al. |
| 8,302,213 B2 | 11/2012 | Kriesel |
| 8,306,635 B2 | 11/2012 | Pryor |
| 8,308,618 B2 | 11/2012 | Bayerlein |
| 8,309,870 B2 | 11/2012 | Peterson et al. |
| 8,310,468 B2 | 11/2012 | Martin |
| 8,315,636 B2 | 11/2012 | Moon et al. |
| 8,315,823 B2 | 11/2012 | Berme et al. |
| 8,317,663 B2 | 11/2012 | Stewart et al. |
| 8,320,578 B2 | 11/2012 | Kahn et al. |
| 8,323,156 B2 | 12/2012 | Ozawa et al. |
| 8,323,157 B2 | 12/2012 | Campanaro et al. |
| 8,329,265 B2 | 12/2012 | Cook |
| 8,333,681 B2 | 12/2012 | Schmidt |
| 8,343,016 B1 | 1/2013 | Astilean |
| 8,360,904 B2 | 1/2013 | Oleson et al. |
| 8,360,935 B2 | 1/2013 | Olsen et al. |
| 8,360,936 B2 | 1/2013 | Dibenedetto et al. |
| 8,368,329 B1 | 2/2013 | Depew et al. |

(56) References Cited

U.S. PATENT DOCUMENTS

| | | |
|---|---|---|
| 8,376,911 B2 | 2/2013 | Ogg et al. |
| 8,378,647 B2 | 2/2013 | Yonezawa et al. |
| 8,394,005 B2 | 3/2013 | Solow et al. |
| 8,395,366 B2 | 3/2013 | Uno |
| 8,398,529 B2 | 3/2013 | Ellis |
| 8,403,816 B2 | 3/2013 | Park |
| 8,429,223 B2 | 4/2013 | Gilley et al. |
| 8,435,160 B1 | 5/2013 | Clum |
| 8,446,275 B2 | 5/2013 | Utter, II |
| 8,449,620 B2 | 5/2013 | Hakansson et al. |
| 8,459,479 B2 | 6/2013 | Yourist |
| 8,467,979 B2 | 6/2013 | Sobolewski |
| 8,475,346 B2 | 7/2013 | Gerschefske et al. |
| 8,475,367 B1 | 7/2013 | Yuen et al. |
| 8,480,541 B1 | 7/2013 | Brunts |
| 8,485,944 B2 | 7/2013 | Drazan |
| 8,485,945 B2 | 7/2013 | Leonhard |
| 8,487,759 B2 | 7/2013 | Hill |
| 8,493,757 B2 | 7/2013 | Carletti et al. |
| 8,505,597 B2 | 8/2013 | Sharperson |
| 8,506,370 B2 | 8/2013 | Homsi |
| 8,506,459 B2 | 8/2013 | Cassidy et al. |
| 8,512,209 B2 | 8/2013 | Guidi et al. |
| 8,512,210 B2 | 8/2013 | Shauli |
| 8,516,723 B2 | 8/2013 | Ferrigan et al. |
| 8,527,101 B2 | 9/2013 | Burris et al. |
| 8,533,620 B2 | 9/2013 | Hoffman et al. |
| 8,535,247 B2 | 9/2013 | Williams |
| 8,537,017 B2 | 9/2013 | Mack et al. |
| 8,540,607 B2 | 9/2013 | Kissel et al. |
| 8,550,962 B2 | 10/2013 | Piaget et al. |
| 8,552,859 B2 | 10/2013 | Pakula et al. |
| 8,556,090 B2 | 10/2013 | Chen |
| 8,562,489 B2 | 10/2013 | Burton et al. |
| 8,564,235 B2 | 10/2013 | Burris et al. |
| 8,569,963 B2 | 10/2013 | Walters |
| 8,571,250 B2 | 10/2013 | Royer |
| 8,573,982 B1 | 11/2013 | Chuang |
| 8,574,131 B2 | 11/2013 | Daly |
| 8,585,561 B2 | 11/2013 | Watt et al. |
| 8,602,951 B2 | 12/2013 | Morris |
| 8,608,624 B2 | 12/2013 | Shabodyash et al. |
| 8,613,689 B2 | 12/2013 | Eyer et al. |
| 8,614,595 B2 | 12/2013 | Acatrinei |
| 8,614,902 B2 | 12/2013 | Pansier et al. |
| 8,615,377 B1 | 12/2013 | Yuen et al. |
| 8,617,008 B2 | 12/2013 | Marty et al. |
| 8,622,747 B2 | 1/2014 | Chu et al. |
| 8,647,240 B2 | 2/2014 | Heidecke |
| 8,651,030 B2 | 2/2014 | Coffman |
| 8,655,004 B2 | 2/2014 | Prest et al. |
| 8,657,724 B2 | 2/2014 | Yang |
| 8,671,853 B2 | 3/2014 | Flaherty |
| 8,678,897 B2 | 3/2014 | Englert et al. |
| 8,690,578 B1 | 4/2014 | Nusbaum et al. |
| 8,690,735 B2 | 4/2014 | Watterson et al. |
| 8,690,738 B1 | 4/2014 | Astilian |
| 8,701,567 B1 | 4/2014 | Esfandiari et al. |
| 8,702,430 B2 | 4/2014 | Dibenedetto et al. |
| 8,702,567 B2 | 4/2014 | Hu |
| 8,706,530 B2 | 4/2014 | Ohnemus et al. |
| 8,708,870 B2 | 4/2014 | Nalley |
| 8,714,346 B2 | 5/2014 | Freitag |
| 8,727,946 B2 | 5/2014 | Greenhill et al. |
| 8,727,947 B2 | 5/2014 | Tagliabue |
| 8,734,157 B1 | 5/2014 | Hummel, III |
| 8,734,301 B2 | 5/2014 | Remelius |
| 8,734,302 B2 | 5/2014 | Hsieh |
| 8,738,321 B2 | 5/2014 | Yuen et al. |
| 8,739,974 B2 | 6/2014 | TeVault et al. |
| 8,740,753 B2 | 6/2014 | Olson et al. |
| 8,740,756 B2 | 6/2014 | Shabodyash et al. |
| 8,747,285 B2 | 6/2014 | Hof |
| 8,749,380 B2 | 6/2014 | Vock et al. |
| 8,758,201 B2 | 6/2014 | Ashby et al. |
| 8,762,077 B2 | 6/2014 | Redmond |
| 8,762,101 B2 | 6/2014 | Yuen et al. |
| 8,764,609 B1 | 7/2014 | Elahmadie |
| 8,771,153 B2 | 7/2014 | Dalebout et al. |
| 8,777,820 B2 | 7/2014 | Lo |
| 8,783,326 B1 | 7/2014 | Vaninger et al. |
| 8,784,274 B1 | 7/2014 | Chuang |
| 8,784,275 B2 | 7/2014 | Mikan |
| 8,784,278 B2 | 7/2014 | Flake |
| 8,786,575 B2 | 7/2014 | Miller |
| 8,790,222 B2 | 7/2014 | Burger |
| 8,801,578 B2 | 8/2014 | Corbalis et al. |
| 8,801,581 B2 | 8/2014 | Lai et al. |
| 8,801,582 B2 | 8/2014 | Huang et al. |
| 8,814,762 B2 | 8/2014 | Butler |
| 8,821,350 B2 | 9/2014 | Maertz |
| 8,821,870 B2 | 9/2014 | Robinson et al. |
| 8,823,314 B2 | 9/2014 | Lumsden et al. |
| 8,824,166 B2 | 9/2014 | Rohrbach |
| 8,824,697 B2 | 9/2014 | Christoph |
| 8,825,445 B2 | 9/2014 | Hoffman et al. |
| 8,837,174 B2 | 9/2014 | Hosotani |
| 8,839,725 B2 | 9/2014 | Kooistra |
| 8,840,075 B2 | 9/2014 | Olson |
| 8,840,569 B2 | 9/2014 | Flaction et al. |
| 8,845,498 B2 | 9/2014 | Webb |
| 8,847,988 B2 | 9/2014 | Geisner et al. |
| 8,851,565 B2 | 10/2014 | Hontz et al. |
| 8,858,409 B2 | 10/2014 | Trees |
| 8,864,627 B2 | 10/2014 | Bayerlein et al. |
| 8,876,661 B2 | 11/2014 | Lu |
| 8,876,668 B2 | 11/2014 | Hendrickson et al. |
| 8,888,660 B1 | 11/2014 | Oteman |
| 8,892,999 B2 | 11/2014 | Nims et al. |
| 8,894,549 B2 | 11/2014 | Colledge |
| 8,894,551 B2 | 11/2014 | Kerdjoudj |
| 8,913,409 B2 | 12/2014 | Hui et al. |
| 8,920,288 B2 | 12/2014 | Dalebout |
| 8,920,291 B2 | 12/2014 | Chen et al. |
| 8,920,347 B2 | 12/2014 | Bayerlein |
| 8,922,498 B2 | 12/2014 | Vesely |
| 8,926,475 B2 | 1/2015 | Lin et al. |
| 8,926,479 B2 | 1/2015 | Chen et al. |
| 8,956,290 B2 | 2/2015 | Gilley et al. |
| 8,956,715 B2 | 2/2015 | Kim |
| 8,961,439 B2 | 2/2015 | Yang et al. |
| 8,968,163 B1 | 3/2015 | Vidmar |
| 8,979,709 B2 | 3/2015 | Toback et al. |
| 8,986,165 B2 | 3/2015 | Ashby |
| 8,986,807 B2 | 3/2015 | Rodgers |
| 8,986,808 B2 | 3/2015 | George |
| 8,990,732 B2 | 3/2015 | Farrenkopf et al. |
| 8,996,978 B2 | 3/2015 | Richstein et al. |
| 9,005,085 B2 | 4/2015 | Astilean |
| 9,008,973 B2 | 4/2015 | French |
| 9,011,291 B2 | 4/2015 | Birrell |
| 9,015,952 B2 | 4/2015 | Magosaki |
| 9,028,368 B2 | 5/2015 | Ashby et al. |
| 9,033,137 B2 | 5/2015 | Koppes et al. |
| 9,033,712 B2 | 5/2015 | Vasin |
| 9,038,218 B1 | 5/2015 | Heil et al. |
| 9,039,578 B2 | 5/2015 | Dalebout |
| 9,044,637 B2 | 6/2015 | Karl |
| 9,050,486 B2 | 6/2015 | Reed |
| 9,050,491 B2 | 6/2015 | Gordon et al. |
| 9,050,498 B2 | 6/2015 | Lu et al. |
| 9,063,026 B2 | 6/2015 | Nassef |
| 9,072,930 B2 | 7/2015 | Ashby et al. |
| 9,072,932 B2 | 7/2015 | Piaget et al. |
| 9,072,941 B2 | 7/2015 | Duda et al. |
| 9,081,534 B2 | 7/2015 | Yuen et al. |
| 9,081,889 B2 | 7/2015 | Ingrassia et al. |
| 9,083,245 B2 | 7/2015 | Zhao et al. |
| 9,084,565 B2 | 7/2015 | Mason et al. |
| 9,084,712 B2 | 7/2015 | Roerdink et al. |
| 9,089,732 B2 | 7/2015 | Andon et al. |
| 9,091,008 B2 | 7/2015 | Mathieu |
| 9,095,740 B2 | 8/2015 | Wu |
| 9,108,079 B2 | 8/2015 | Solow et al. |

(56) References Cited

U.S. PATENT DOCUMENTS

| | | |
|---|---|---|
| 9,108,081 B2 | 8/2015 | Giannelli et al. |
| 9,114,275 B2 | 8/2015 | Lu et al. |
| 9,114,276 B2 | 8/2015 | Bayerlein et al. |
| 9,119,983 B2 | 9/2015 | Rhea |
| 9,119,988 B2 | 9/2015 | Murray |
| 9,125,620 B2 | 9/2015 | Walke |
| 9,126,071 B2 | 9/2015 | Smith |
| 9,126,072 B2 | 9/2015 | Watterson |
| 9,132,051 B2 | 9/2015 | Heil |
| 9,135,347 B2 | 9/2015 | Damman et al. |
| 9,138,614 B2 | 9/2015 | Lu et al. |
| 9,138,615 B2 | 9/2015 | Olson et al. |
| 9,144,703 B2 | 9/2015 | Dalebout et al. |
| 9,148,077 B2 | 9/2015 | Henderson |
| 9,149,683 B2 | 9/2015 | Smith |
| 9,162,102 B1 | 10/2015 | Eder et al. |
| 9,162,106 B1 | 10/2015 | Scheiman |
| 9,168,414 B2 | 10/2015 | Liu et al. |
| 9,174,085 B2 | 11/2015 | Foley |
| 9,186,537 B2 | 11/2015 | Arnold et al. |
| 9,186,549 B2 | 11/2015 | Watterson et al. |
| 9,186,552 B1 | 11/2015 | Deal |
| 9,192,800 B1 | 11/2015 | Meyer et al. |
| 9,198,622 B2 | 12/2015 | Kaleal et al. |
| 9,199,115 B2 | 12/2015 | Yim et al. |
| 9,199,123 B2 | 12/2015 | Solow |
| 9,201,458 B2 | 12/2015 | Hunt et al. |
| 9,220,940 B2 | 12/2015 | Al Kuwari |
| 9,221,545 B2 | 12/2015 | Popescu et al. |
| 9,223,936 B2 | 12/2015 | Aragones et al. |
| 9,224,291 B2 | 12/2015 | Moll-Carrillo et al. |
| 9,226,692 B2 | 1/2016 | Haas |
| 9,227,101 B2 | 1/2016 | Maguire |
| 9,233,272 B2 | 1/2016 | Villani |
| 9,242,139 B2 | 1/2016 | Holley |
| 9,242,142 B2 | 1/2016 | Vincent et al. |
| 9,254,409 B2 | 2/2016 | Dalebout et al. |
| 9,256,711 B2 | 2/2016 | Horseman |
| 9,257,054 B2 | 2/2016 | Coza et al. |
| 9,263,967 B2 | 2/2016 | McCune |
| 9,278,248 B2 | 3/2016 | Tyger |
| 9,283,431 B2 | 3/2016 | Marty |
| 9,289,063 B2 | 3/2016 | Baugh et al. |
| 9,289,648 B2 | 3/2016 | Watterson |
| 9,289,674 B2 | 3/2016 | Winsper et al. |
| 9,292,935 B2 | 3/2016 | Koduri et al. |
| 9,308,415 B2 | 4/2016 | Crawford et al. |
| 9,308,417 B2 | 4/2016 | Grundy |
| 9,311,802 B1 | 4/2016 | Chin et al. |
| 9,317,660 B2 | 4/2016 | Burich et al. |
| 9,330,239 B2 | 5/2016 | Koduri et al. |
| 9,330,544 B2 | 5/2016 | Levesque et al. |
| 9,333,388 B2 | 5/2016 | Lee et al. |
| 9,339,681 B1 | 5/2016 | Nalley |
| 9,339,683 B2 | 5/2016 | Dilli et al. |
| 9,352,185 B2 | 5/2016 | Hendrickson et al. |
| 9,352,186 B2 | 5/2016 | Watterson |
| 9,352,187 B2 | 5/2016 | Piaget et al. |
| 9,357,551 B2 | 5/2016 | Gutman |
| 9,358,422 B2 | 6/2016 | Brontman |
| 9,364,706 B2 | 6/2016 | Lo |
| 9,364,708 B2 | 6/2016 | Luger et al. |
| 9,364,714 B2 | 6/2016 | Koduri et al. |
| 9,367,668 B2 | 6/2016 | Flynt et al. |
| 9,369,178 B2 | 6/2016 | Matsutani |
| 9,370,687 B2 | 6/2016 | Hao |
| 9,370,691 B2 | 6/2016 | Nissila et al. |
| 9,375,605 B2 | 6/2016 | Tyger |
| 9,378,336 B2 | 6/2016 | Ohnemus et al. |
| 9,387,387 B2 | 7/2016 | Dalebout |
| 9,389,718 B1 | 7/2016 | Letourneur |
| 9,392,941 B2 | 7/2016 | Powch et al. |
| 9,393,453 B2 | 7/2016 | Watterson |
| 9,403,047 B2 | 8/2016 | Olson |
| 9,403,051 B2 | 8/2016 | Cutler |
| 9,409,050 B2 | 8/2016 | Mintz |
| 9,411,940 B2 | 8/2016 | Burroughs et al. |
| 9,415,257 B2 | 8/2016 | Habing |
| 9,427,615 B2 | 8/2016 | Pretz et al. |
| 9,452,315 B1 | 9/2016 | Murray et al. |
| 9,452,320 B2 | 9/2016 | Yang |
| 9,455,623 B2 | 9/2016 | Fan et al. |
| 9,455,784 B2 | 9/2016 | Cune et al. |
| 9,457,219 B2 | 10/2016 | Smith |
| 9,457,220 B2 | 10/2016 | Olson |
| 9,457,224 B2 | 10/2016 | Giannelli et al. |
| 9,457,256 B2 | 10/2016 | Aragones et al. |
| 9,463,349 B1 | 10/2016 | Chang |
| 9,480,874 B2 | 11/2016 | Cutler |
| 9,486,658 B2 | 11/2016 | Alexander |
| 9,492,704 B2 | 11/2016 | Mortensen et al. |
| 9,498,668 B2 | 11/2016 | Smith |
| 9,498,671 B1 | 11/2016 | Softky |
| 9,505,241 B2 | 11/2016 | Bobst |
| 9,511,254 B2 | 12/2016 | Netter |
| 9,511,259 B2 | 12/2016 | Mountain |
| 9,511,864 B2 | 12/2016 | Simpson |
| 9,517,378 B2 | 12/2016 | Ashby et al. |
| 9,521,901 B2 | 12/2016 | Dalebout |
| 9,533,187 B2 | 1/2017 | Dalebout |
| 9,539,458 B1 | 1/2017 | Ross |
| 9,539,461 B2 | 1/2017 | Ercanbrack |
| 9,540,071 B2 | 1/2017 | Jordan et al. |
| 9,540,174 B2 | 1/2017 | Josserond et al. |
| 9,545,541 B2 | 1/2017 | Aragones et al. |
| 9,550,091 B2 | 1/2017 | Emerson |
| 9,560,917 B2 | 2/2017 | Roslund, Jr. |
| 9,569,986 B2 | 2/2017 | Levine et al. |
| 9,573,017 B2 | 2/2017 | Chang |
| 9,579,534 B2 | 2/2017 | Sutkowski et al. |
| 9,579,544 B2 | 2/2017 | Watterson |
| 9,582,976 B2 | 2/2017 | Chin et al. |
| 9,586,085 B2 | 3/2017 | Arnold et al. |
| 9,586,090 B2 | 3/2017 | Watterson et al. |
| 9,604,099 B2 | 3/2017 | Taylor |
| 9,604,757 B2 | 3/2017 | Spivack et al. |
| 9,610,475 B1 | 4/2017 | DeKnock et al. |
| 9,610,506 B2 | 4/2017 | Dugan |
| 9,616,276 B2 | 4/2017 | Dalebout |
| 9,616,278 B2 | 4/2017 | Olson |
| 9,623,281 B2 | 4/2017 | Hendrickson |
| 9,623,286 B1 | 4/2017 | Chen |
| 9,642,415 B2 | 5/2017 | Pease et al. |
| 9,656,144 B2 | 5/2017 | Jafarifesharaki |
| 9,665,873 B2 | 5/2017 | Ackland |
| 9,673,904 B2 | 6/2017 | Palanisamy et al. |
| 9,675,839 B2 | 6/2017 | Dalebout |
| 9,681,313 B2 | 6/2017 | Malach |
| 9,682,306 B2 | 6/2017 | Lin et al. |
| 9,682,307 B2 | 6/2017 | Dalebout |
| 9,694,234 B2 | 7/2017 | Dalebout et al. |
| 9,694,242 B2 | 7/2017 | Ashby |
| 9,700,780 B2 | 7/2017 | Riley et al. |
| 9,707,441 B2 | 7/2017 | Yang |
| 9,707,447 B1 | 7/2017 | Lopez Babodilla |
| 9,720,912 B2 | 8/2017 | Morimoto et al. |
| 9,731,158 B1 | 8/2017 | Lo |
| 9,737,747 B1 | 8/2017 | Walsh et al. |
| 9,737,755 B2 | 8/2017 | Dalebout |
| 9,750,454 B2 | 9/2017 | Walke et al. |
| 9,757,605 B2 | 9/2017 | Olson et al. |
| 9,764,184 B2 | 9/2017 | Kueker et al. |
| 9,767,785 B2 | 9/2017 | Ashby |
| 9,776,032 B2 | 10/2017 | Moran |
| 9,776,039 B1 | 10/2017 | Xu |
| 9,782,625 B1 | 10/2017 | Blum et al. |
| 9,795,822 B2 | 10/2017 | Smith et al. |
| 9,795,827 B2 | 10/2017 | Wiener et al. |
| 9,795,855 B2 | 10/2017 | Jafarifesharaki |
| 9,808,672 B2 | 11/2017 | Dalebout |
| 9,808,673 B2 | 11/2017 | Robinson |
| 9,814,927 B2 | 11/2017 | Forystek |
| 9,814,929 B2 | 11/2017 | Moser |
| 9,814,930 B2 | 11/2017 | Manzke et al. |

(56) References Cited

U.S. PATENT DOCUMENTS

| | | |
|---|---|---|
| 9,827,458 B2 | 11/2017 | Dalton |
| 9,829,068 B2 | 11/2017 | Marchetti |
| 9,833,658 B2 | 12/2017 | Wiener et al. |
| 9,846,438 B2 | 12/2017 | Rihn et al. |
| 9,849,326 B2 | 12/2017 | Smith |
| 9,849,330 B2 | 12/2017 | Lagree |
| 9,884,222 B2 | 2/2018 | Chen |
| 9,884,224 B2 | 2/2018 | Spoeth et al. |
| 9,889,334 B2 | 2/2018 | Ashby et al. |
| 9,895,567 B2 | 2/2018 | Lee |
| 9,901,767 B2 | 2/2018 | Kuo |
| 9,901,780 B2 | 2/2018 | DeLuca et al. |
| 9,901,805 B2 | 2/2018 | Hughes, Jr. |
| 9,914,011 B2 | 3/2018 | Downey et al. |
| 9,914,014 B2 | 3/2018 | Lagree et al. |
| 9,937,375 B2 | 4/2018 | Zhu |
| 9,943,719 B2 | 4/2018 | Smith et al. |
| 9,948,349 B2 | 4/2018 | Malach |
| 9,950,209 B2 | 4/2018 | Yim et al. |
| 9,956,450 B2 | 5/2018 | Bayerlein et al. |
| 9,968,816 B2 | 5/2018 | Olson et al. |
| 9,968,821 B2 | 5/2018 | Finlayson et al. |
| 9,968,823 B2 | 5/2018 | Cutler |
| 9,975,003 B2 | 5/2018 | Molins et al. |
| 9,979,182 B2 | 5/2018 | Lin et al. |
| 9,980,465 B2 | 5/2018 | Hayashi |
| 9,987,513 B2 | 6/2018 | Yim et al. |
| 9,987,517 B1 | 6/2018 | Kuo |
| 9,990,126 B2 | 6/2018 | Chanyontpatanakul |
| 9,993,680 B2 | 6/2018 | Gordon |
| 9,993,711 B2 | 6/2018 | Moya Saez |
| 10,004,940 B2 | 6/2018 | Badarneh |
| 10,004,945 B2 | 6/2018 | Sauter |
| 10,010,169 B2 | 7/2018 | Grotenhuis |
| 10,010,755 B2 | 7/2018 | Watterson |
| 10,010,756 B2 | 7/2018 | Watterson |
| 10,022,590 B2 | 7/2018 | Foley et al. |
| 10,036,443 B2 | 7/2018 | Galasso et al. |
| 10,039,952 B2 | 8/2018 | Chang |
| 10,039,970 B2 | 8/2018 | Lee et al. |
| 10,046,222 B2 | 8/2018 | Hawkins, III et al. |
| 10,065,070 B2 | 9/2018 | Huang |
| 10,070,816 B2 | 9/2018 | Cowley et al. |
| 10,071,285 B2 | 9/2018 | Smith et al. |
| 10,086,254 B2 | 10/2018 | Watterson |
| 10,118,064 B1 | 11/2018 | Cox |
| 10,188,890 B2 | 1/2019 | Olson |
| 10,207,143 B2 | 2/2019 | Dalebout |
| 10,207,145 B2 | 2/2019 | Tyger |
| 10,207,148 B2 | 2/2019 | Powell |
| 10,252,109 B2 | 4/2019 | Watterson |
| 10,272,317 B2 | 4/2019 | Watterson |
| 10,279,212 B2 | 5/2019 | Dalebout et al. |
| 10,293,211 B2 | 5/2019 | Watterson et al. |
| 10,343,017 B2 | 7/2019 | Jackson |
| 2001/0001303 A1 | 5/2001 | Ohsuga et al. |
| 2001/0008053 A1 | 7/2001 | Belli |
| 2002/0016235 A1 | 2/2002 | Ashby et al. |
| 2002/0025888 A1 | 2/2002 | Germanton |
| 2002/0043909 A1 | 4/2002 | Nielsen |
| 2002/0055418 A1 | 5/2002 | Pyles et al. |
| 2002/0055422 A1 | 5/2002 | Airmet |
| 2002/0066735 A1 | 6/2002 | Hewlitt et al. |
| 2002/0077221 A1 | 6/2002 | Dalebout et al. |
| 2002/0128127 A1 | 9/2002 | Chen |
| 2002/0160883 A1 | 10/2002 | Dugan |
| 2003/0045406 A1 | 3/2003 | Stone |
| 2003/0060344 A1 | 3/2003 | Varner |
| 2003/0073545 A1 | 4/2003 | Liu |
| 2003/0092532 A1 | 5/2003 | Giannelli et al. |
| 2003/0092540 A1 | 5/2003 | Gillen |
| 2003/0096675 A1 | 5/2003 | Wang |
| 2003/0104908 A1 | 6/2003 | Tung |
| 2003/0128186 A1 | 7/2003 | Laker |
| 2003/0134718 A1 | 7/2003 | Jeong |
| 2003/0148853 A1 | 8/2003 | Alessandri |
| 2003/0171189 A1* | 9/2003 | Kaufman .............. A63B 24/00 482/8 |
| 2003/0171190 A1 | 9/2003 | Rice |
| 2003/0176815 A1 | 9/2003 | Baba et al. |
| 2003/0211916 A1 | 11/2003 | Capuano |
| 2004/0005961 A1 | 1/2004 | Iund |
| 2004/0014567 A1* | 1/2004 | Mendel .............. A63B 24/00 482/8 |
| 2004/0014571 A1 | 1/2004 | Haynes |
| 2004/0023761 A1 | 2/2004 | Emery |
| 2004/0023766 A1 | 2/2004 | Slone |
| 2004/0025754 A1 | 2/2004 | Dye |
| 2004/0029645 A1 | 2/2004 | Chen |
| 2004/0043871 A1 | 3/2004 | Chang |
| 2004/0043873 A1 | 3/2004 | Wilkinson et al. |
| 2004/0051392 A1 | 3/2004 | Badarneh |
| 2004/0053748 A1 | 3/2004 | Lo et al. |
| 2004/0100484 A1 | 5/2004 | Barrett |
| 2004/0132586 A1 | 7/2004 | Leighton et al. |
| 2004/0138030 A1 | 7/2004 | Wang |
| 2004/0152566 A1 | 8/2004 | Yeh |
| 2004/0160336 A1 | 8/2004 | Hoch |
| 2004/0163574 A1 | 8/2004 | Schoenbach |
| 2004/0171464 A1 | 9/2004 | Ashby et al. |
| 2004/0171465 A1 | 9/2004 | Hald |
| 2004/0176215 A1 | 9/2004 | Gramaccioni |
| 2004/0180719 A1 | 9/2004 | Feldman |
| 2004/0181972 A1 | 9/2004 | Csorba |
| 2004/0224740 A1 | 11/2004 | Ball et al. |
| 2004/0242378 A1 | 12/2004 | Pan |
| 2004/0242380 A1 | 12/2004 | Kuivala |
| 2004/0266587 A1 | 12/2004 | Miller |
| 2005/0003931 A1 | 1/2005 | Mills et al. |
| 2005/0008992 A1 | 1/2005 | Westergaard et al. |
| 2005/0009668 A1 | 1/2005 | Savettiere |
| 2005/0023292 A1 | 2/2005 | Market et al. |
| 2005/0037904 A1 | 2/2005 | Chang |
| 2005/0043155 A1 | 2/2005 | Yannitte |
| 2005/0049117 A1 | 3/2005 | Rodgers |
| 2005/0054492 A1 | 3/2005 | Neff |
| 2005/0075213 A1 | 4/2005 | Arick |
| 2005/0096189 A1 | 5/2005 | Chen |
| 2005/0107220 A1 | 5/2005 | Wang |
| 2005/0107226 A1 | 5/2005 | Monda |
| 2005/0130814 A1 | 6/2005 | Nitta |
| 2005/0143226 A1 | 6/2005 | Heidecke |
| 2005/0148440 A1 | 7/2005 | Denton |
| 2005/0148442 A1 | 7/2005 | Watterson |
| 2005/0159273 A1 | 7/2005 | Chen |
| 2005/0164839 A1 | 7/2005 | Watterson |
| 2005/0170935 A1 | 8/2005 | Manser |
| 2005/0170936 A1 | 8/2005 | Quinn |
| 2005/0172311 A1 | 8/2005 | Hjelt et al. |
| 2005/0181347 A1 | 8/2005 | Barnes et al. |
| 2005/0196737 A1 | 9/2005 | Mann |
| 2005/0209050 A1 | 9/2005 | Bartels |
| 2005/0239600 A1 | 10/2005 | Liang |
| 2005/0239607 A1 | 10/2005 | Chang |
| 2005/0245370 A1 | 11/2005 | Boland |
| 2005/0272562 A1 | 12/2005 | Alessandri et al. |
| 2005/0272577 A1 | 12/2005 | Olson |
| 2005/0277520 A1 | 12/2005 | Van Waes |
| 2005/0288155 A1 | 12/2005 | Yang |
| 2006/0003869 A1 | 1/2006 | Huang et al. |
| 2006/0019804 A1 | 1/2006 | Young |
| 2006/0035757 A1 | 2/2006 | Flick et al. |
| 2006/0040797 A1 | 2/2006 | Chang |
| 2006/0047447 A1 | 3/2006 | Brady et al. |
| 2006/0058162 A1 | 3/2006 | Vieno et al. |
| 2006/0063644 A1 | 3/2006 | Yang |
| 2006/0122035 A1 | 6/2006 | Felix |
| 2006/0122038 A1 | 6/2006 | Chou Lin |
| 2006/0122044 A1 | 6/2006 | Ho |
| 2006/0135322 A1* | 6/2006 | Rocker .............. A63B 23/1209 482/54 |
| 2006/0148622 A1 | 7/2006 | Chen |
| 2006/0160665 A1 | 7/2006 | Tai |
| 2006/0160666 A1 | 7/2006 | Wang |

(56) References Cited

U.S. PATENT DOCUMENTS

| | | |
|---|---|---|
| 2006/0166791 A1 | 7/2006 | Liao |
| 2006/0166799 A1 | 7/2006 | Boland et al. |
| 2006/0172862 A1 | 8/2006 | Badarneh et al. |
| 2006/0189440 A1 | 8/2006 | Gravagne |
| 2006/0194679 A1 | 8/2006 | Hatcher |
| 2006/0205568 A1 | 9/2006 | Huang |
| 2006/0217237 A1 | 9/2006 | Rhodes |
| 2006/0240947 A1 | 10/2006 | Qu |
| 2006/0240951 A1 | 10/2006 | Wang |
| 2006/0240955 A1 | 10/2006 | Pu |
| 2006/0240959 A1 | 10/2006 | Huang |
| 2006/0244187 A1 | 11/2006 | Downey |
| 2006/0247109 A1 | 11/2006 | Powell |
| 2006/0248965 A1 | 11/2006 | Wyatt |
| 2006/0252602 A1 | 11/2006 | Brown |
| 2006/0258513 A1 | 11/2006 | Routley |
| 2006/0276306 A1 | 12/2006 | Pan et al. |
| 2006/0287089 A1 | 12/2006 | Addington et al. |
| 2006/0287147 A1 | 12/2006 | Kriesel |
| 2006/0287163 A1 | 12/2006 | Wang |
| 2006/0288846 A1 | 12/2006 | Logan |
| 2007/0004562 A1 | 1/2007 | Pan et al. |
| 2007/0004569 A1 | 1/2007 | Cao |
| 2007/0006489 A1 | 1/2007 | Case et al. |
| 2007/0027002 A1 | 2/2007 | Clark et al. |
| 2007/0038137 A1 | 2/2007 | Arand et al. |
| 2007/0042868 A1 | 2/2007 | Fisher |
| 2007/0049464 A1 | 3/2007 | Chou |
| 2007/0049465 A1 | 3/2007 | Wu |
| 2007/0049466 A1 | 3/2007 | Hubbard |
| 2007/0049470 A1 | 3/2007 | Pyles et al. |
| 2007/0060449 A1 | 3/2007 | Lo |
| 2007/0060451 A1 | 3/2007 | Lucas |
| 2007/0066448 A1 | 3/2007 | Pan et al. |
| 2007/0087908 A1 | 4/2007 | Pan et al. |
| 2007/0117683 A1 | 5/2007 | Ercanbrack et al. |
| 2007/0123389 A1 | 5/2007 | Martin |
| 2007/0123390 A1 | 5/2007 | Mathis |
| 2007/0123396 A1 | 5/2007 | Ellis |
| 2007/0142177 A1 | 6/2007 | Simms et al. |
| 2007/0142183 A1 | 6/2007 | Chang |
| 2007/0151489 A1 | 7/2007 | Byrne |
| 2007/0155277 A1 | 7/2007 | Amitai et al. |
| 2007/0155495 A1 | 7/2007 | Goo |
| 2007/0161468 A1 | 7/2007 | Yanagisawa et al. |
| 2007/0167292 A1 | 7/2007 | Kuo |
| 2007/0184953 A1 | 8/2007 | Luberski et al. |
| 2007/0190508 A1 | 8/2007 | Dalton |
| 2007/0191190 A1 | 8/2007 | Kuo |
| 2007/0197353 A1 | 8/2007 | Hundley |
| 2007/0201727 A1 | 8/2007 | Birrell et al. |
| 2007/0204430 A1 | 9/2007 | Chase |
| 2007/0214630 A1 | 9/2007 | Kim |
| 2007/0219066 A1 | 9/2007 | Wang |
| 2007/0225119 A1 | 9/2007 | Schenk |
| 2007/0225126 A1 | 9/2007 | Yoo |
| 2007/0225127 A1 | 9/2007 | Pan et al. |
| 2007/0232455 A1 | 10/2007 | Hanoun |
| 2007/0232463 A1 | 10/2007 | Wu |
| 2007/0245612 A1 | 10/2007 | Tresenfeld |
| 2007/0247320 A1 | 10/2007 | Morahan |
| 2007/0249467 A1 | 10/2007 | Hong et al. |
| 2007/0270667 A1 | 11/2007 | Coppi et al. |
| 2007/0270726 A1 | 11/2007 | Chou |
| 2007/0281828 A1 | 12/2007 | Rice |
| 2007/0281831 A1 | 12/2007 | Wang |
| 2007/0284495 A1 | 12/2007 | Charles |
| 2007/0296313 A1 | 12/2007 | Wang |
| 2007/0298935 A1 | 12/2007 | Badarneh |
| 2007/0298937 A1 | 12/2007 | Shah |
| 2008/0001772 A1 | 1/2008 | Saito |
| 2008/0004162 A1 | 1/2008 | Chen |
| 2008/0018211 A1 | 1/2008 | Dye |
| 2008/0020898 A1 | 1/2008 | Pyles et al. |
| 2008/0020907 A1 | 1/2008 | Lin |
| 2008/0026658 A1 | 1/2008 | Kriesel |
| 2008/0026838 A1 | 1/2008 | Dunstan et al. |
| 2008/0032864 A1 | 2/2008 | Hakki |
| 2008/0032870 A1 | 2/2008 | Wu |
| 2008/0039301 A1 | 2/2008 | Halbridge |
| 2008/0046246 A1 | 2/2008 | Hakki |
| 2008/0057889 A1 | 3/2008 | Jan |
| 2008/0070756 A1 | 3/2008 | Chu |
| 2008/0076972 A1 | 3/2008 | Dorogusker et al. |
| 2008/0096745 A1 | 4/2008 | Perry |
| 2008/0103024 A1 | 5/2008 | Habing |
| 2008/0103034 A1 | 5/2008 | Mihara et al. |
| 2008/0108917 A1 | 5/2008 | Joutras et al. |
| 2008/0119337 A1 | 5/2008 | Wilkins |
| 2008/0139370 A1 | 6/2008 | Charnitski |
| 2008/0153682 A1 | 6/2008 | Chen et al. |
| 2008/0155077 A1 | 6/2008 | James |
| 2008/0161170 A1 | 7/2008 | Lumpee |
| 2008/0161653 A1 | 7/2008 | Lin et al. |
| 2008/0171640 A1 | 7/2008 | Chang |
| 2008/0171922 A1 | 7/2008 | Teller |
| 2008/0176717 A1 | 7/2008 | Wang |
| 2008/0176718 A1 | 7/2008 | Wang |
| 2008/0182724 A1 | 7/2008 | Guthrie |
| 2008/0187689 A1 | 8/2008 | Dierkens et al. |
| 2008/0188362 A1 | 8/2008 | Chen |
| 2008/0191864 A1 | 8/2008 | Wolfson |
| 2008/0200287 A1 | 8/2008 | Marty et al. |
| 2008/0207407 A1 | 8/2008 | Yeh |
| 2008/0214971 A1 | 9/2008 | Talish |
| 2008/0216717 A1 | 9/2008 | Jones |
| 2008/0228110 A1 | 9/2008 | Berme |
| 2008/0229875 A1 | 9/2008 | Ray |
| 2008/0234111 A1 | 9/2008 | Packham |
| 2008/0242511 A1 | 10/2008 | Munoz et al. |
| 2008/0250729 A1 | 10/2008 | Kriesel |
| 2008/0255794 A1 | 10/2008 | Levine |
| 2008/0279896 A1 | 11/2008 | Heinen et al. |
| 2008/0280733 A1 | 11/2008 | Dickie et al. |
| 2008/0280734 A1 | 11/2008 | Dickie et al. |
| 2008/0280735 A1 | 11/2008 | Dickie et al. |
| 2008/0287262 A1 | 11/2008 | Chou |
| 2008/0300110 A1 | 12/2008 | Smith et al. |
| 2008/0300115 A1 | 12/2008 | Erlandson |
| 2008/0300914 A1 | 12/2008 | Karkanias et al. |
| 2008/0312047 A1 | 12/2008 | Feng |
| 2008/0318737 A1 | 12/2008 | Chu |
| 2009/0001831 A1 | 1/2009 | Cho et al. |
| 2009/0005224 A1* | 1/2009 | Davis ............... A63B 22/02 482/54 |
| 2009/0023553 A1 | 1/2009 | Shim |
| 2009/0027925 A1 | 1/2009 | Kanouda et al. |
| 2009/0029831 A1 | 1/2009 | Weier |
| 2009/0042698 A1 | 2/2009 | Wang |
| 2009/0048073 A1 | 2/2009 | Roimicher |
| 2009/0048493 A1 | 2/2009 | James et al. |
| 2009/0054751 A1 | 2/2009 | Babashan et al. |
| 2009/0069159 A1 | 3/2009 | Wang |
| 2009/0075781 A1 | 3/2009 | Schwarzberg et al. |
| 2009/0075784 A1 | 3/2009 | Hoggan |
| 2009/0080808 A1 | 3/2009 | Hagen |
| 2009/0093347 A1 | 4/2009 | Wang |
| 2009/0105052 A1 | 4/2009 | Dalebout et al. |
| 2009/0105548 A1 | 4/2009 | Bart |
| 2009/0111664 A1 | 4/2009 | Kau |
| 2009/0111666 A1 | 4/2009 | Wang |
| 2009/0111670 A1 | 4/2009 | Williams |
| 2009/0118098 A1 | 5/2009 | Yeh |
| 2009/0124463 A1 | 5/2009 | Lin |
| 2009/0124464 A1 | 5/2009 | Kastelic |
| 2009/0124465 A1 | 5/2009 | Wang |
| 2009/0124466 A1 | 5/2009 | Zhang |
| 2009/0128516 A1 | 5/2009 | Rimon et al. |
| 2009/0131225 A1 | 5/2009 | Burdea |
| 2009/0156363 A1 | 6/2009 | Guidi et al. |
| 2009/0156364 A1 | 6/2009 | Simeoni |
| 2009/0158871 A1 | 6/2009 | Chuo |
| 2009/0163327 A1 | 6/2009 | Huang et al. |
| 2009/0170672 A1 | 7/2009 | Mcmullen |

(56) References Cited

U.S. PATENT DOCUMENTS

| | | |
|---|---|---|
| 2009/0176628 A1* | 7/2009 | Radding .................. B32B 5/22 482/54 |
| 2009/0180646 A1 | 7/2009 | Vulfson et al. |
| 2009/0181829 A1 | 7/2009 | Wu |
| 2009/0181830 A1 | 7/2009 | Wu |
| 2009/0181831 A1 | 7/2009 | Kuo |
| 2009/0209393 A1 | 8/2009 | Crater et al. |
| 2009/0221405 A1 | 9/2009 | Wang |
| 2009/0221407 A1 | 9/2009 | Hauk |
| 2009/0258710 A1 | 10/2009 | Quatrochi |
| 2009/0269728 A1 | 10/2009 | Verstegen et al. |
| 2009/0286653 A1 | 11/2009 | Wiber |
| 2010/0015585 A1 | 1/2010 | Baker |
| 2010/0022354 A1 | 1/2010 | Fisher |
| 2010/0034665 A1 | 2/2010 | Zhong et al. |
| 2010/0035726 A1 | 2/2010 | Fisher et al. |
| 2010/0041516 A1* | 2/2010 | Kodama ............ A63B 24/0062 482/8 |
| 2010/0063426 A1 | 3/2010 | Planke |
| 2010/0064255 A1 | 3/2010 | Rottler et al. |
| 2010/0079291 A1 | 4/2010 | Kroll et al. |
| 2010/0081548 A1 | 4/2010 | Labedz |
| 2010/0105527 A1 | 4/2010 | Johnson |
| 2010/0113223 A1 | 5/2010 | Chiles et al. |
| 2010/0130337 A1 | 5/2010 | Stewart |
| 2010/0137105 A1 | 6/2010 | McLaughlin |
| 2010/0175634 A1 | 7/2010 | Chang et al. |
| 2010/0192715 A1 | 8/2010 | Vauchel et al. |
| 2010/0197462 A1* | 8/2010 | Piane, Jr. .............. A61B 5/1113 482/5 |
| 2010/0197465 A1 | 8/2010 | Stevenson |
| 2010/0210418 A1 | 8/2010 | Park |
| 2010/0216607 A1 | 8/2010 | Mueller |
| 2010/0227740 A1 | 9/2010 | Liu |
| 2010/0240458 A1 | 9/2010 | Gaiba et al. |
| 2010/0279822 A1 | 11/2010 | Ford |
| 2010/0285933 A1 | 11/2010 | Nalley |
| 2010/0304931 A1 | 12/2010 | Stumpf |
| 2010/0311552 A1 | 12/2010 | Sumners |
| 2010/0317488 A1 | 12/2010 | Cartaya |
| 2011/0028282 A1 | 2/2011 | Sbragia |
| 2011/0054359 A1 | 3/2011 | Sazonov et al. |
| 2011/0056328 A1 | 3/2011 | Ko |
| 2011/0061840 A1 | 3/2011 | Goldmann |
| 2011/0065371 A1 | 3/2011 | Leff |
| 2011/0065373 A1 | 3/2011 | Goldmann |
| 2011/0067361 A1 | 3/2011 | Sloan |
| 2011/0073743 A1 | 3/2011 | Shamie |
| 2011/0082013 A1 | 4/2011 | Bastian |
| 2011/0086707 A1 | 4/2011 | Loveland |
| 2011/0093100 A1 | 4/2011 | Ramsay |
| 2011/0098157 A1 | 4/2011 | Whalen et al. |
| 2011/0098615 A1 | 4/2011 | Whalen et al. |
| 2011/0109283 A1 | 5/2011 | Kapels et al. |
| 2011/0131005 A1 | 6/2011 | Ueshima et al. |
| 2011/0136627 A1 | 6/2011 | Williams |
| 2011/0143769 A1 | 6/2011 | Jones et al. |
| 2011/0152037 A1 | 6/2011 | Tsou |
| 2011/0152635 A1 | 6/2011 | Morris et al. |
| 2011/0165995 A1 | 7/2011 | Paulus |
| 2011/0172060 A1 | 7/2011 | Morales et al. |
| 2011/0175744 A1 | 7/2011 | Englert et al. |
| 2011/0201481 A1 | 8/2011 | Lo |
| 2011/0205164 A1 | 8/2011 | Hansen et al. |
| 2011/0221672 A1 | 9/2011 | Osterhout et al. |
| 2011/0275489 A1 | 11/2011 | Apau |
| 2011/0275499 A1 | 11/2011 | Eschenbach |
| 2011/0281691 A1 | 11/2011 | Ellis |
| 2011/0308919 A1 | 12/2011 | Hahn |
| 2012/0010053 A1 | 1/2012 | Bayerlein et al. |
| 2012/0021873 A1 | 1/2012 | Brunner |
| 2012/0071301 A1 | 3/2012 | Kaylor et al. |
| 2012/0088633 A1 | 4/2012 | Crafton |
| 2012/0088640 A1 | 4/2012 | Wissink |
| 2012/0132877 A1 | 5/2012 | Wang |
| 2012/0165162 A1 | 6/2012 | Lu |
| 2012/0174833 A1 | 7/2012 | Early |
| 2012/0178590 A1 | 7/2012 | Lu |
| 2012/0190502 A1 | 7/2012 | Paulus et al. |
| 2012/0218184 A1 | 8/2012 | Wissmar |
| 2012/0230504 A1 | 9/2012 | Kuroda |
| 2012/0242774 A1 | 9/2012 | Numano et al. |
| 2012/0253489 A1 | 10/2012 | Dugan |
| 2012/0270705 A1 | 10/2012 | Lo |
| 2012/0293141 A1 | 11/2012 | Zhang et al. |
| 2012/0295774 A1 | 11/2012 | Dalebout et al. |
| 2012/0298017 A1 | 11/2012 | Chen |
| 2012/0326873 A1 | 12/2012 | Utter, II |
| 2013/0002533 A1 | 1/2013 | Burroughs et al. |
| 2013/0014321 A1 | 1/2013 | Sullivan |
| 2013/0018494 A1 | 1/2013 | Amini |
| 2013/0053222 A1 | 2/2013 | Lo |
| 2013/0065732 A1 | 3/2013 | Hopp |
| 2013/0123073 A1* | 5/2013 | Olson .................... A63B 22/02 482/54 |
| 2013/0123083 A1 | 5/2013 | Sip |
| 2013/0130868 A1 | 5/2013 | Hou |
| 2013/0130869 A1 | 5/2013 | Hou |
| 2013/0141235 A1 | 6/2013 | Utter, II |
| 2013/0147411 A1 | 6/2013 | Pang et al. |
| 2013/0150214 A1 | 6/2013 | Wu |
| 2013/0154441 A1 | 6/2013 | Redmond |
| 2013/0172152 A1 | 7/2013 | Watterson |
| 2013/0172153 A1 | 7/2013 | Watterson |
| 2013/0178334 A1 | 7/2013 | Brammer |
| 2013/0184125 A1* | 7/2013 | Maguire .............. A63B 21/225 482/54 |
| 2013/0185003 A1 | 7/2013 | Carbeck et al. |
| 2013/0190136 A1 | 7/2013 | Watterson |
| 2013/0196821 A1 | 8/2013 | Watterson et al. |
| 2013/0196827 A1 | 8/2013 | Chang |
| 2013/0228063 A1 | 9/2013 | Turner |
| 2013/0237383 A1 | 9/2013 | Chen |
| 2013/0244836 A1 | 9/2013 | Maughan |
| 2013/0245966 A1 | 9/2013 | Burroughs et al. |
| 2013/0263418 A1 | 10/2013 | Johnson, Jr. |
| 2013/0267386 A1 | 10/2013 | Her |
| 2013/0274067 A1 | 10/2013 | Watterson et al. |
| 2013/0274071 A1 | 10/2013 | Wang |
| 2013/0281241 A1 | 10/2013 | Watterson |
| 2013/0346043 A1 | 12/2013 | Mewes et al. |
| 2014/0011645 A1 | 1/2014 | Johnson et al. |
| 2014/0026788 A1 | 1/2014 | Kallio, III et al. |
| 2014/0031703 A1 | 1/2014 | Rayner et al. |
| 2014/0056461 A1 | 2/2014 | Afshar |
| 2014/0073488 A1 | 3/2014 | Wu |
| 2014/0080678 A1 | 3/2014 | Wu |
| 2014/0085077 A1 | 3/2014 | Luna et al. |
| 2014/0121066 A1 | 5/2014 | Huang et al. |
| 2014/0156228 A1 | 6/2014 | Molettiere et al. |
| 2014/0187383 A1 | 7/2014 | Martin |
| 2014/0187389 A1 | 7/2014 | Berg |
| 2014/0221160 A1 | 8/2014 | Hardy et al. |
| 2014/0222173 A1 | 8/2014 | Giedwoyn et al. |
| 2014/0274564 A1 | 9/2014 | Greenbaum |
| 2014/0274574 A1 | 9/2014 | Shorten et al. |
| 2014/0274579 A1 | 9/2014 | Olson |
| 2014/0358473 A1 | 12/2014 | Goel et al. |
| 2014/0360413 A1 | 12/2014 | Schenk |
| 2015/0003621 A1 | 1/2015 | Trammell |
| 2015/0004579 A1 | 1/2015 | Shelton |
| 2015/0016623 A1 | 1/2015 | Trammell |
| 2015/0038300 A1 | 2/2015 | Forhan et al. |
| 2015/0044648 A1 | 2/2015 | White et al. |
| 2015/0065273 A1 | 3/2015 | Lake |
| 2015/0065301 A1 | 3/2015 | Oteman |
| 2015/0105210 A1 | 4/2015 | Hong |
| 2015/0182779 A1 | 7/2015 | Dalebout |
| 2015/0196805 A1* | 7/2015 | Koduri .................... G06T 7/00 482/6 |
| 2015/0201722 A1 | 7/2015 | Brouard |
| 2015/0202487 A1 | 7/2015 | Wu |
| 2015/0209610 A1 | 7/2015 | Dalebout et al. |
| 2015/0209617 A1 | 7/2015 | Hsiao |

(56) References Cited

U.S. PATENT DOCUMENTS

| | | |
|---|---|---|
| 2015/0251047 A1 | 9/2015 | Maanitty |
| 2015/0251055 A1 | 9/2015 | Ashby |
| 2015/0253210 A1 | 9/2015 | Ashby et al. |
| 2015/0265903 A1 | 9/2015 | Kolen et al. |
| 2015/0352396 A1 | 12/2015 | Dalebout |
| 2015/0352401 A1 | 12/2015 | Johnson |
| 2015/0367161 A1 | 12/2015 | Wiegardt |
| 2015/0367176 A1 | 12/2015 | Bejestan et al. |
| 2016/0008650 A1 | 1/2016 | Jue et al. |
| 2016/0016035 A1 | 1/2016 | Hao |
| 2016/0027325 A1 | 1/2016 | Malhotra |
| 2016/0047446 A1 | 2/2016 | Hung |
| 2016/0058335 A1 | 3/2016 | Ashby |
| 2016/0096064 A1 | 4/2016 | Gatti |
| 2016/0101311 A1 | 4/2016 | Workman |
| 2016/0193518 A1 | 7/2016 | Baxter |
| 2016/0206248 A1 | 7/2016 | Sartor et al. |
| 2016/0206922 A1 | 7/2016 | Dalebout et al. |
| 2016/0211841 A1 | 7/2016 | Harrison |
| 2016/0219968 A1 | 8/2016 | Martin |
| 2016/0263426 A1 | 9/2016 | Mueller et al. |
| 2016/0303421 A1 | 10/2016 | Tyger et al. |
| 2016/0339298 A1 | 11/2016 | Kats |
| 2016/0346617 A1 | 12/2016 | Srugo |
| 2016/0367851 A1 | 12/2016 | Astilean et al. |
| 2017/0056711 A1 | 3/2017 | Dalebout et al. |
| 2017/0056715 A1 | 3/2017 | Dalebout et al. |
| 2017/0056726 A1 | 3/2017 | Dalebout et al. |
| 2017/0068782 A1 | 3/2017 | Pillai et al. |
| 2017/0113093 A1 | 4/2017 | Bellavista et al. |
| 2017/0136289 A1 | 5/2017 | Frank |
| 2017/0136291 A1 | 5/2017 | Huang |
| 2017/0136339 A1 | 5/2017 | Habiche |
| 2017/0165523 A1 | 6/2017 | Chou |
| 2017/0189745 A1 | 7/2017 | Hamilton et al. |
| 2017/0216660 A1 | 8/2017 | Lernihan |
| 2017/0266481 A1 | 9/2017 | Dalebout |
| 2017/0266483 A1 | 9/2017 | Dalebout et al. |
| 2017/0266532 A1 | 9/2017 | Watterson |
| 2017/0266533 A1 | 9/2017 | Dalebout |
| 2017/0266534 A1 | 9/2017 | Watterson |
| 2017/0274242 A1 | 9/2017 | Corbalis |
| 2017/0326411 A1 | 11/2017 | Watterson |
| 2017/0368442 A1 | 12/2017 | Baudhuin |
| 2018/0001135 A1 | 1/2018 | Powell |
| 2018/0036585 A1 | 2/2018 | Powell |
| 2018/0056111 A1 | 3/2018 | Chiang et al. |
| 2018/0092603 A1 | 4/2018 | Duan et al. |
| 2018/0099179 A1 | 4/2018 | Chatterton et al. |
| 2018/0099180 A1 | 4/2018 | Wilkinson |
| 2018/0099181 A1 | 4/2018 | Powell et al. |
| 2018/0099205 A1 | 4/2018 | Watterson |
| 2018/0104533 A1 | 4/2018 | Powell et al. |
| 2018/0111018 A1 | 4/2018 | Lee |
| 2018/0117385 A1 | 5/2018 | Watterson et al. |
| 2018/0117388 A1 | 5/2018 | Porter |
| 2018/0117419 A1 | 5/2018 | Jackson |
| 2018/0147440 A1 | 5/2018 | Lin |
| 2018/0154205 A1 | 6/2018 | Watterson |
| 2018/0154207 A1 | 6/2018 | Hochstrasser |
| 2018/0154208 A1 | 6/2018 | Powell et al. |
| 2018/0154209 A1 | 6/2018 | Watterson |
| 2019/0058370 A1 | 2/2019 | Tinney |
| 2019/0151698 A1 | 5/2019 | Olson |

FOREIGN PATENT DOCUMENTS

| | | | |
|---|---|---|---|
| TW | I339127 | 8/2008 | |
| TW | M422981 | 2/2012 | |
| TW | M504568 | 3/2015 | |
| WO | 2009014330 | 1/2009 | |
| WO | WO-2009014330 A1 * | 1/2009 | ............ A63B 21/04 |
| WO | 2011094649 | 8/2011 | |

OTHER PUBLICATIONS

U.S. Appl. No. 15/245,453, filed Aug. 31, 2018, Non-final Rejection.
U.S. Appl. No. 15/245,473, filed Sep. 22, 2017, Non-final Rejection.
U.S. Appl. No. 15/245,473, filed May 11, 2018, Non-final Rejection.
English Translation of Search Report for Taiwan Patent Application No. 104131458 dated Jun. 3, 2016.
English Translation of Search Report for Taiwan Patent Application No. 105126694 dated Oct. 3, 2017.
International Search Report and Written Opinion issued in PCT/US2016/048692 dated Dec. 1, 2016.
International Search Report and Written Opinion issued in PCT/US2017/023002 dated Jun. 28, 2017.
International Search Report and Written Opinion issued in PCT/US2017/022989 dated May 23, 2017.

* cited by examiner

STRENGTH EXERCISE MECHANISMS

CROSS-REFERENCE TO RELATED APPLICATIONS

This application claims priority to U.S. Provisional Patent Application No. 62/210,323 filed on Aug. 26, 2015, which application is herein incorporated by reference for all that it discloses.

BACKGROUND

Aerobic exercise is a popular form of exercise that improves one's cardiovascular health by reducing blood pressure and providing other benefits to the human body. Aerobic exercise generally involves low intensity physical exertion over a long duration of time. Typically, the human body can adequately supply enough oxygen to meet the body's demands at the intensity levels involved with aerobic exercise. Popular forms of aerobic exercise include running, jogging, swimming, and cycling among others activities. In contrast, anaerobic exercise typically involves high intensity exercises over a short duration of time. Popular forms of anaerobic exercise include strength training and short distance running.

Many choose to perform aerobic exercises indoors, such as in a gym or their home. Often, a user uses an aerobic exercise machine to have an aerobic workout indoors. One such type of aerobic exercise machine is a treadmill, which is a machine that has a running deck attached to a support frame. The running deck can support the weight of a person using the machine. The running deck incorporates a tread belt that is driven by a motor. A user can run or walk in place on the tread belt by running or walking at the tread belt's speed. The speed and other operations of the treadmill are generally controlled through a control module that is also attached to the support frame and within a convenient reach of the user. The control module can include a display, buttons for increasing or decreasing a speed of the conveyor belt, controls for adjusting a tilt angle of the running deck, or other controls. Other popular exercise machines that allow a user to perform aerobic exercises indoors include elliptical machines, rowing machines, stepper machines, and stationary bikes to name a few.

One type of dual use exercise machine is disclosed in U.S. Pat. No. 5,000,440 issued to Robert P. Lynch. In this reference, an exercise apparatus combines a treadmill with an upper body muscle stressing device that allows for simultaneous upper body exercise with aerobic exercise. This reference is incorporated by reference for all that it discloses.

SUMMARY

In one embodiment of the present invention, a treadmill has a frame, an exercise deck attached to the frame, and a first push-up handle attached to the frame and elevated over the exercise deck.

The frame may have a first post and a second post and the push-up handle may be attached to the first post at a first end and attached to the second post at a second end.

The treadmill may include a second push-up handle attached to the frame and elevated over the exercise deck.

The treadmill may include a processor and memory, the memory comprising programmed instructions that cause the processor to determine a characteristic about a body weight exercise performed with the first push-up handle.

The treadmill may include a repetition sensor in communication with the processor to count the number of times that a user performs a body weight exercise with the first push-up handle.

The repetition sensor includes at least one camera.

The treadmill may include a weight sensor in communication with the processor to generate a weight value of a user applying their body weight to the first push-up handle.

The treadmill may include a display in communication with the processor to present a repetition count of the body weight exercise.

The treadmill may include a display in communication with the processor to present a body weight exercise calorie burn value based on a performance of the body weight exercise.

The treadmill may include a processor and memory, the memory comprising program instructions to cause the processor to determine an exercise deck calorie burn value based on a performance of an exercise with the exercise deck, determine an body weight calorie burn value based on a performance of the body weight exercise, add the exercise deck calorie burn value to the body weight exercise calorie burn value to generate a workout calorie burn value, and present the workout calorie burn value in a display.

The treadmill may include a tread belt incorporated into the exercise deck disposed around a first pulley at front end of the exercise deck and a second pulley disposed around a second pulley at a rear end of the exercise deck.

A treadmill includes a frame, an exercise deck attached to the frame, a tread belt incorporated into the exercise deck disposed around a first pulley at front end of the exercise deck and a second pulley disposed around a second pulley at a rear end of the exercise deck, a first push-up handle attached to the exercise deck; and a second push-up handle attached to the exercise deck.

The treadmill may include a processor and memory, the processor comprising programmed instructions to cause the processor to determine a characteristic about a body weight exercise performed with the first push-up handle and the second push-up handle.

The treadmill may include a repetition sensor in communication with the processor to count the number of times that a user performs the body weight exercise with the first push-up handle and the second push-up handle.

The repetition sensor includes at least one camera.

The treadmill may include a weight sensor in communication with the processor to generate a weight value of a user applying their body weight to the first push-up handle and the second push-up handle.

The treadmill may include a display in communication with the processor to present a repetition count of the body weight exercise.

The treadmill may include a display in communication with the processor to present a body weight exercise calorie burn value based on a performance of the body weight exercise.

The program instructions may cause the processor to determine an exercise deck calorie burn value based on a performance of an exercise with the exercise deck, determine an body weight calorie burn value based on a performance of the body weight exercise, add the exercise deck calorie burn value to the body weight exercise calorie burn value to generate a workout calorie burn value, and present the workout calorie burn value in a display.

In one embodiment of the invention, a treadmill includes a frame where the frame includes a first post and a second post aligned with the first post. An exercise deck is attached to the frame. A tread belt is incorporated into the exercise deck disposed around a first pulley at front end of the exercise deck and a second pulley disposed around a second pulley at a rear end of the exercise deck. A first push-up handle is attached to the first post, and a second push-up handle is attached to the second post. The treadmill also includes a processor and memory where the processor includes programmed instructions to cause the processor to determine a characteristic about a body weight exercise performed with the first push-up handle and the second push-up handle. A repetition sensor is in communication with processor, and a display is in communication with the processor to present a repetition count of the body weight exercise and to present a body weight exercise calorie burn value based on a performance of the body weight exercise.

BRIEF DESCRIPTION OF THE DRAWINGS

The accompanying drawings illustrate various embodiments of the present apparatus and are a part of the specification. The illustrated embodiments are merely examples of the present apparatus and do not limit the scope thereof.

Throughout the drawings, identical reference numbers designate similar, but not necessarily identical, elements.

DETAILED DESCRIPTION

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object.

Figure 1A:
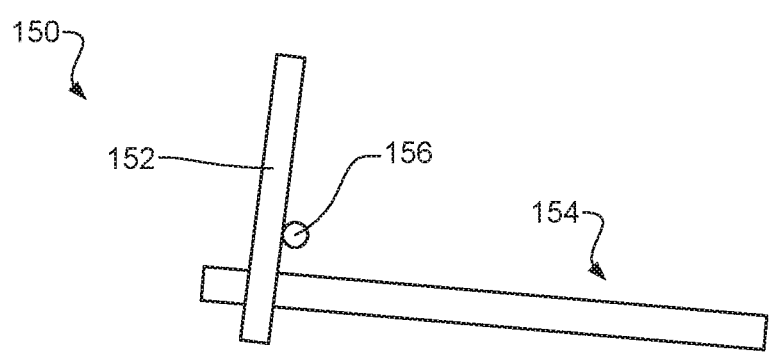
FIG. 1a illustrates a side view of an example of treadmill in accordance with the present disclosure.

Particularly, with reference to the figures, FIG. 1a illustrates an example of a treadmill 150 in accordance with the present disclosure. The treadmill 150 includes a frame 152, an exercise deck 154 attached to the frame 152, and a first push-up handle 156 attached to the frame 152 and elevated over the exercise deck 154.

Figure 1B:
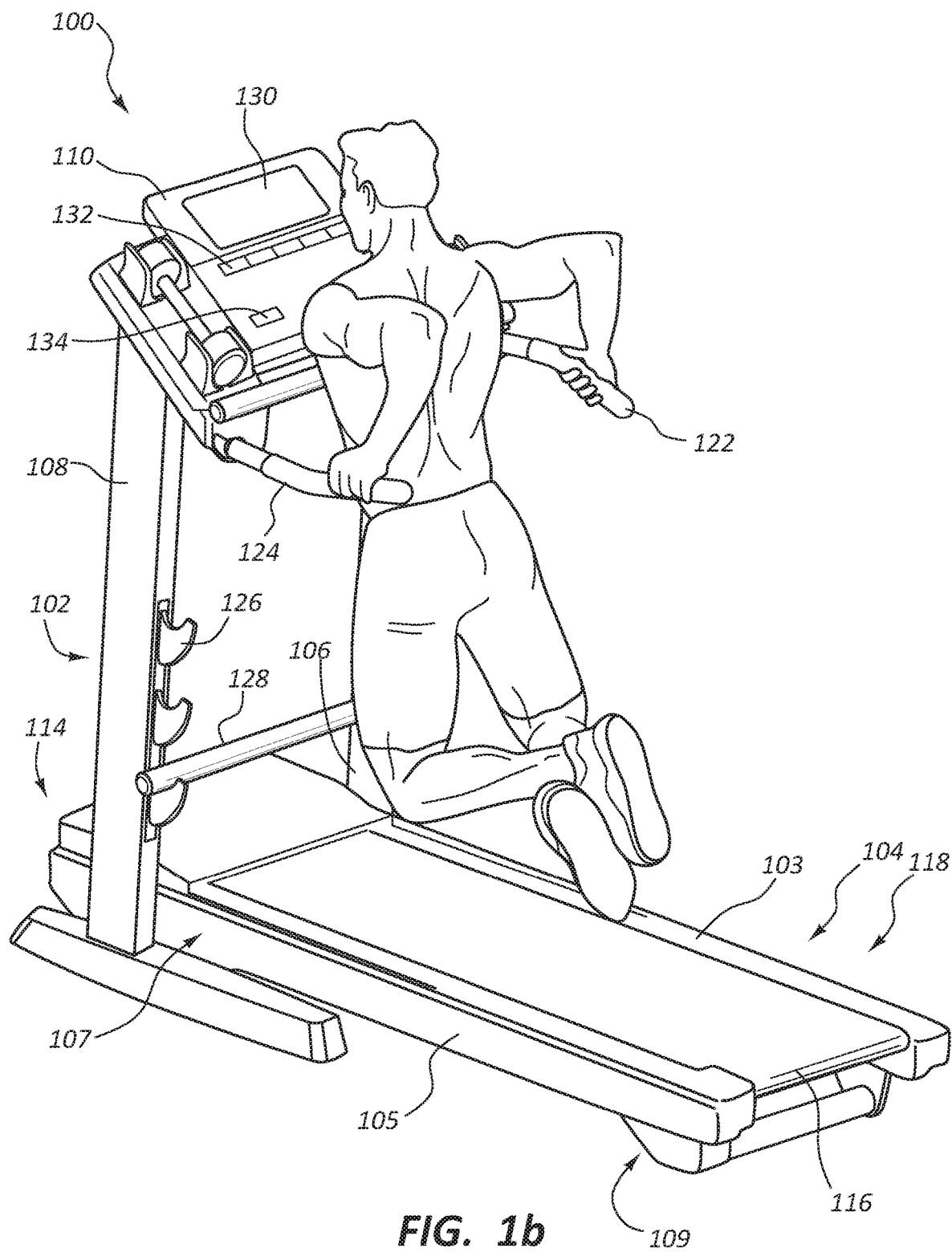
FIG. 1b illustrates a perspective view of an example of treadmill in accordance with the present disclosure.

FIG. 1b depicts a treadmill 100 with a frame 102, and an exercise deck 104 connected to the frame. The frame 102 includes a first post 106 and a second post 108. A console 110 is supported by the first post 106 and the second post 108.

The exercise deck 104 comprises a first rail 103 and a second rail 105. A first pulley is located in a front section 114 of the treadmill 100 and proximate a first end 107 of both the first and second rails, 103, 105. Also, a second pulley 116 is located in a rear section 118 of the treadmill 100 and proximate a rear end 109 of both the first and second rails, 103, 105. A tread belt 120 is disposed between the first pulley and the second pulley 116.

A first handle 122 is movably attached to the frame 102 on a first side of the treadmill 100, and a second handle 124 is movably attached to the frame 102 on a second side of the treadmill 100. In this example, the first and second handles 122, 124 are in a first orientation that is aligned with a length of the exercise deck 104. In such a first orientation, the first and second handles 122, 124 are positioned within a region that is above the exercise deck 104. In this example, the first and second handles 122, 124 are spaced approximately a human body width apart. Also, multiple bar catches 126 are incorporated into each of the first post 106 and the second post 108. Such bar catches 126 may be used to support a push-up bar 128.

The console 110 includes a display 130 and at least one input mechanism 132. Such an input mechanism 132 may be used to control a parameter of the treadmill 100 or record a condition during the performance of an exercise on the treadmill 100.

Further, the treadmill 100 includes at least one repetition sensor 134 that can count the number of repetitions of an exercise performed by the user. For example, the repetition sensor may be able to count the number of push-ups performed by the user with the push-up bar 128 or the number of body weight exercises performed by the user with the first and second handles 122, 124.

Figure 2:
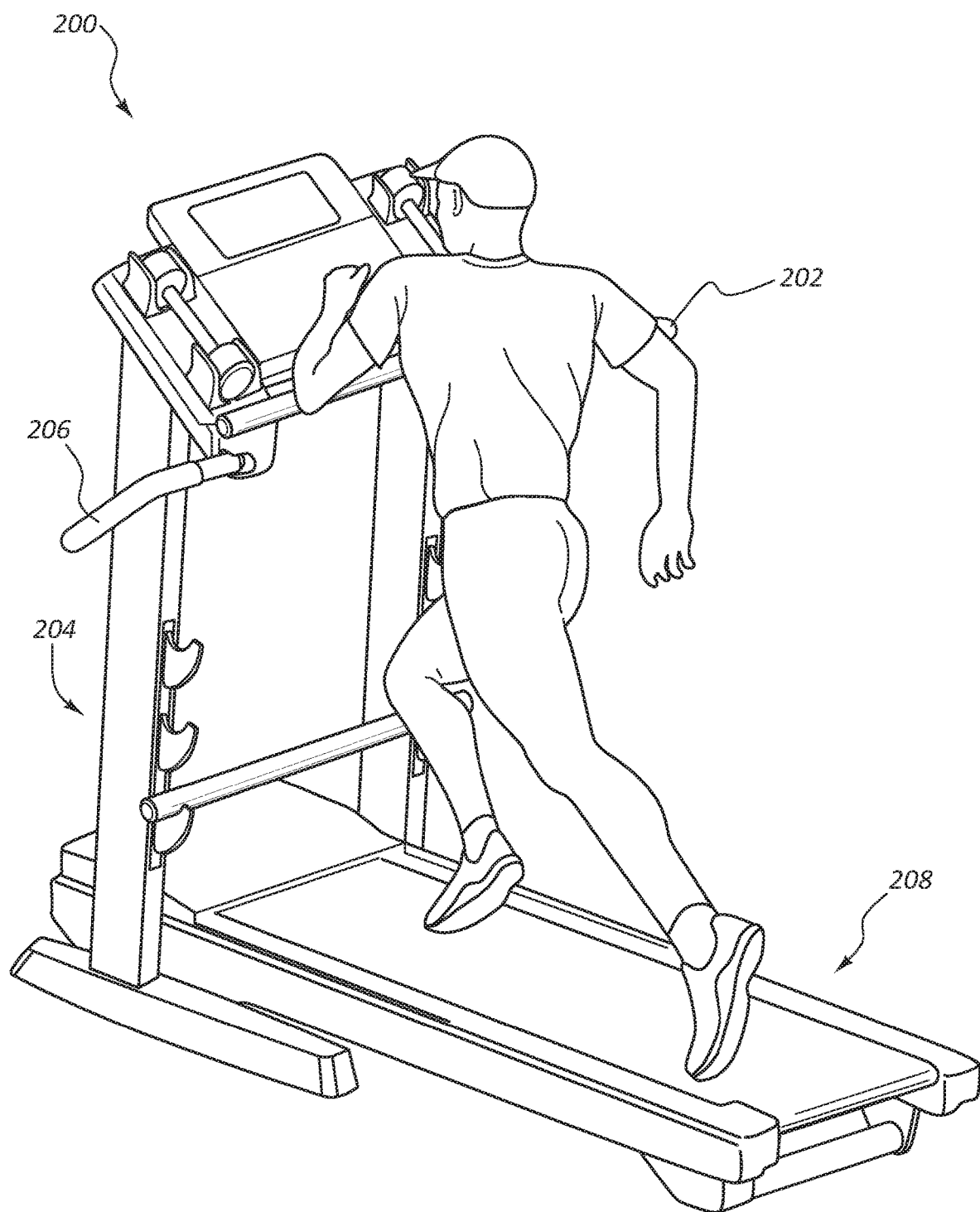
FIG. 2 illustrates a perspective view of an example of a treadmill in accordance with the present disclosure.

FIG. 2 depicts an example of a treadmill 200 with a first handle 202 movably attached to the treadmill's frame 204 and a second handle 206 movably attached to the treadmill's frame 204. The first and second handles 202, 206 are attached to the frame at a human body width apart from one another. In this example, the first and second handles 202, 206 are rotated outwardly from a center of the treadmill 200. In such an orientation, the first and second handles 202, 206 are transverse to the length of the exercise deck 208.

Figure 3:
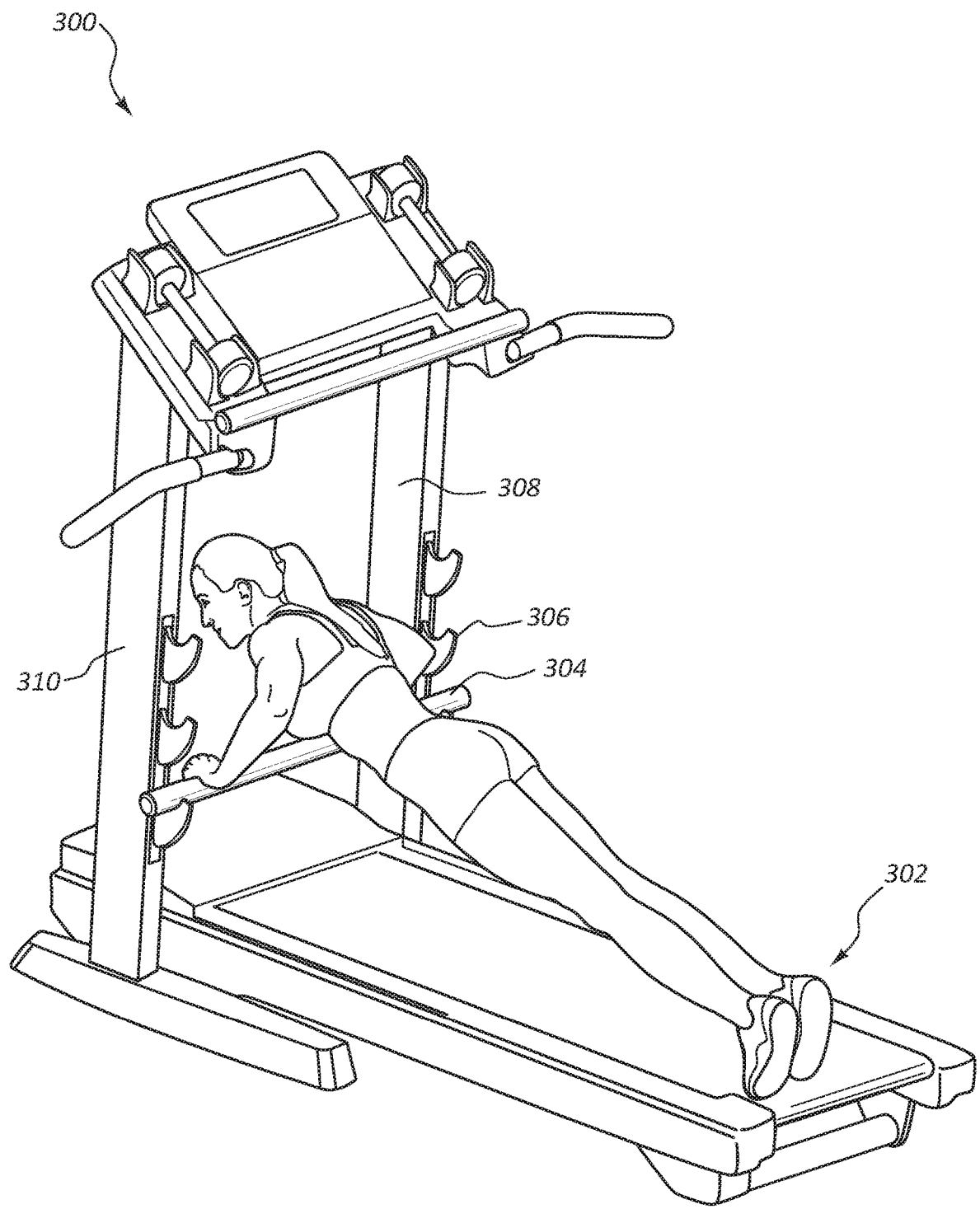
FIG. 3 illustrates a perspective view of an example of a treadmill in accordance with the present disclosure.

FIG. 3 depicts an example of a treadmill 300 of a user performing an anaerobic exercise on the exercise deck 302 with the push-up bar 304. The push-up bar 304 is secured to the catches 306 incorporated into the first post 308 and the second post 310 of the treadmill's frame 312.

Figure 4:
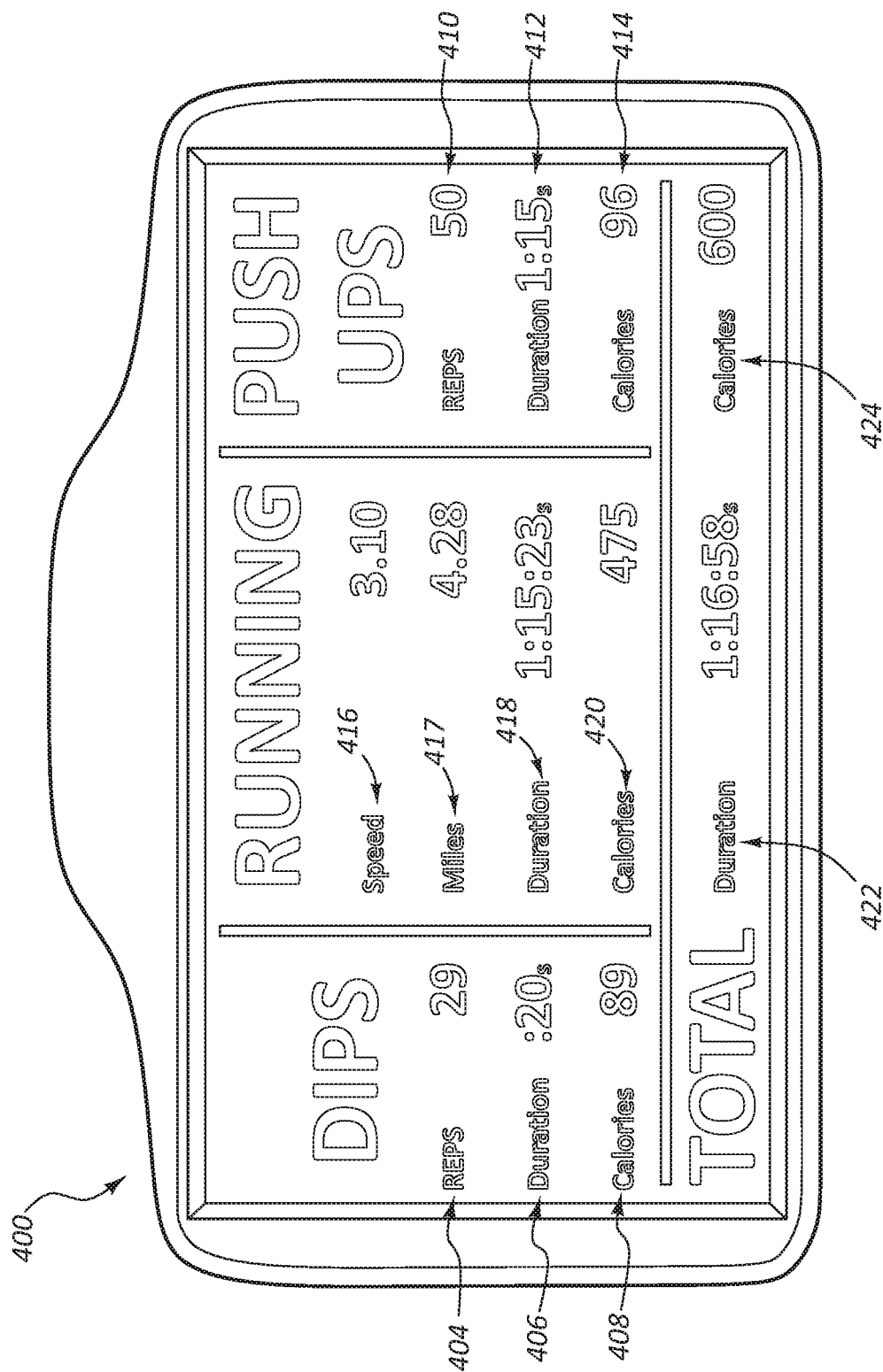
FIG. 4 illustrates a view of an example of a display of a treadmill in accordance with the present disclosure.

FIG. 4 depicts an example of a display 400 in a treadmill. In this example, the display 400 presents to the user a dip repetition number 404, a dip time duration 406, a dip calorie burn 408, a push-up repetition number 410, a push-up time duration 412, a push-up calorie burn 414, a running speed 416, a running distance 417, a running time duration 418, a running calorie burn 420, a total workout duration 422, and a total calorie count 424.

Figure 5:
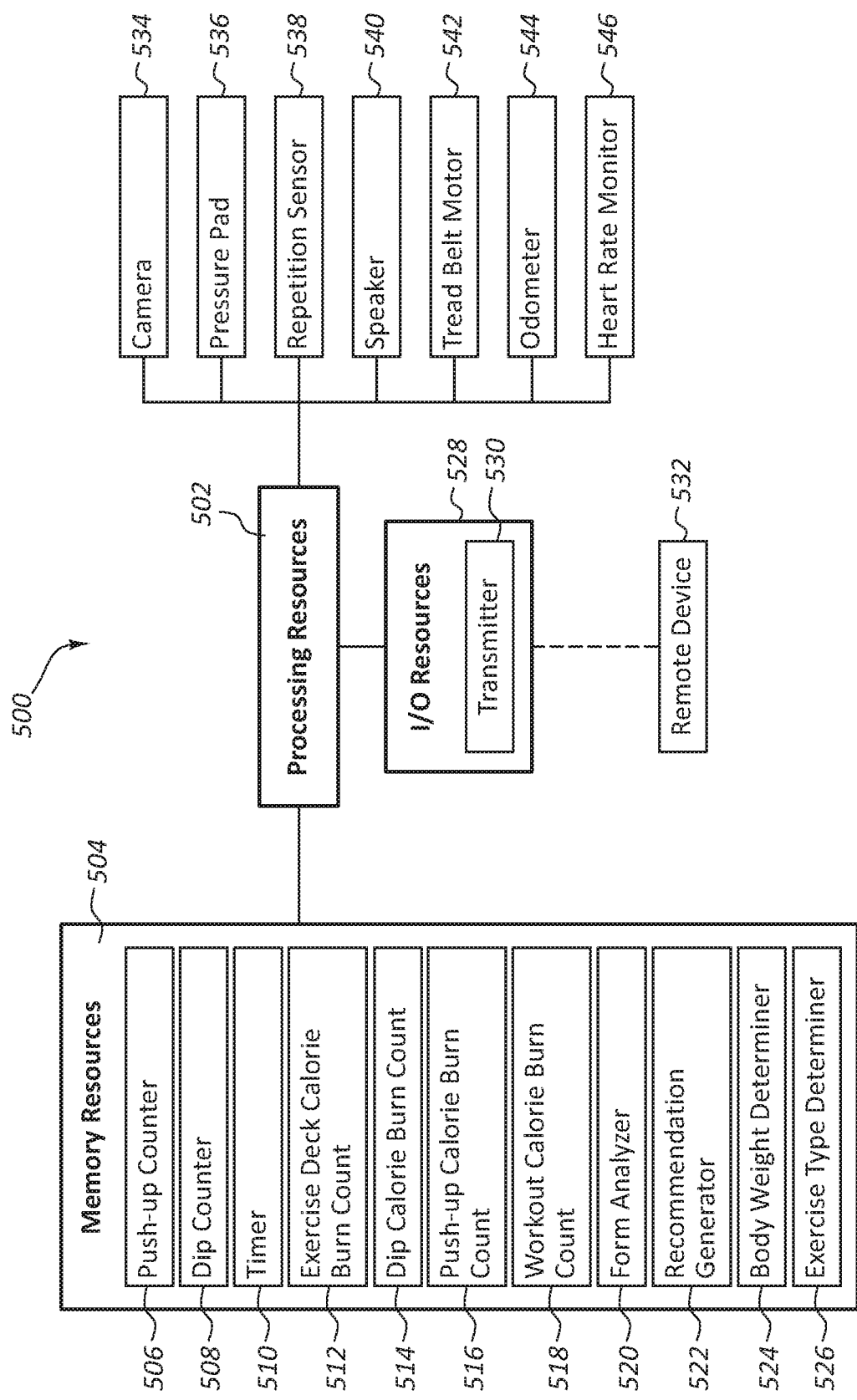
FIG. 5 illustrates a block diagram of an example of a treadmill in accordance with the present disclosure.

FIG. 5 depicts a block diagram of components of an example of a treadmill system 500. In this example, the treadmill system 500 includes processing resources 502 and memory resources 504. The memory resources 504 include a push-up counter 506, a dip counter 508, a timer 510, an exercise deck calorie burn count 512, a dip calorie burn count 514, a push-up calorie burn count 516, a workout calorie burn count 518, a form analyzer 520, a recommendation generator 522, a body weight determiner 524, and an exercise type determiner 526.

The processing resources 502 are also in communication with I/O resources 528, which includes a transmitter 530. The I/O resources may be in communication with a remote device 532.

In illustrated example, the processing resources 502 are also in communication with a camera 534, a pressure pad 536, a repetition sensor 538, a speaker 540, a tread belt motor 542, an odometer 544, and a heart rate monitor 546.

Figure 6:
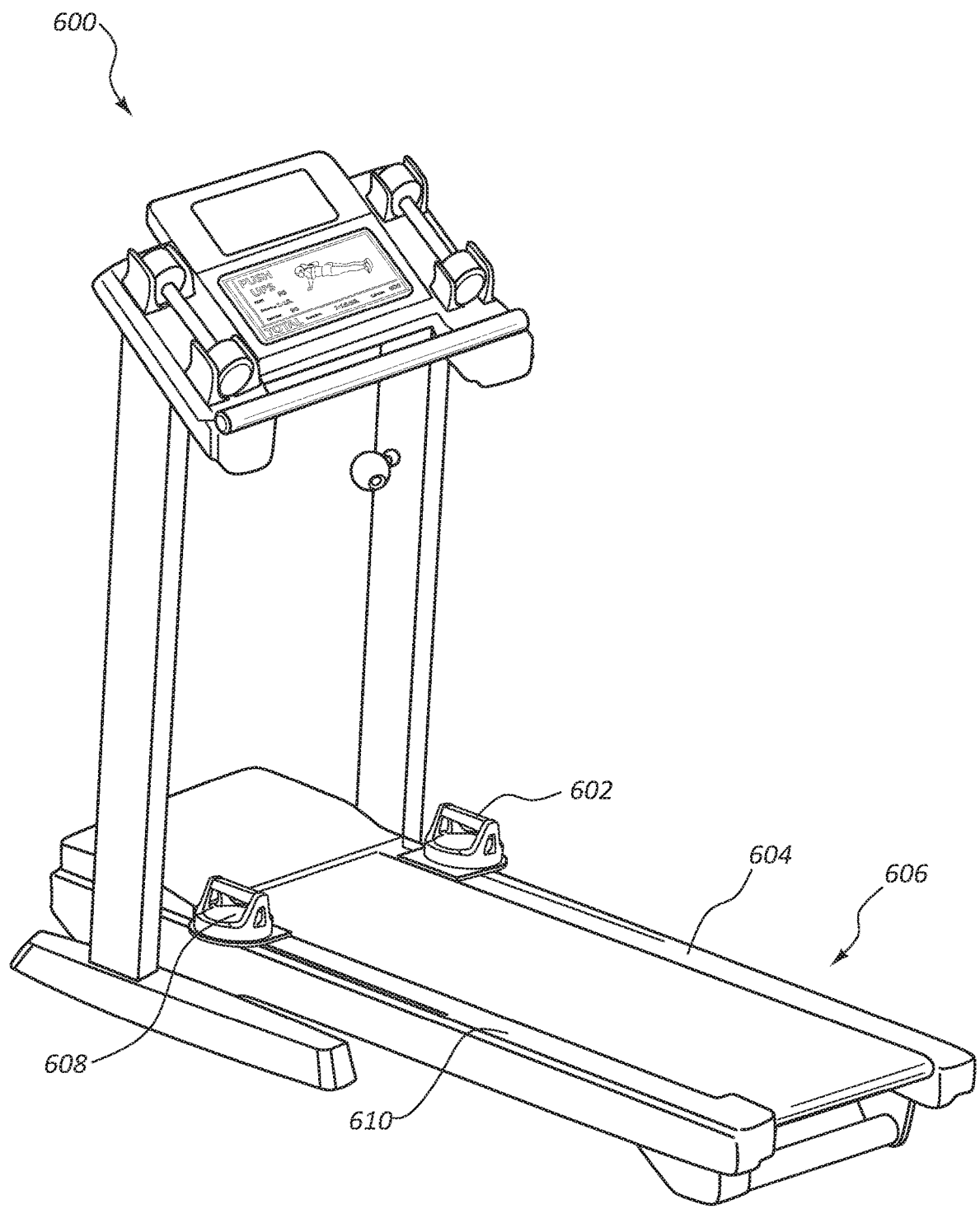
FIG. 6 illustrates a perspective view of an example of a treadmill in accordance with the present disclosure.

FIG. 6 depicts an example of a treadmill 600 with a first push-up bar 602 connected to a first side rail 604 of the exercise deck 606, and a second push-up bar 608 connected to a second side rail 610 of the exercise deck 606. The first and second push-up bars 602, 608 are spaced a human body width apart. A user may grasp the first push-up bar 602 with a first hand and grasp the second push-up bar 608 with a second hand while the user's feet are supported on the exercise deck 606 to perform a push-up exercise.

Figure 7:
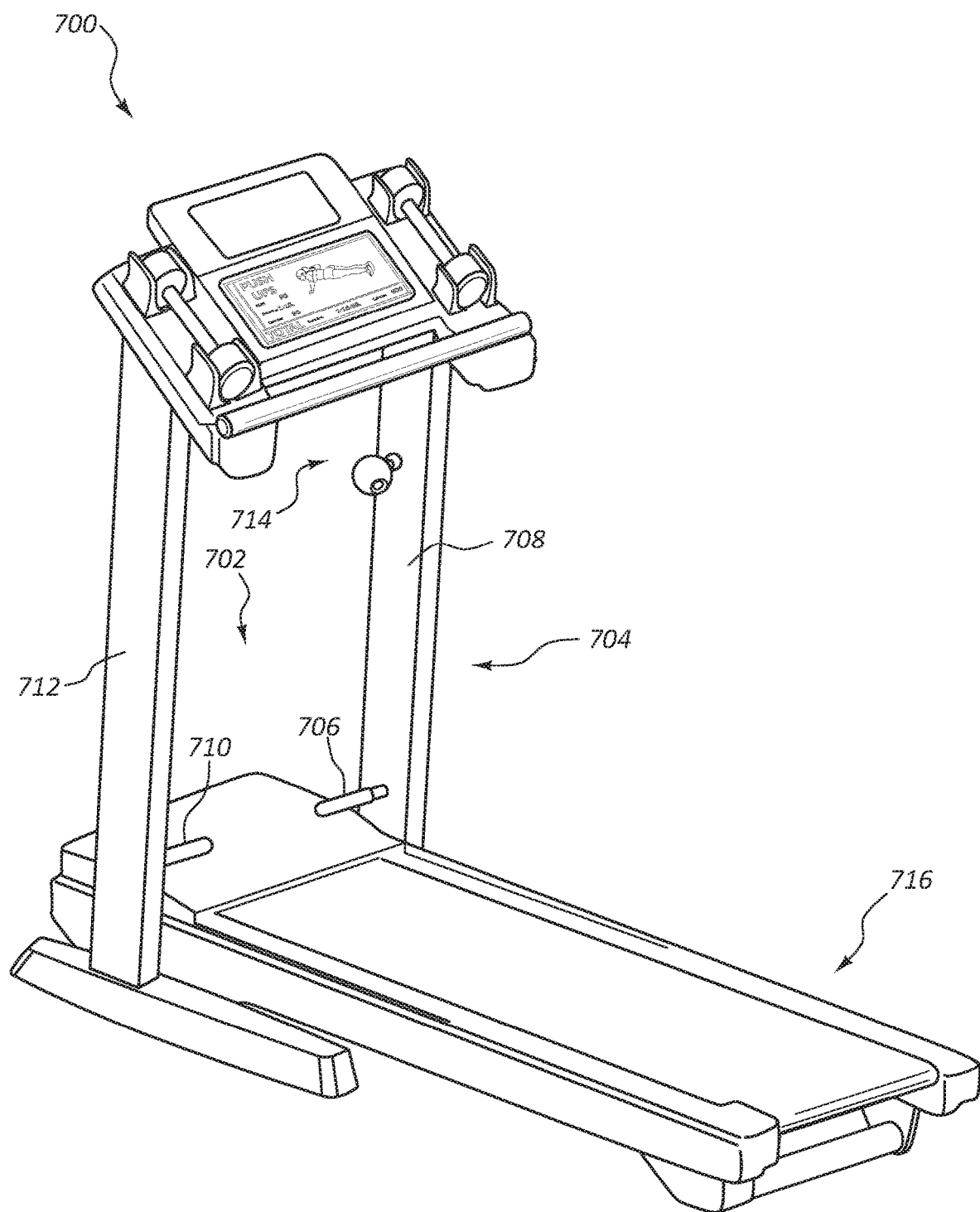
FIG. 7 illustrates a perspective view of an example of a treadmill in accordance with the present disclosure.

FIG. 7 depicts an example of a treadmill 700 with a discontinuous push-up bar 702 attached to the treadmill's frame 704. In this example, the discontinuous push-up bar 702 comprises a first push-up handle 706 connected to a first post 708 of the treadmill's frame 704 and a second push-up handle 710 connected to a second post 712 of the treadmill's frame 704. The first and second push-up handles 706, 710 are oriented to extend towards one another from inside surfaces 714 of the first and second posts 708, 712 and are spaced a human body width apart. A user may grasp the first push-up handle 706 with a first hand and grasp the second push-up handle 710 with a second hand while the user's feet are supported on the exercise deck 716 to perform a push-up exercise.

Figure 8:
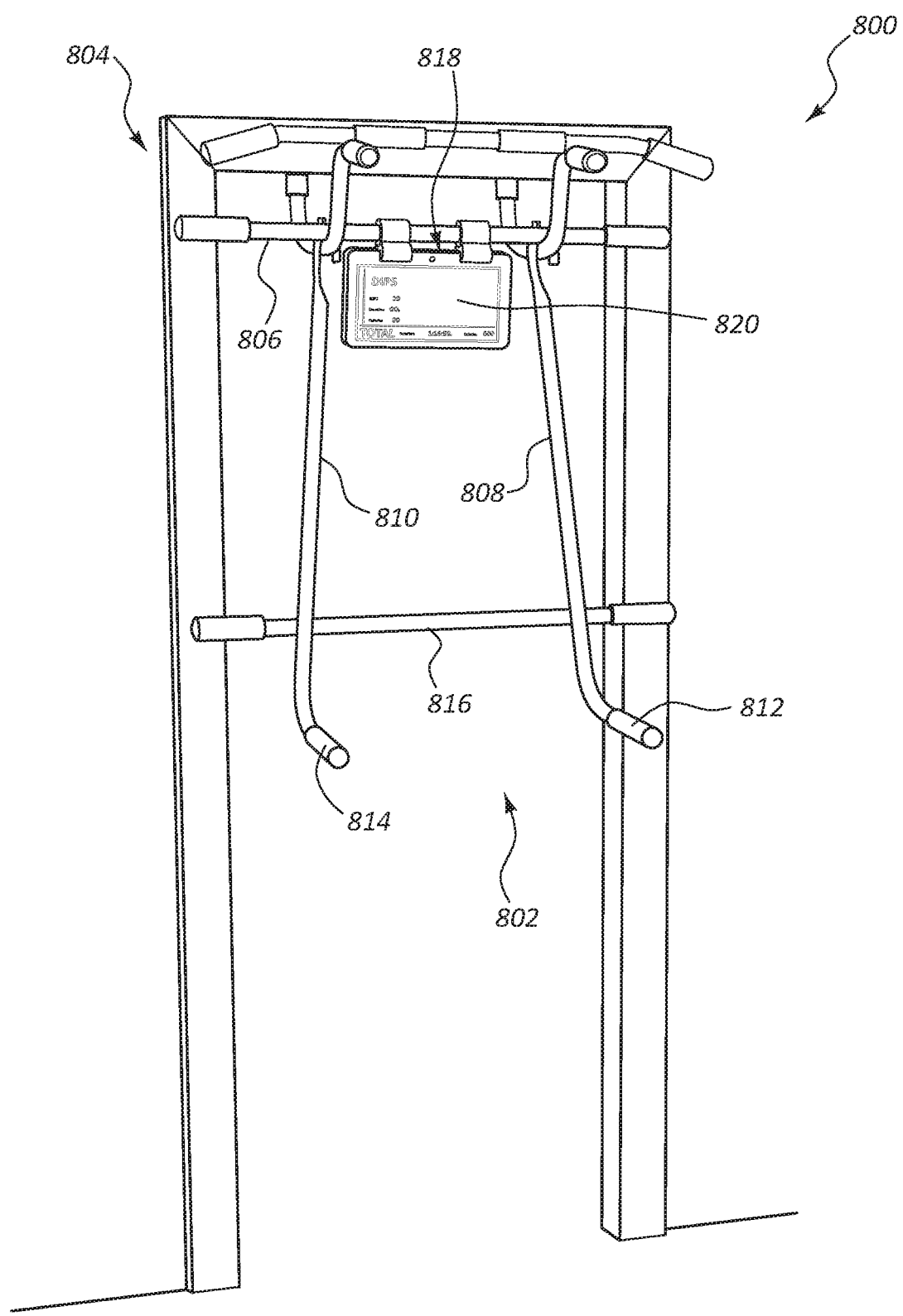
FIG. 8 illustrates a perspective view of an example of a body weight exercise device in accordance with the present disclosure.

FIG. 8 depicts an example of a body weight exercise device 800. In this example, the body weight exercise device 800 includes a frame 802 that has a connection 804 to a door way. However, in other examples, the body weight exercise device 800 may be attached to another structure, such as a wall, building, truss, I-beam, and so forth. The connection 804 may include a beam (not shown) that rests on the upper edge of the door frame and a first cross bar 806 that abuts against the front of the door frame. With the beam resting on the backside of the door frame and the first cross bar abutted against the front of the door frame, the body weight exercise device 800 can securely suspend a user's body weight. A first extension member 808 and a second extension member 810 position a first handle 812 and a second handle 814 below the connection 804 to provide the user hand grips. A second cross bar 816 may be used to provide additional stability.

A camera 818 is incorporated into the body weight exercise device 800 that is angled to detect the movements of the user during the performance of an exercise. The body weight exercise device 800 also includes a display screen 820 where the body weight exercise count can be displayed to the user. In some examples, the number of calories burned by the performance of the body weight exercises is also calculated and presented to the user in the display screen.

Figure 9:
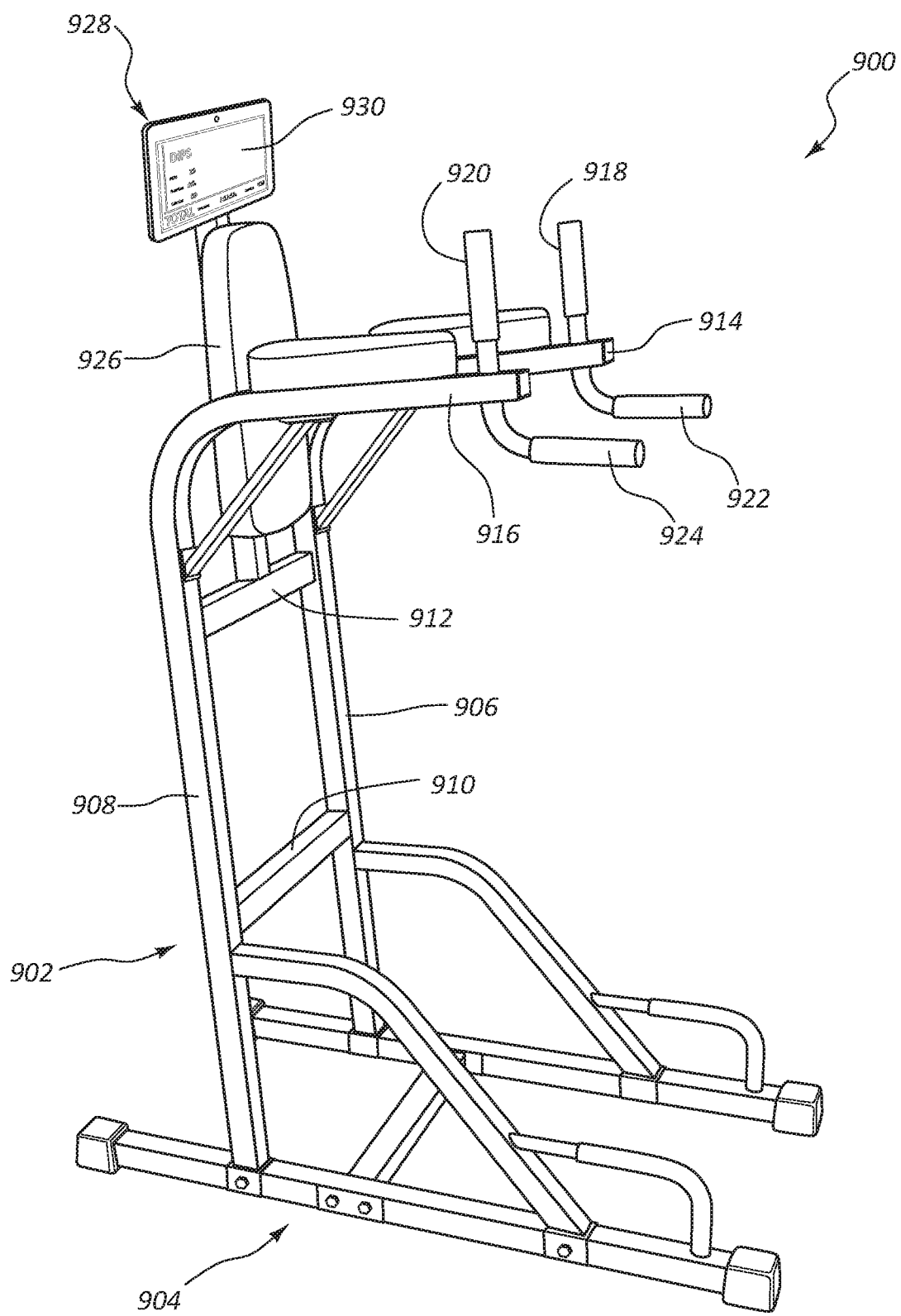
FIG. 9 illustrates a perspective view of an example of a body weight exercise device in accordance with the present disclosure.

FIG. 9 depicts an example of another type of body weight exercise machine 900. In this example, the body weight exercise machine 900 includes a frame 902 that is supported by a base 904. The frame 902 includes a first upright frame post 906 and a second upright frame post 908. A lower cross bar 910 and an upper cross bar 912 are connected to both the first and second upright frame posts 906, 908 to add stability to the body weight exercise machine 900. Additionally, a first support arm 914 is attached to the first upright frame post 906, and a second support arm 916 is attached to the second upright frame post 908. A first handle bar 918 is attached to the first support arm 914 in a transverse orientation with respect to the first support arm 914, and a second handle bar 920 is attached to the second support arm 916 in a transverse orientation with respect to the second support arm 916. Additionally, A third handle bar 922 is attached to the first support arm 914 in an aligned orientation with respect to the first support arm 914, and a fourth handle bar 924 is attached to the second support arm 916 in an aligned orientation with respect to the second support arm 916. A back rest 926 is attached to the upper cross bar 912 to provide stability to the user in the performance of some body weight exercises, such as leg lifts.

A user may grasp the third and fourth handle bars 922, 924 to perform a first type of body weight exercise, such as a dipping exercise. The user may also grasp the first and second handle bars 918, 920, rest his or her arms on the first and second support arms 914, 916, and position his or her back against the back rest 926 to perform another type of body weight exercise, such as leg lifts, knee lifts, or another type of exercise.

The body weight exercise machine includes at least one camera 928 to count the number of body weight exercises that are performed by the user. Additionally, a display screen 930 is also included in the body weight exercise machine 900 to display the body weight exercise count and the associated calorie burn.

GENERAL DESCRIPTION OF THE INVENTION

In general, the invention disclosed herein may provide the user with an exercise device that allows the user to build strength. Such exercise devices may be incorporated into a treadmill. For example, a dipping station or a push-up station may be incorporated into the treadmill. In such an example, sensors incorporated into the treadmill may be able to track the strength exercises. For instance, the sensors may be able to count the number of times that a user performs a dipping exercise or a push-up exercise. In some examples, such sensors may be incorporated into exercise devices that do not include an exercise deck. For example, a body weight exercise device (i.e. a dipping station) may include sensors that track the repetitions of a dipping exercise and a display screen that presents the repetition number to the user. In some instances, the display screen may also present the number of calories burned by performing the dipping exercise or other type of body weight exercise.

In some examples, the treadmill includes an exercise deck that includes a tread belt that spans between a front pulley at a front end of the treadmill and a rear pulley at a rear end of the treadmill. In some examples, one of the front pulley or the rear pulley is driven by a motor, which causes the tread belt to rotate about the front and rear pulleys. In some examples, a top surface of the tread belt moves from the front pulley to the rear pulley. The speed of the tread belt can be controlled by the user or an exercise program at a pace that the user desires to walk or run. In other examples, the speed of the tread belt may be paced for riding a bicycle or another type of self-propelled exercise device on the exercise deck.

As indicated above, the tread belt is rotated by a motor in some examples. In such an example, a motor may be attached to either of the first pulley, the second pulley, or a transmission component that connects to either the first pulley or the second pulley. As the motor rotates, the motor causes the connected pulley to also rotate. The friction between the connected pulley and the tread belt causes the tread belt and the other pulley to rotate as well. The user can adjust the speed of the tread belt though an input mechanism that sends commands to the motor to adjust the motor's speed. In alternative examples, the tread belt is moved by the user. In such examples, the foot impacts imparted to the tread belt cause the tread belt to rotate. A flywheel attached to either the first pulley or the second pulley may store at least a portion of the inertia of the tread belt's movement to help maintain the tread belt's speed at a relatively consistent speed as the user drives the rotation of the tread belt.

Further, in some examples, the treadmill may include a console that includes input devices to control various aspects of the treadmill. In some cases, the console is supported at a front end of the exercise deck with a first frame post connected to a first side of the treadmill and a second frame post connected to a second side of the treadmill.

While any appropriate type of console may be used with the treadmill, the console may include a display, at least one operations controller, a stop input, speakers, physiological sensors, timers, clocks, other features, or combinations thereof. The display may be used to present videos, scenery, entertainment, images, clocks, physiological conditions of the user, touch screen buttons, other information, or combinations thereof. The operations controller may be used to control various operating parameters of exercises performed on the treadmill. Such operating parameters may include the side to side tilt of the exercise deck, the incline of the exercise deck, the speed of the tread belt, the volume of the speakers, image characteristics of the display, the use of the timers, the operation of the physiological sensors, or other functions. The operations controller may be controlled with an input mechanism such as a push button, a touch screen icon, a lever, a dial, a switch, a microphone, a hand gesture camera, another type of input mechanism, or combinations thereof.

The physiological sensors may track physiological information about the user such as the user's heart rate, blood pressure, oxygen saturation level, pulse, respiration, muscle condition, or other physiological conditions. In some examples, such sensors are incorporated into the console. However, in other examples, such physiological sensors are incorporated into one of the first and second arm rests. The physiological sensors may be used to monitor the health of the user which may assist the user in planning future workouts, in maintaining a target health condition during the workout, in calculating an energy expenditure value representing the amount of energy that the user expended during the workout, in performing other functions, or combinations thereof. Generating such an energy expenditure value may take into account the user's weight, age, height, gender, body composition, other personal information, or combinations thereof.

The processes for calculating the energy expenditure may be in communication with a remote device, which has access to personal information about the user. For example, the remote device may include a profile of the user which includes the user's age, weigh, height, gender, body composition, health conditions, other personal information, or combinations thereof. In some cases, the remote device includes a mobile device, a laptop, a remote computer, a server, a computing device, a data center, another type of device, or combinations thereof. Such profile information may be available to the user through an iFit program available through www.ifit.com and administered through ICON Health and Fitness, Inc. located in Logan, Utah, U.S.A. An example of a program that may be compatible with the principles described in this disclosure is described in U.S. Pat. No. 7,980,996 issued to Paul Hickman. U.S. Pat. No. 7,980,996 is herein incorporated by reference for all that it discloses. However, such profile information may be available through other types of programs. For example, such information may be gleaned from social media websites, blogs, public databases, private databases, other sources, or combinations thereof. In yet other examples, the user information may be accessible through the treadmill. In such an example, the user may input the personal information into the treadmill before, after, or during the workout.

An incline mechanism may be used to control the front to rear slope of the exercise deck. In the cases, the slope of the exercise deck is relatively flat. However, in other examples the incline mechanism may raise or lower a front section of the treadmill to create a different slope. Any appropriate type of incline mechanism may be used to raise and/or lower either a front section or a rear section of the treadmill. Further, any appropriate type of slope may be achieved with the incline mechanism. In some examples, the front to rear slope of the exercise deck may be negative 15.0 degrees where the front section is lower than the rear section. In yet other examples, the front to rear slope may be a positive 45.0 degrees where the front section is higher than the rear section. In other examples, the front to rear slope angle is between negative 45.0 degrees and positive 45.0 degrees. Further, in some embodiments, the exercise deck is capable of changing its side to side tilt angle.

In some cases, the treadmill incorporates a strength device. For example, the treadmill may include a first handle and a second handle directly or indirectly attached to the treadmill's frame that are spaced a human body width apart. In some cases, the first handle is attached proximate the first post of the treadmill's frame, and the second handle is attached proximate the second post of the treadmill's frame. The handles may be movably attached to the treadmill such that the handles can be moved to at least a first orientation and a second orientation. In the first orientation, the handles may be aligned with the length of the exercise deck such that the handles are above the exercise deck. In the second orientation, the handles may be moved outwardly away from a centerline of the exercise deck. In some examples, the handles are slidably connected to the treadmill frame such that the handles remain aligned with the length of the exercise deck's length as the handles move away from the centerline of the exercise deck. In the second orientation, the handles may be moved far enough out that they are no longer above the exercise deck. In alternative examples, the handles may be rotationally connected to the treadmill. In such an example, the handles may pivot away from the centerline of the exercise deck into the second orientation and be positioned in a transverse orientation to the exercise deck's length.

When the handles are in the first orientation, the user may grasp the handles with his or her hands and raise himself or herself off of the exercise deck. The user may then bend his or her knees and lower his or her body downward towards exercise deck without loading the user's weight back to the exercise deck. Often, in this lowered position, the user's elbows are raised towards the user's head and the user's pectoral muscles are stretched. To raise the user to an upper position, the user engages both his pectoral muscles and arm muscles to finish a repetition of a dip exercise. With the handles in the second orientation, the handles are moved out of the way so that they do not interfere with the user performing an aerobic exercise on the exercise deck, such as running, walking, or cycling.

A repetition sensor may be incorporated into the treadmill to count the number of times that the user performs a dipping exercise. In some examples, the repetition sensor can detect when the user is in the lowered position, the upper position, or transitioning there between. Each time that the repetition sensor detects the user's body is in the predetermined position, the repetition sensor can record the count that may result in a counter incrementing the count by one. Such a count may be presented to the user in a display screen incorporated into the treadmill. In other examples, the count may be presented to the user through an audible counter or another mechanism.

Any appropriate type of repetition sensor may be used in accordance with the principles described in the present disclosure. For example, the repetition sensor may be a camera that can detect the user's position or at least some of the positions that the user is in during the performance of the dipping exercise or another body weight exercise. Such a camera may be a camera that operates in the visible light portion of the electromagnetic spectrum. In such an embodiment, the camera may utilize an image recognition program that determines the position of the user based on the color values in the camera's pixels. In another example, the camera operates in the infrared portion of the electromagnetic spectrum. In other examples, the camera is a distance camera that emits a signal and measures the time of flight for a reflection of the signal to return.

In another example, the repetition sensor includes a pressure gauge, strain gauge, or another type of gauge that is in communication with the handles. In such an embodiment, the varying weight loads applied to the handles during the performance of the exercise can be analyzed to determine the number of body weight exercises performed by the user. For example, the forces on the handles during the upward movement of a dipping exercise may exhibit a greater load than when the user is in a resting position or moving in the downward direction. Thus, the expected load increases experienced by the handles can be correlated to the upward movement of the dipping exercise. Accordingly, each time the load increases to a level expected during the performance of a dipping exercise, the counter can be cause to increment the count by one.

In some examples, the sensors may be used as a primary sensor for determining the number repetitions performed by the user. However, in other examples, multiple sensors may be used to determine the number of the repetitions performed by the user or to collect other types of information about the user's performance. For example, a camera may be used as a sensor for collecting repetition information about the user's performance, and a strain gauge may be used to verify that the readings received through the camera appear to be accurate. In some examples, a first camera may be used to verify the accuracy of another camera at a different angle or have a different feature that can corroborate the information gathered from the second camera.

While the examples above have been described with the user performing a dipping exercise with the handles incorporated into the treadmill, any appropriate type of body weight exercise may be performed with the handles. For example, the user may use the handles to perform a leg lift exercise, a knee lift exercise, a dipping exercise, a modified push-up, a modified pull-up, a modified row, another type of body weight exercise, or combinations thereof.

In some examples, the treadmill may also incorporate a push-up bar. The push-up bar may be incorporated into the treadmill in any appropriate manner in accordance with the principles described in the present disclosure. In one example, both the first post and the second post of the treadmill's frame include at least one catch on which an end of a push-up bar can be supported. The catch may be a protrusion from the treadmill post that is made of a material that can support the weight of a push-up bar and the loads applied to the push-up bar. Such catches may be angled slightly upward to cause the push-up bar to roll or otherwise move towards the treadmill's frame posts. In some embodiments, the catches are removably attached to the frame posts. Alternatively, the catches are permanently attached to the frame posts. Each post may include at least one catch that is aligned with another catch on the other post. With the catches aligned, each catch may support one end of the push-up bar. One advantage to securing the push-up bar to the frame posts through the catches is that the push-up bar is easily removed. In some examples, it may be advantageous to move the push-up bar when performing a running or walking exercise on the exercise deck. In other examples, the push-up bar may remain in place without interfering with the performance of a walking or running exercise. Further, each post may have multiple catches with each catch per post located at a different elevations. In such an example, the height of the push-up bar may be changed as desired by the user.

In some situations, it may be desirable to remove the push-up bar from the frame posts when the exercise deck is being inclined during the running or walking exercise performed on the exercise deck. In such an example, the user may manually remove the push-up bar. In other examples, the treadmill may include a mechanism that moves the push-up bar automatically in response to instructing the exercise deck to incline. For example, the catches may move up on a rack and pinion assembly, a screw motor, a hydraulic mechanism, another type of mechanism, or combinations thereof.

In alternative examples, the push-up bar may be permanently attached to the posts. In such an example, the ends of the push-up bar may be screwed or otherwise fastened to the posts. Alternatively, the push-up bar may be welded or integrally formed with the posts. In some cases, the push-up bar is discontinuous. In such an example, a first handle of the push-up bar can be incorporated into the first post and project inward towards the second post, and a second handle of the push-up bar can be incorporated into the second post and project inward towards the first post. In some instances, the distance between the first and second push-up bar handles is sufficient to allow a user to drop between the push-up bar handles while performing push-up exercises.

In yet another example, the push-up handles may be incorporated into the exercise deck. In such an example, a first push-up bar may be incorporated into a first rail of the exercise deck, and a second push-up bar may be incorporated into a second rail of the exercise deck. Each of the first and second push-up bars may be elevated a distance off of the surface of the exercise surface. In this example, when performing push-ups the user may face the surface of the exercise deck while grasping the first push-up bar with his or her first hand and grasping the second push-up bar with his or her second hand.

As described above, the repetition sensor may be used to count the number of push-up exercises executed by the user with the push-up bar. Such repetition sensors may include cameras, strain gauges, pressure gauges, other types of sensors, or combinations thereof.

The number of push-ups, the number of dips, and the number of other types of body weight exercises may be presented to the user in a display incorporated into the treadmill or other type of exercise machine. In some examples, such a display screen may be incorporated into the console. Alternatively, the display screen may be incorporated into an area of the exercise machine where the user can view the display screen during the performance of the strength exercises. In some examples, redundant display screens may be incorporated into the exercise machine so that the user can view the exercise counts while performing different types of exercises.

The sensor may have the intelligence to distinguish between different types of exercises. For example, the sensor may be able to determine when the user is performing an exercise with the handles verses the push-up bar. Further, the sensor may be able to distinguish between when the user is performing different types of exercises with the handles. In such an example, the camera may be able to track the location, direction, and speed of the user during the exercise. For example, if the user is using the handles to perform a modified row, the user grasps the handles with both hands, but the user will be facing upwards. In some examples, the sensor may be able to determine based on the pixel readings that the user is facing upwards and draw a conclusion that the user is performing a row exercise. As the user executes the row exercises, the user's body will alternate between a lower position and a higher position. In such an example, the lower position is proximate the surface of the exercise deck and the upper position is proximate the height the handles. Such lower positions are different than the lower positions of the user during a modified push-up exercise, a dipping exercise, a leg lift exercise, a knee lift exercise, or another type of exercise. Thus, in some examples, the sensor may determine the type of exercise performed by the user based on just the lowered and upper positions. In yet other examples, the sensor may determine the type of exercise based on the angle of the user. In some examples, multiple factors, such as the user's facing direction, angle of the user's body, the lower position, the upper position, and so forth are collectively analyzed to determine the type of exercise being performed by the user. In other examples, just one of the factors may be dispositive for determining the type of exercise being performed by the user.

In addition to knowing the type of exercise, a system incorporated into the exercise machine may have other information about the user. For example, this additional information may include the user's age, gender, weight, height, body composition, health risks, health factors, injuries, and so forth. This information may be used to determine the amount of force needed to move the user during the performance of the exercise being executed by the user. Thus, the system may assign a calorie value to each repetition of the exercise being performed by the user. In some examples, the calorie burn count per exercise is merely the repetition number multiplied by a consistent calorie number calculated based on just the user's personal information. In other examples, the sensor can record and track other conditions that may modify the calorie burn count per repetition. For example, the sensor may record the user's angle in the performance of the exercise. Performing a push-up at a steeper angle (i.e. push-up bar is secured to the highest catch incorporated in the posts), the user may be burning less calories than when the user is performing a push-up at a lower angle (i.e. push-up bar is secured to the lowest catch incorporated into the posts). In some instances, the camera may record the angle during push-ups or other such exercises and modify the number of calories burned per exercise repetition. In some examples, the speed at which the user executes an exercise may also impact the number of calories burned during the performance of the exercise. In some instances, the sensors can also record the user's speed and calculate a modified calorie burn number per exercise repetition. In yet other examples, the sensor can determine the stroke distance per exercise. For example, when a user is performing a dip, the sensor may track how far down the user traveled and adjust the calorie count when the user either falls short of the predetermined stroke distance or exceeds the predetermined stroke distance.

A camera can record the parameters described above with shape recognition programs that can recognize the user's various body parts and identify the location of each of the identified body parts based on the pixel data. Each frame of the camera may be associated with a timestamp. As the user's body parts move during the exercise, the time stamps can be used to determine the speed at which the body parts moved to determine the speed that the exercise is being executed. Additionally, the angles of the user and facing direction of the user can be determined based on the identified location of the user's body parts.

In examples where the exercise machine is a treadmill, the treadmill may contain programs that determine the number of calories burned by the user during the performance of exercises on the exercise deck (i.e. running or walking). The display may present the exercise types and the associated calorie burn for each of the identified exercise types. In one such example, the display screen includes a repetition number for push-ups associated with a calorie burn number, a repetition number for dips associated with a calorie burn number, and a running time duration associated with a speed and a calorie burn number. Additionally, the display screen may present an overall number of calories burned that totals the calories contributed from each of the push-ups, dips, and running exercises. In some examples, the force exerted by the user during the performance of the exercise may be calculated and presented in the display screen. The force may be determined by considering factors such as the user's body weight, the amount of weight loaded to the user, and the speed at which the user accomplished the exercise.

The system may include a combination of hardware and programmed instructions for executing the functions of the system. In this example, the system includes processing resources that are in communication with memory resources. Processing resources include at least one processor and other resources used to process the programmed instructions. The memory resources represent generally any memory capable of storing data such as programmed instructions or data structures used by the system. The programmed instructions shown stored in the memory resources include a push-up counter, a dip counter, a timer, an exercise deck calorie burn count, a dip calorie burn count, a push-up calorie burn count, a workout calorie burn count, a form analyzer, a body weight determiner, and an exercise type determiner.

Further, the processing resources may be in communication with user information and/or workout environment information that may be stored in the memory resources locally or off site. For example, the processing resources may be in communication with a remote device that stores the user information or workout environment information. Such a remote device may be a mobile device, a cloud based device, a computing device, another type of device, or combinations thereof. In some examples, the system communicates with the remote device through the mobile device which relays communications between the system and the remote device. In other examples, the mobile device has access to information about the user and/or workout environment. In some cases, the remote device collects information about the user during his or her workout or in general. In one such example, the exercise machine may send information to the remote device indicating the types of exercises performed by the user, the number of calories burned by the user, the average heart rate of the user during the workout, other types of information about the workout, or combinations thereof. An example of a program that may be compatible with the principles described herein includes the iFit program which is available through www.ifit.com and administered through ICON Health and Fitness, Inc. located in Logan, Utah, U.S.A. An example of a program that may be compatible with the principles described in this disclosure are described in U.S. Pat. No. 7,980,996 issued to Paul Hickman. U.S. Pat. No. 7,980,996 is herein incorporated by reference for all that it discloses. In some examples, the user information accessible through the remote device includes the user's age, gender, body composition, height, weight, health conditions, other types of information, or combinations thereof. Further, the workout environment information that may be accessible to the remote device may include humidity data, temperature data, elevation data, atmospheric pressure data, sunlight exposure data, other types of environmental data, or combinations thereof.

The processing resources, memory resources, and remote devices may communicate over any appropriate network and/or protocol through the input/output resources. In some examples, the input/output resources includes a transceiver for wired and/or wireless communications. For example, these devices may be capable of communicating using the ZigBee protocol, Z-Wave protocol, BlueTooth protocol, Wi-Fi protocol, Global System for Mobile Communications (GSM) standard, another standard, or combinations thereof. In other examples, the user can directly input some information into the system through a digital input/output mechanism, a mechanical input/output mechanism, another type of mechanism, or combinations thereof. For example, such input mechanisms may be incorporated into the console of the exercise machine or at another location on the exercise machine. In some circumstances, the exercise machine includes multiple sensors. In such an example, each of the sensors may communicate as part of the network described above.

The memory resources may include a computer readable storage medium that contains computer readable program code to cause tasks to be executed by the processing resources. The computer readable storage medium may be a tangible and/or non-transitory storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, magnetic based memory, other types of memory, or combinations thereof.

The push-up counter represents programmed instructions that, when executed, cause the processing resources to count the number of push-ups performed by the user. The dip counter represents programmed instructions that, when executed, cause the processing resources to count the number of dips performed by the user. The push-up counter and the dip counter may receive input from a repetition sensor, a camera, a pressure pad, a strain gauge, another type of sensor, or combinations thereof. Such sensors may analyze multiple factors to determine the user's exercise angle, stroke distance, other parameter, or combinations thereof. The timer represents programmed instructions that, when executed, cause the processing resources to determine the time different between the start and finish of an exercise. In some cases, the timer determines the start and finish of a single repetition or just a portion of a repetition (i.e. just the upward movement of an exercise). In other examples, the time is used to determine the time duration for executing a workout.

The exercise deck calorie burn counter represents programmed instructions that, when executed, cause the processing resources to determine the number of calories burned by the user while performing an exercise on the exercise deck. Such exercises may include walking, running, skipping, cycling, backward running, backward walking, another type of exercise, or combinations thereof. The exercise deck calorie burn counter may determine the calorie count by analyzing factors, such as the user's heart rate, the time duration that the exercise was executed, the user's body weight, age, gender, body composition, other factors, or combinations thereof.

The dip calorie burn counter represents programmed instructions that, when executed, cause the processing resources to count the number of calories burned while performing dip exercises with the exercise machine. The push-up calorie burn counter represents programmed instructions that, when executed, cause the processing resources to count the number of calories burned while performing push-up exercises with the exercise machine. The dip calorie burn counter and the push-up calorie burn counter may analyze a number of parameters that are collected by the sensors incorporated into the exercise machine. For instance, the sensors may collect information such as the angle of the user's body during the exercise, the facing direction of the user's body during the exercise, the speed of exercise execution during the exercise, the user's body weight, age, gender, body composition, other factors, or combinations thereof. These factors may be used to fine tune the calculations for determining the amount of calories burned during the push-up and/or dip calorie burn counters.

The workout calorie burn counter represents programmed instructions that, when executed, cause the processing resources to add up the calorie burn counts from each of the exercises performed during the workout. For example, if the user performed push-ups, dips, and running during the workout, the workout calorie burn counter may add up each of the calories from performing push-ups, dips, and running.

The form analyzer represents programmed instructions that, when executed, cause the processing resources to analyze the form of the user during the performance of a strength exercise. In some embodiments, the form analyze determines the stroke length, the angle of the user's body, and other factors that are useful in the calculation of the calorie burn numbers. However, the form analyzer may also determine whether the user is performing the strength exercises properly. For example, the form analyzer may use a recognition program to determine the locations of the user's hands, feet, head, torso, and so forth. Based on the position and angles of these body parts, the form analyzer may determine that the user is executing the exercise with good form, moderate form, or bad form.

The recommendation determiner represents programmed instructions that, when executed, cause the processing resources to generate a recommendation to the user. In some examples, the recommendation is to improve the user's form. For example, if the user is arching his or her back during push-ups, the recommendation determiner may generate a recommendation to straighten the user's back. The recommendation may be presented to the user in the display screen, through a speaker, through a tactile stimulus, through an electronic message, through another communication mechanism, or combinations thereof. While this example has been described with reference to a specific type of recommendations, any appropriate type of recommendation may be made in accordance with the present disclosure. For example, the recommendation may be to do another repetition, perform an exercise slower, perform an exercise faster, improve posture, to bend knees, lean forward, stop performing an exercise, another type of recommendation, or combinations thereof.

The body weight determiner represents programmed instructions that, when executed, cause the processing resources to determine the user's body weight. In some examples, the body weight determiner consults a data field with a value provided by the user. In some examples, the value is provided from a remote device, such as a user profile that contains the user's weight. In such an example, other types of information about the user may be gleaned from the user profile, such as the user's age, gender, body composition, or combinations thereof. In other examples, a sensor is incorporated into the handles, under the exercise deck, or another location on the treadmill and/or exercise machine to determine the user's weight.

The exercise type determiner represents programmed instructions that, when executed, cause the processing resources to determine the type of exercise being performed by the user. In some examples, the exercise type determiner analyzes the factors described above and determines the type of exercise being performed. In some examples, the user may input into the console or another input mechanism the type of exercise being performed. The user may indicate to the system the type of exercise through any appropriate mechanism. In some examples, the user may speak into a microphone associated with the system to indicate the workout type. In other examples, the user may use a button, a touch screen, a lever, or another input/output mechanism, a remote device, another type of device, or combinations thereof. In other examples, the user is participating in a predetermined program that selects the type of exercises for the user to perform. For example, the user may select a program that instructs the user to perform a number of push-ups, dips, and an aerobic exercise on the exercise deck. In such an example, the exercise type determiner may consult the program to determine which type of exercise that the user is being instructed to perform.

Further, the memory resources may be part of an installation package. In response to installing the installation package, the programmed instructions of the memory resources may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources and the memory resources are located within the console, the exercise machine, a mobile device, a remote device, another type of device, or combinations thereof. The memory resources may be part of any of these device's main memory, caches, registers, non-volatile memory, or elsewhere in their memory hierarchy. Alternatively, the memory resources may be in communication with the processing resources over a network. Further, data structures, such as libraries or databases containing user and/or workout information, may be accessed from a remote location over a network connection while the programmed instructions are located locally. Thus, the system may be implemented with the exercise machine, a user device, a mobile device, a phone, an electronic tablet, a wearable computing device, a head mounted device, a server, a collection of servers, a networked device, a watch, or combinations thereof. Such an implementation may occur through input/output mechanisms, such as push buttons, touch screen buttons, voice commands, dials, levers, other types of input/output mechanisms, or combinations thereof. Any appropriate type of wearable device may include, but are not limited to glasses, arm bands, leg bands, torso bands, head bands, chest straps, wrist watches, belts, earrings, nose rings, other types of rings, necklaces, garment integrated devices, other types of devices, or combinations thereof.

While the examples above have been described with reference to strength exercise devices being incorporated into a treadmill, the principles described in the present disclosure are also applicable to the body weight exercise devices, such as dipping stations, vertical knee raise stations, pull-up bars, other types of body weight exercise devices, or combinations thereof. For example, a sensor that determines the number of body weight exercises may be incorporated into a body weight exercise device. Such a sensor may gather other information about the workout, such as the angle of the user, the direction that the user is facing, the speed at which the user is exercising, the number and the durations that the user is taking between repetitions, and so on. Further, the body weight exercise device may also include processing and memory resources to use the gathered data to determine the number of calories that the user has burned. In some cases, the number of calories burned is broken down into calories burned by type of exercise. In other examples, just a total of calories burned is determined and presented. In yet other examples, both a calorie break down and the total number of calories burned is presented. Such calorie information can be presented in a display screen incorporated into the body weight exercise device.

In one example, the body weight exercise device may be a dipping station that includes a frame that has a connection to a door way. The connection may include a beam that rests on the upper edge of the door frame and a first cross bar that abuts against the front of the door frame. With the beam resting on the backside of the door frame and the first cross bar abutted against the front of the door frame, the body weight exercise device can securely suspend a user's body weight in the air. A first extension member and a second extension member may extend from and position a first handle and a second handle below the connection to provide the user hand grips. A camera may be incorporated into the body dipping station that is angled to detect the movements of the user during the performance of an exercise. The dipping station may also include a display screen where the body weight exercise count can be displayed to the user.

In another example, the body weight exercise machine is a vertical knee raise (VKR) station that includes a frame that is supported by a base on a support surface. The frame includes a first upright frame post and a second upright frame post. Cross bars are connected to both the first and second upright frame posts to add stability to the VKR station. Additionally, a first support arm may be attached to the first upright frame post, and a second support arm may be attached to the second upright frame post. A first handle bar may attached to the first support arm in a transverse orientation with respect to the first support arm, and a second handle bar may be attached to the second support arm in a transverse orientation with respect to the second support arm. Additionally, A third handle bar may be attached to the first support arm in an aligned orientation with respect to the first support arm, and a fourth handle bar may be attached to the second support arm in an aligned orientation with respect to the second support arm. A back rest may be attached to the upper cross bar to provide stability to the user in the performance of some body weight exercises, such as leg lifts.

A user may grasp the third and fourth handle bars to perform a first type of body weight exercise, such as a dipping exercise. The user may also grasp the first and second handle bars, rest his or her arms on the first and second support arms, and position his or her back against the back rest to perform another type of body weight exercise, such as leg lifts, knee lifts, or another type of exercise. Such a VKR station may include at least one camera or another type of repetition sensor to count the number of body weight exercises performed by the user. Additionally, a display screen may also be included in the body weight exercise machine to display the body weight exercise count and the associated calorie burn.

What is claimed is:

1. A treadmill, comprising:
   a frame including a first post and a second post;
   an exercise deck attached to the frame;
   a plurality of first catches incorporated into the first post on a rearward side of the first post extending toward a majority the exercise deck;
   a plurality of second catches incorporated into the second post on a rearward side of the second post extending toward the majority the exercise deck; and
   a push-up bar connected to the frame on the rearward side of the first post and the rearward side of the second post so that a user performs a pushup while on the exercise deck, the push-up bar being elevated over the exercise deck, wherein the push-up bar is configured to removably rest on top of one of the plurality of first catches at a first end and one of the plurality of second catches at a second end, wherein the position of the push-up bar is adjustable depending on which of the plurality of first catches and which of the plurality of second catches are selected.

2. The treadmill of claim 1, further comprising a processor and memory, the memory including programmed instructions, which when accessed by the processor cause the processor to determine a characteristic about a body weight exercise performed with the push-up bar.

3. The treadmill of claim 2, further comprising a repetition sensor in communication with the processor to count a number of times that the user performs the body weight exercise with the push-up bar.

4. The treadmill of claim 3, wherein the repetition sensor includes at least one camera.

5. The treadmill of claim 2, further comprising a weight sensor in communication with the processor to generate the weight value of a user applying their body weight to the push-up bar.

6. The treadmill of claim 2, further comprising a display in communication with the processor to present a repetition count of the body weight exercise.

7. The treadmill of claim 2, further comprising a display in communication with the processor to present a body weight exercise calorie burn value based on the performance of the body weight exercise.

8. The treadmill of claim 1, wherein the plurality of first catches and the plurality of second catches are moveable.

9. The treadmill of claim 8, further comprising a mechanism that moves the plurality of first catches and the plurality of second catches.

10. The treadmill of claim 1, further comprising a processor and memory, the memory including program instructions to cause the processor to:
    determine an exercise deck calorie burn value based on a performance of an exercise with the exercise deck;
    determine a body weight calorie burn value based on a performance of a body weight exercise;
    add the exercise deck calorie burn value to the body weight exercise calorie burn value to generate a workout calorie burn value; and
    present the workout calorie burn value in a display.

11. The treadmill of claim 1, further comprising a tread belt incorporated into the exercise deck, the tread belt being disposed around a first pulley at front end of the exercise deck and a second pulley at a rear end of the exercise deck.

12. The treadmill of claim 1, wherein the plurality of first catches include a first plurality of protrusions from the first post and the plurality of second catches are a second plurality of protrusions from the second post.

13. The treadmill of claim 1, wherein the plurality of first catches and the plurality of second catches are angled slightly upward such that the push-up bar is urged toward the first post and the second post.

* * * * *